United States Patent
Johnsen et al.

(10) Patent No.: US 12,549,649 B2
(45) Date of Patent: Feb. 10, 2026

(54) VARIABLE FRAME HEADERS

(71) Applicant: Graphcore Limited, Bristol (GB)

(72) Inventors: Bjorn Dag Johnsen, Oslo (NO); Brian Edward Manula, Bekkestua (NO)

(73) Assignee: GRAPHCORE LIMITED, Bristol (GB)

( * ) Notice: Subject to any disclaimer, the term of this patent is extended or adjusted under 35 U.S.C. 154(b) by 580 days.

(21) Appl. No.: 18/047,772

(22) Filed: Oct. 19, 2022

(65) Prior Publication Data

US 2023/0179688 A1 Jun. 8, 2023

(30) Foreign Application Priority Data

Dec. 2, 2021 (GB) ...................................... 2117437

(51) Int. Cl.
*H04L 69/22* (2022.01)
*H04L 12/46* (2006.01)

(52) U.S. Cl.
CPC .......... *H04L 69/22* (2013.01); *H04L 12/4658* (2013.01)

(58) Field of Classification Search
CPC ............................ H04L 69/22; H04L 12/4658
See application file for complete search history.

(56) References Cited

U.S. PATENT DOCUMENTS

2016/0308981 A1 10/2016 Cortes Gomez

FOREIGN PATENT DOCUMENTS

DE 102005034549 A1 2/2007

OTHER PUBLICATIONS

Search Report dated Aug. 2, 2022 for United Kingdom Patent Application No. GB2117437.0. 6 pages.
Anonymous, IEEE 802.1Q—Wikipedia, Dec. 1, 2021. Retrieved from the Internet: https://en.wikipedia.org/w/index.php?title=IEEE_802.1Q&oldid=1058169140.

*Primary Examiner* — Blake J Rubin
(74) *Attorney, Agent, or Firm* — HAYNES AND BOONE, LLP

(57) ABSTRACT

In order to provide for the extension of either the MAC address or the VLAN identifier as required, a sliding cursor functionality between the MAC address and the VLAN identifier is provided. The MAC address may be extended by borrowing bits conventionally used for representing part of the VLAN identifier. Similarly, VLAN identifier may be extended by borrowing bits conventionally used for representing part of the MAC address.

17 Claims, 38 Drawing Sheets

Figure 9B

VARIABLE FRAME HEADERS

CROSS-REFERENCE TO RELATED APPLICATIONS

The present application claims priority to United Kingdom Patent Application No. GB2117437.0, filed Dec. 2, 2021, the disclosure of which is hereby incorporated herein by reference in its entirety.

TECHNICAL FIELD

The present application relates to a data processing apparatus and in particular to a data processing apparatus configured to support the transmission of frames over a network.

INTRODUCTION

In the context of processing data for complex or high volume applications, a processing unit for performing the processing of that data may be provided. The processing unit may function as a work accelerator to which the processing of certain data is offloaded from a host system. Such a processing unit may have specialised hardware for performing specific types of processing.

As an example, one area of computing in which such a specialised accelerator subsystem may be of use is found in machine intelligence. As will be familiar to those skilled in the art of machine intelligence, a machine intelligence algorithm is based around performing iterative updates to a "knowledge model", which can be represented by a graph of multiple interconnected nodes. The implementation of each node involves the processing of data, and the interconnections of the graph correspond to data to be exchanged between the nodes. Typically, at least some of the processing of each node can be carried out independently of some or all others of the nodes in the graph, and therefore large graphs expose great opportunities for multi-threading. Therefore, a processing unit specialised for machine intelligence applications may comprise a large degree of multi-threading. One form of parallelism can be achieved by means of an arrangement of multiple tiles on the same chip (i.e. same die), each tile comprising its own separate respective execution unit and memory (including program memory and data memory). Thus, separate portions of program code can be run in parallel on different ones of the tiles.

In order to increase processing capacity, a plurality of processing units may be connected together to provide a scaled system. In some cases, such processing units may be connected together remotely over a packet switched network, e.g. over an Ethernet network. To provide for communications over such a network, network interface devices associated with the processing units may be provided.

In some cases, it is desirable to partition a network over which data frames are transmitted into two or more virtual local area networks (VLANs). In this case, the different VLANs are isolated from one another, creating the appearance of network traffic that is split between separate networks, but acts as if it is physically on a single network. VLANs are implemented by including VLAN tags in the headers of the data frames and providing for enforcement based on these tags.

When exchanging data frames over a VLAN, each of the network interface devices communicating over the network is assigned a media access control address (MAC address) that uniquely identifies it on in the VLAN. The MAC address is used by nodes in the network (e.g. switches and routers), which route the data frames to a destination identified by a destination MAC address in the header of the frame.

SUMMARY

Networking equipment (e.g. switches) handle network traffic according to certain defined standards (e.g. IEEE 802.1Q for Ethernet). According to such standards, the header has a predefined size and arrangement of fields, with each of the fields occupying a certain number of bits and having a given starting position in the header. In this way, a piece of networking equipment designed to operate according to the standard is designed to handle any network traffic provided in accordance with the standard. The definition of the size of the frame header and starting points of the various fields, implies that there are a limited number of bits for providing the information (e.g. MAC addresses or VLAN tags) that is required to be provided in the header.

In some cases, a network may be implemented in a large physical infrastructure having characteristics that make supporting communication using the standard field sizes in the headers challenging. For example, in some cases, the number of devices communicating within a given VLAN may make it challenging to assign unique MAC addressees to each of the devices within that VLAN, given constraints that may exist on the values of the MAC addresses. In other cases, a physical infrastructure may be divided up between a large number of tenants or between separate workloads belonging to the same tenant, thus requiring a large number of VLANs to be implemented in the same physical infrastructure. In such cases, it may be required to implement more VLANs within the physical infrastructure than the number of different possible values of the VLAN ID supported by the standard 802.1Q frame header.

According to a first aspect, there is provided a data processing apparatus configured to support transmission of frames over a network, wherein the data processing apparatus comprises processing circuitry configured to: provide at least partial headers for each of a first set of frames for sending over a first virtual local area network, wherein each of the at least partial headers for the first set of frames comprises: a destination media access control address for the respective frame; and a first virtual local area network identifier identifying the first virtual local area network; and subsequently, provide at least partial headers for each of a second set of frames for sending over a second virtual local area network, wherein each of the at least partial headers for the second set of frames comprises: a destination media access control address for the respective frame; and a second virtual local area network identifier identifying the second virtual local area network, wherein a first one or more bits at one or more bits positions in each of the at least partial headers for the first set of frames form part of the destination media access control address for the respective frame, wherein the first one or more bits have different values for at least some of the first set of frames, wherein a second one or more bits at the one or more bit positions in each of the at least partial headers for the second set of frames form part of the second virtual local area network identifier and are fixed to have the same values for all of the second set of frames sent over the second virtual local area network.

In order to meet the various requirements that may exist at different times within a physical infrastructure, the data processing apparatus supports a sliding cursor functionality between the MAC address and the VLAN identifier. For example, if the data processing apparatus is used in a system having at least one VLAN with a large number of participating network interface devices, the MAC address field can be extended by borrowing one or more bits that are usually used for representing the VLAN ID. On the other hand, if the data processing apparatus is used in a system in which a large number of separate applications are running (e.g. due to separate tenants), the VLAN field can be extended by borrowing one or more bits that are usually used for representing the MAC address. By implementing a sliding cursor in this way, the total number of bits in the frame header is not increased, and the data frames are compatible with standard switches which are configured to analyse frames and provide for enforcement on the basis of a certain number of bits in each field. When providing the headers of the frames, it is apparent when bits are allocated to the MAC address or the VLAN ID, at least since the relevant MAC address bits may between different frames, whereas the VLAN ID remains the same for the same VLAN.

According to a second aspect, there is provided a data processing system comprising: a plurality of network interface devices, each of which is configured to communicate over a physical network infrastructure with at least one other of the network interface devices, wherein the physical network infrastructure is configured to support a plurality of virtual local area networks, each of which is identified by a unique one of a set of virtual local area network identifiers, wherein a first subset of the network interface devices are configured to communicate over a first of the virtual local area networks, the first of the virtual local area networks being identified by a first of the virtual local area network identifiers, wherein each frame sent over the first of the virtual local area networks comprises a first one or more bits at one or more bits positions in a header of the respective frame and forming part of a destination media access control address for the respective frame, wherein, for at least some of the frames sent over the first of the virtual local area networks, the respective first one or more bits have different values, wherein a second subset of the network interface devices are configured to communicate over a second of the virtual local area networks, the second of the virtual local area networks being identified by a second virtual local area network identifier, wherein each frame sent over the second of the virtual local area networks comprises a second one or more bits at the one or more bits positions in a header of the respective frame, each of the second one or more bits forming part of the second of the virtual local area network identifiers and having same values in all of the frames sent over the second of the virtual local area networks.

The sliding cursor functionality is implemented across a system comprising a plurality of network interface devices. A first subset of these network interface devices communicate over a first VLAN, which uses a certain division between VLAN ID and MAC address. For example, if a large number of devices are communicating over this VLAN, additional bits may be allocated to the MAC address. A second subset of these network interface devices communicate over a second VLAN, which uses a different division between VLAN ID and MAC address. For example, if a smaller number of devices are communicating over this VLAN, fewer bits may be allocated to the MAC address, thus providing more bits for the VLAN ID and permitting the physical network infrastructure to support a larger number of VLANs if required. It is apparent from the relevant bits of the header when those bits are allocated to the MAC address or the VLAN ID, at least since the relevant MAC address bits may differ between frames, whereas the VLAN ID remains the same for the same VLAN.

According to a third aspect, there is provided a network interface device for communicating over a network, the network interface device comprising: a first register configured to store a first virtual local area network identifier identifying a first virtual local area network over which the network interface device is configured to communicate; a second register configured to store a first media access control address of the network interface device; an interface for receiving a first frame from over the network; and processing circuitry configured to: check the first virtual local area network identifier against a first plurality of bits of a header of the first frame to determine whether the first frame should be accepted; and check the first media access control address against a second plurality of bits of the header of the first frame to determine whether the first frame should be accepted, wherein a total length of the first virtual local area network identifier and the first media access control address is equal to sixty bits, wherein at least one of the first plurality of bits and the second plurality of bits belong to multiple discontiguous parts of the header of the first frame.

The network interface devices may be aware of the division between the VLAN ID and the MAC addresses for performing enforcement of traffic received from the network. The network interface device stores its MAC address and a VLAN ID identifying the VLAN over which it is configured to communicate. The network interface device checks for a match between a destination MAC in a frame and its MAC and a match between a VLAN ID in that frame and the VLAN ID for the network interface device before accepting that frame. Since the number of bits for the MAC and VLAN ID varies, these quantities will not always correspond to the fields reserved for MACs and VLAN IDs in the standard Ethernet headers. Therefore, the network interface device is, for a first frame, configured to perform the checking by comparing one of its MAC and its VLAN ID against bits from multiple discontiguous header fields. These multiple discontiguous header fields are the fields reserved for storing the destination MAC and the VLAN ID in the standard Ethernet headers. One of these fields will contain extension bits for the MAC or VLAN ID against which a check is performed.

According to a fourth aspect, there is provided a network switch comprising: a plurality of ports, wherein at least some of the ports are configured to send and receive traffic belonging to different virtual local area networks, storage comprising, for a first of the plurality of ports, a plurality of combinations of virtual local area network identifier and destination media access control address that are permitted for transmission over that port, wherein for each of the combinations, a total number of bits of the permitted virtual local area network identifier and permitted destination media access control address is the same, wherein for some of the combinations, the permitted virtual local area network identifiers comprise different numbers of bits; and processing circuitry configured to, in response to receipt of a first frame for delivery over a first of the ports: determine whether any of the permitted virtual local area network identifiers for the first of the ports are present in header of the first frame; and in response to determining that a first of the permitted virtual local network identifiers is present in the header of the first frame, examine whether a further plurality of bits in the first frame matches a permitted destination media access control address for the first of the permitted virtual local network identifiers, wherein a length of the further plurality of bits for which the examining is performed depends upon a length of the first of the permitted virtual local area network identifiers identified in the first frame.

The switches may be aware of the division between the VLAN ID and the MAC addresses for performing enforcement of traffic received for transmission over different ports of the switch. When it has a frame indicated (based on a routing table) for delivery over a certain port, it checks for a match between one of the VLAN IDs listed as being enabled for that port and the VLAN ID in the header. Upon determining a match, the switch checks for a match between the destination MAC in the frame and the MACs permitted for that port and that VLAN ID. Upon determining a match, the switch sends the frame over the port. The switch drops the frame if a match is not detected. Since the number of bits for the MAC and VLAN ID varies, these quantities will not always correspond to the fields reserved for MACs and VLAN IDs in the standard Ethernet headers. Therefore, the switch is configured to, for a first frame, perform the checking by comparing one of the indicated destination MACs and VLAN IDs against bits from multiple discontiguous header fields. These multiple discontiguous header fields are the fields reserved for storing the destination MAC and the VLAN ID in the standard Ethernet headers. One of these fields will contain extension bits for the MAC or VLAN ID against which a check is performed.

BRIEF DESCRIPTION OF DRAWINGS

To aid understanding of the present disclosure and to show how embodiments may be put into effect, reference is made by way of example to the accompanying drawings in which:

FIG. 9B illustrates an example structure of a MAC address including a generation number and derived partly on the basis of a logical identifier;

DETAILED DESCRIPTION

Embodiments of a first invention relate to the use of MAC addresses that are derivable from physical location identifiers or logical identifiers of data processing devices. Embodiments of a second invention relate to the use of a generation number in MAC addresses, where that generation number is updated in response to reset events. Embodiments of a third invention relate to moving cursor position between the VLAN ID and the MAC addresses. Embodiments of the inventions are described with respect to the accompanying drawings. These inventions may be combined and implemented together in the same apparatus or may be implemented independently.

In the following description, reference is made to a 'MAC address' and to a 'MAC'. Unless otherwise stated, these terms are to be understood as being synonymous.

Figure 1:
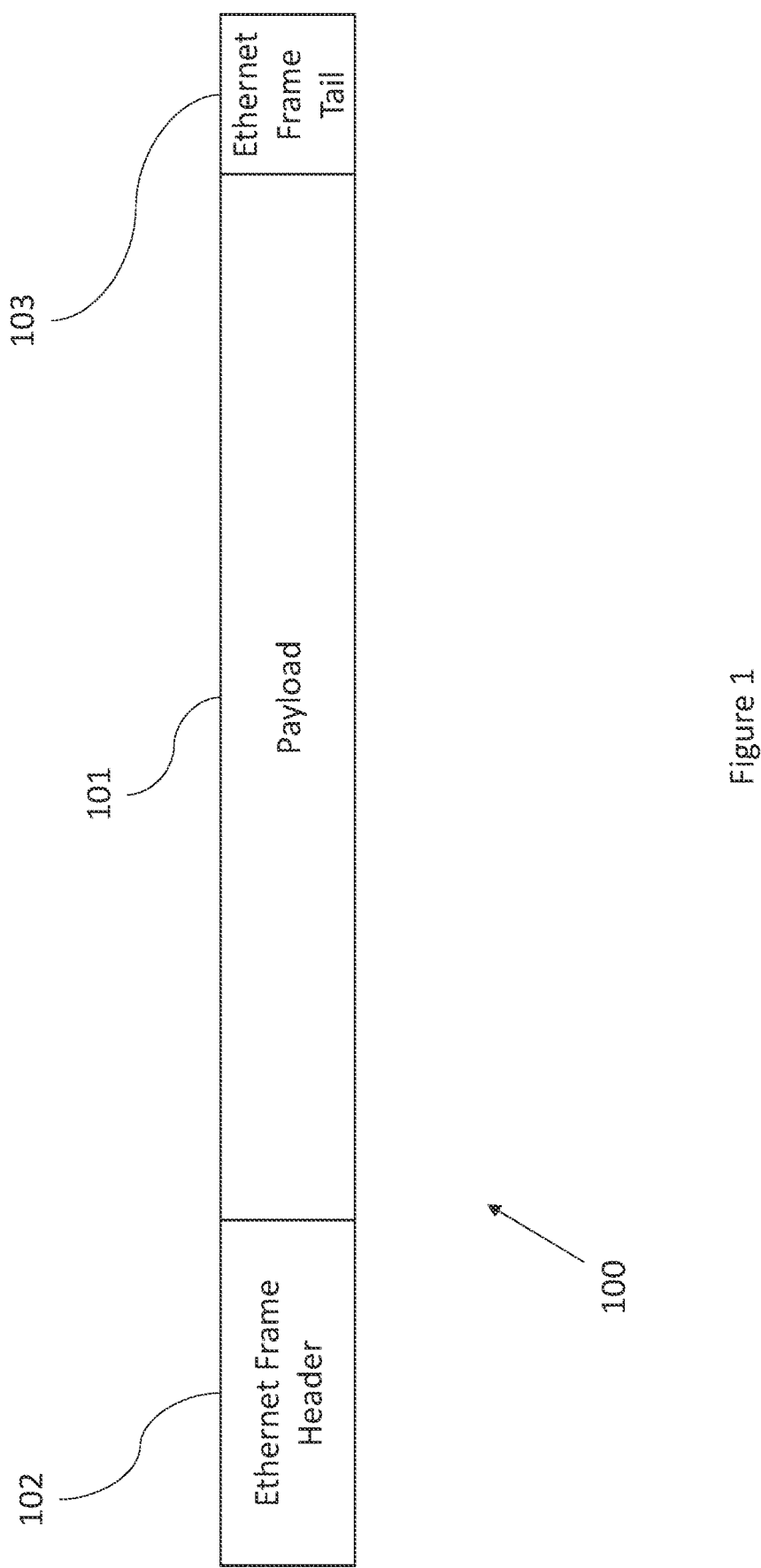
FIG. 1 illustrates the structure of an Ethernet Frame.

Reference is made to FIG. 1, which illustrates an example data frame 100. The example data frame 100 comprises a payload 101, to which is appended a frame header 102 and a frame tail 103. The data frame 100 is a link layer protocol data unit, with the header 102 and tail 103 being formed by link layer processing. In this example, the link layer protocol is Ethernet and the data frame 100 is an Ethernet data frame 100.

Figure 2:
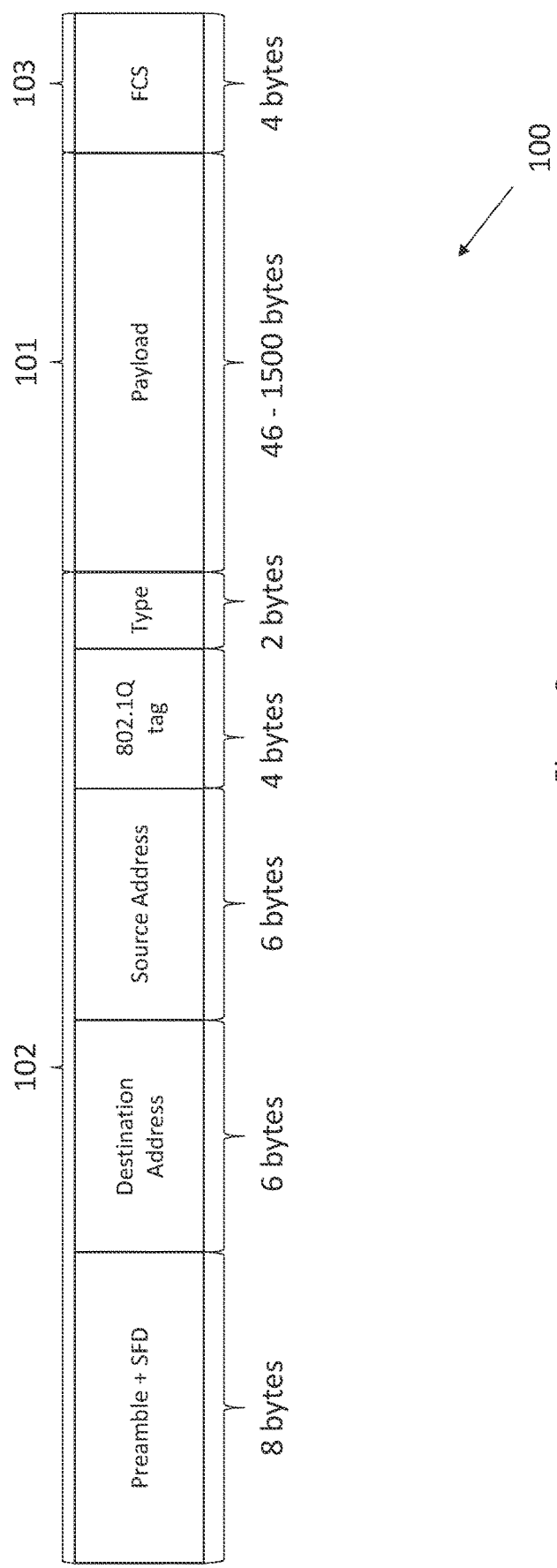
FIG. 2 illustrates the structure of an Ethernet Frame in more detail, with the standard fields of the link layer header and tail shown.

Reference is made to FIG. 2, which illustrates the header 102 and tail 103 of a standard Ethernet frame 100 in more detail.

As shown, the header 102 comprises a preamble and a start frame delimiter (SFD). This part of the frame marks the start of a new incoming frame and enables devices on the network to synchronise their receive clocks. The SFD marks the end of the preamble and indicates the beginning of the destination address.

The destination address indicates the destination network interface device to which the frame 100 is to be delivered over the network. Various switches in the network are configured to examine the destination address field to identify the endpoint to which the data frame 100 is to be delivered. The switches are configured to then route the data frame 100 to that destination. The source address identifies the network interface device on the network from which the data frame 100 originated. In the Ethernet protocol, the destination address and the source address are referred to as medium access control (MAC) addresses.

The header 102 may comprise a 802.1Q tag, which is a standard 32 bit field for supporting the division of a physical network infrastructure into multiple virtual local area networks (VLANs). The 802.1Q includes a 12 bit VLAN tag, which identifies the VLAN and enables it to be distinguished from other VLANs in the same physical network infrastructure. The 802.1Q tag also includes additional information, such as a tag protocol identifier (identifying the frame as being an 802.1Q tagged frame), and information relating to the class of service and priority level for the frame.

The header 102 comprises an indication of the type of the data frame 100. This type indication is used to indicate which protocol is encapsulated in the payload 101 of the frame 100. In the Ethernet protocol, this type indication is referred to as an Ethertype.

The tail 103 of the frame 100 comprises a frame check sequence (FCS), which is an error-detecting code that is added to the frame as part of the link layer processing. The FCS is calculated over the header 102 and the payload 101 of the frame 100. The FCS thus provides for error detection for the entire frame. When received at a network endpoint, the FCS is checked, thus providing an indication as to whether or not the frame has been received without error.

The payload 101 of the frame comprises headers of higher layers of the protocol suite in addition to application data. The structure of the payload 101 may take different forms in dependence upon the protocols encapsulated within the frame 100. For example, the data units of different layers in the payload 101 may be nested within a data unit of a lower layer of the protocol suite, with the application data being provided at the highest layer in the protocol suite. Such a nested arrangement is used for frame payloads constructed in accordance with the Internet Protocol suite, in which case the payload 101 comprises application data contained within a transport layer data unit (e.g. a TCP segment or UDP datagram), which has its own header. The transport layer data unit is itself provided as the payload of an Internet layer packet, which also has its own header.

Figure 3A:
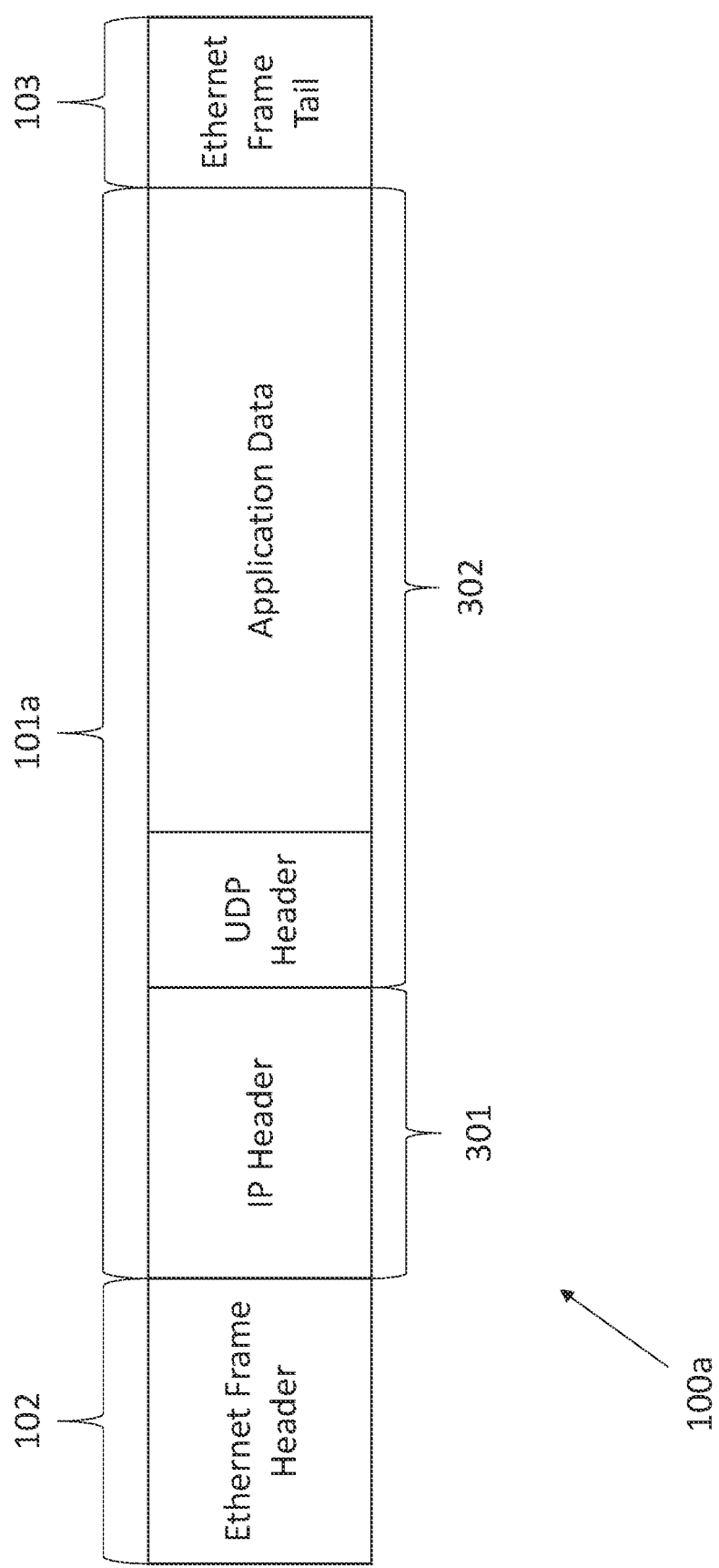
FIG. 3A illustrates the structure of an Ethernet frame in which a UDP datagram is encapsulated.

Reference is made to FIG. 3A, which shows an example data frame 100a formed in accordance with protocols belonging to the Internet Protocol Suite. The data frame 100a is an Ethernet data frame and comprises an Ethernet frame header 102 and Ethernet frame tail 103. Encapsulated within the data frame 100a is an IP (Internet Protocol) packet 101a, which constitutes the payload of the frame 100a. The IP packet 101a has an IP header 301 and an IP payload 302. The IP payload 302 in this example takes the form of a User Datagram Protocol (UDP) datagram 302, which comprises a UDP header and application data.

Embodiment of the application make use of data frames in which the frame payload comprises a number of data packets formed in accordance with a protocol used for network on chip (NoC) communication. These packets comprise headers suitable for routing of the packets to different components of an integrated circuit (i.e. a chip) over an interconnect implemented on that chip. Such packets are referred to herein as ELink packets.

Figure 3B:
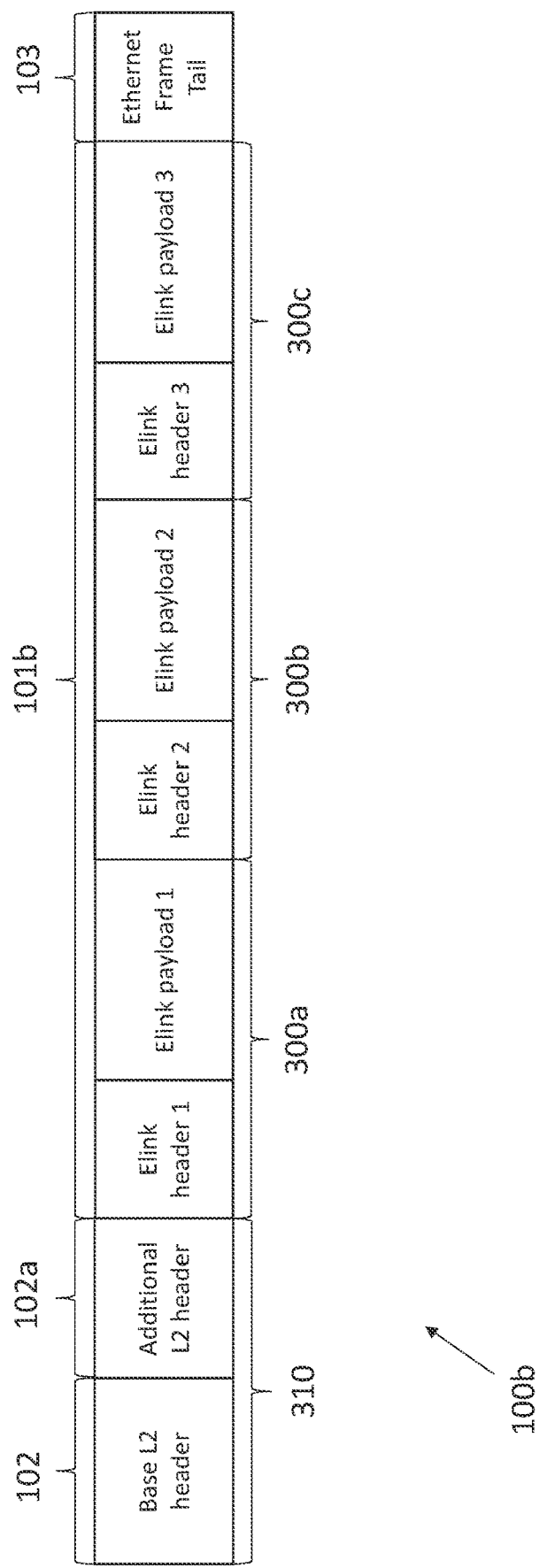
FIG. 3B illustrates the structure of a data frame in which a plurality of ELink data packets are encapsulated.

Reference is made to FIG. 3B, which shows another example data frame 100b. This example data frame 100b comprises a payload 101b comprising packets 300a-c formed in accordance with the ELink protocol used for NoC communication. The data frame 100b is an Ethernet data frame and comprises a standard Ethernet frame header 102 and Ethernet frame tail 103. In addition to the fields of the standard Ethernet frame header 102, the frame 100b also comprises one or more additional link layer header fields 102a. The presence and type of this additional header 102a is indicated by the type field (as shown in FIG. 2) in the base header 102. The one or more additional link layer header fields 102a include a sequence number for the frame 100b. The sequence number enables the sender and receiver to keep track of the frames and is used by the receiver to guarantee that frames are processed in order. The one or more additional header fields 102a may also include a virtual local area network (VLAN) identifier. The additional header 102a also includes a further type indication, which indicates the presence of and defines the type of the ELink headers in the payload 101b.

The payload 101b comprises a plurality of ELink packets 300a, 300b, 300c. Each of the ELink packets 300a, 300b, 300c comprises a header and a payload. The header comprises a plurality of fields, including a destination ID field (DEST_ID), identifying the destination device to which the respective packet is to be routed over the network. Additionally, the header comprises a field (DEST_XSEG) that identifies the component on the destination device to which the respective packet is to be provided upon reaching the destination device, and a field (DEST_ADDRESS) that identifies the location in the memory of the identified component that is targeted by the respective ELink packet. A source ID (SRC_ID) field, identifying the source device from which the packet originated, is also included in the ELink headers. The payload of an ELink packet comprises the data to be delivered to the destination component on the destination device. As shown, a plurality of ELink packets 300a, 300b, 300c are encapsulated together into a data frame for transport over the network to the same destination device.

Figure 4:
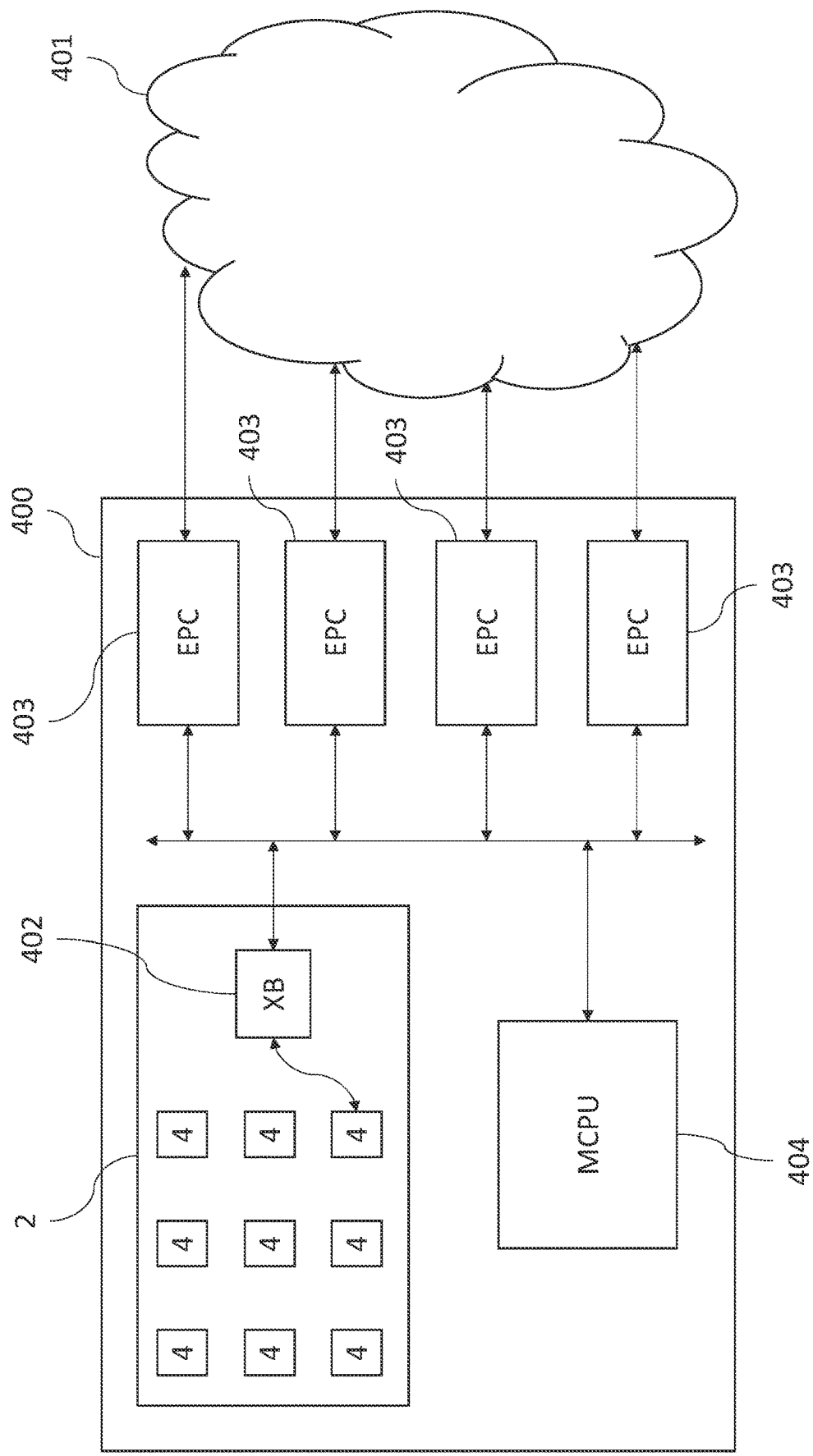
FIG. 4 illustrates a data processing device comprising a plurality of network interface devices for interfacing with a network.

Reference is made to FIG. 4, which illustrates an example of a processing device 400 for sending data over a network 401. In embodiments, the processing device 400 takes the form of a single integrated circuit (i.e. a chip).

The processing device 400 comprises data processing components that are configured to dispatch data packets over the network 401, and are configured to receive data packets from the network 401. One such data processing component is a processing unit 2. The processing unit 2 is a multi-tile processing unit 2 comprising a plurality of tiles 4. Each such tile 4 comprises its own execution unit and memory. An example of the processing unit 2 is described in more detail in our earlier application U.S. Ser. No. 16/276,834, which is incorporated by reference.

One or more of the tiles 4 are configured to send and receive data over the network 401 by exchanging data packets with a hardware module 402 (referred to herein as an exchange block) of the processing unit 2. To send data over the network 401, a tile 4 issues one or more data packets in a first format (referred to as the TLink packet format) to the hardware module 402. Circuitry of the hardware module 402 converts each of those TLink packets to the ELink packet format. The ELink packets are sent from the hardware module 402 over an interconnect of the chip 400 to a network interface device 403 (shown in FIG. 4 as an "EPC" (i.e. Ethernet Port Controller)).

The processing device 400 comprises a plurality of network interface devices 403. Each network interface device 403 is hereafter referred to as a NIC 403. Features described herein as being features of a NIC 403, may be features of any or all of the plurality of NICs 403.

These multiple NICs 403 are provided to support different connections in which the device 400 participates. In some embodiments, each NIC 403 may support up to two different connections at the same time. In some embodiments, there are 24 different NICs 403 on the same device 400. Some of the connections supported by the NICs 403 may be connections between a same pair of processing devices 400. Multiple connections may be established between such devices 400, so as to increase the bandwidth of data transfer between those two devices 400.

When the processing unit 2 has packets to send to a particular destination over the network 401, the processing unit 2 issues ELink packets to the NIC 403 that is set up to send and receive data over a connection with that particular destination. When the NIC 403 receives the ELink packets, it performs link layer protocol processing to encapsulate the ELink packets into one or more data frames and dispatches those data frames over the network 401. In this way, the ELink packets are tunneled over the Ethernet network 401 in Ethernet frames. These frames form a flow of connection traffic for which the network interface device 403 ensures reliable delivery, by retransmitting data frames if successful transmission is not verified by the destination device. An example Ethernet frame 100b forming part of the connection traffic is shown in FIG. 3B.

The NIC 403 also functions to receive data frames comprising one or more ELink packets from the network 401 for delivery to one or more tiles 4 of the processing unit 2. When a data frame in which one or more ELink packets are encapsulated is received at the NIC 403, the NIC 403 performs the required link layer protocol processing to check the data frame for errors and to extract the ELink packets. The NIC 403 then dispatches these extracted ELink packets to the hardware module 402 of the processing unit 2. The hardware module 402 converts the ELink packets to the TLink packet format and provides them to the appropriate destination tile 4 as indicated in the ELink/TLink packet headers.

The traffic transmitted between tiles 4 of different processing units 2 over the network 401 may be referred to as application traffic, since the payload contents of the ELink packets comprise application data related to the distributed application running on different processing units 2 connected over the network 401. The application data may comprise input data for calculations to be performed by execution units of destination tiles 4 to which the application data is sent and/or may comprise results of processing by source tiles 4 from which the application data is sent.

Another data processing component of the device 400 is a processing component 404, which is referred to herein as the management CPU (MCPU). The MCPU 404 is also able to send and receive data over the network 401 using the NICs 403, but via a different mechanism to that used by the processing unit 2. The MCPU 404 implements a driver functionality for sending and receiving data over the network 401 via the NICs 403 by writing partial data frames to the NICs 403. These frames may be sent and received by the MCPU 404 using any of the NICs 403 on the device 400.

In order to send data over the network 401, the MCPU 404 dispatches one or more ELink data packets over the interconnect of the device 400 to a NIC 403. The one or more ELink data packets comprise writes of data to a buffer of the NIC 403. More specifically, these ELink packets comprise writes of part of a data frame to a buffer of the NIC 403. The part of the data frame written to the buffer by the ELink packets comprises a payload and part of a frame header for the data frame. The part of the frame header written by the MCPU 404 to the NIC 403 buffer includes the destination MAC address, the source MAC address, and the EtherType fields of the frame header. After receiving and storing the payload and these parts of the frame header from the MCPU 404, the NIC 403 generates the FCS for the frame and appends this as the frame tail 103. The NIC 403 also adds the remaining parts of the frame header, i.e. the preamble and SFD. Once the NIC 403 has completed the data frame, it then causes the data frame to be dispatched over the network 401 to be sent to the destination device as identified by the destination MAC address in the frame header.

This mechanism by which the MCPU 404 sends data over the network 401 may be referred to herein as the datagram send mechanism (with the frames being referred to as datagram frames), reflecting that the data frames are provided to the NIC 403 and sent by the NIC 403 without any connection state being maintained by the NIC 403. The transport layer protocol for these frames could be UDP, with the data frames sent by the NIC 403 in accordance with the datagram send mechanism taking the form of the example data frame 100 shown in FIG. 3A. However, the protocol could be a connection based protocol (such as TCP), with the connection state being maintained outside of the NIC 403, for example, in an operating system running on the MCPU 404.

On the receive side, a datagram frame received from over the network 401 and for delivery to the MCPU 404 is stored in the NIC 403. The NIC 403 checks the frame for errors using the FCS of the frame. If the frame passes the check (i.e. no errors are detected for the frame), the NIC 403 signals the MCPU 404. In response, the MCPU 404 issues one or more read requests (in the form of ELink packets) over the interconnect of the device 400 to the NIC 403 to read the frame from a buffer in the NIC 403. This mechanism may be referred to as the datagram receive mechanism.

The datagrams may be used for a variety of purposes. One example purpose is testing, in which case the datagram frames are test data frames sent to test the connectivity of the network 401. Another purpose is connection management, in which case the datagram frames are exchanged between devices 400 so as to set up a connection between those devices 400, such that the processing units 2 of those devices 400 may exchange traffic over such a connection.

Figure 5:
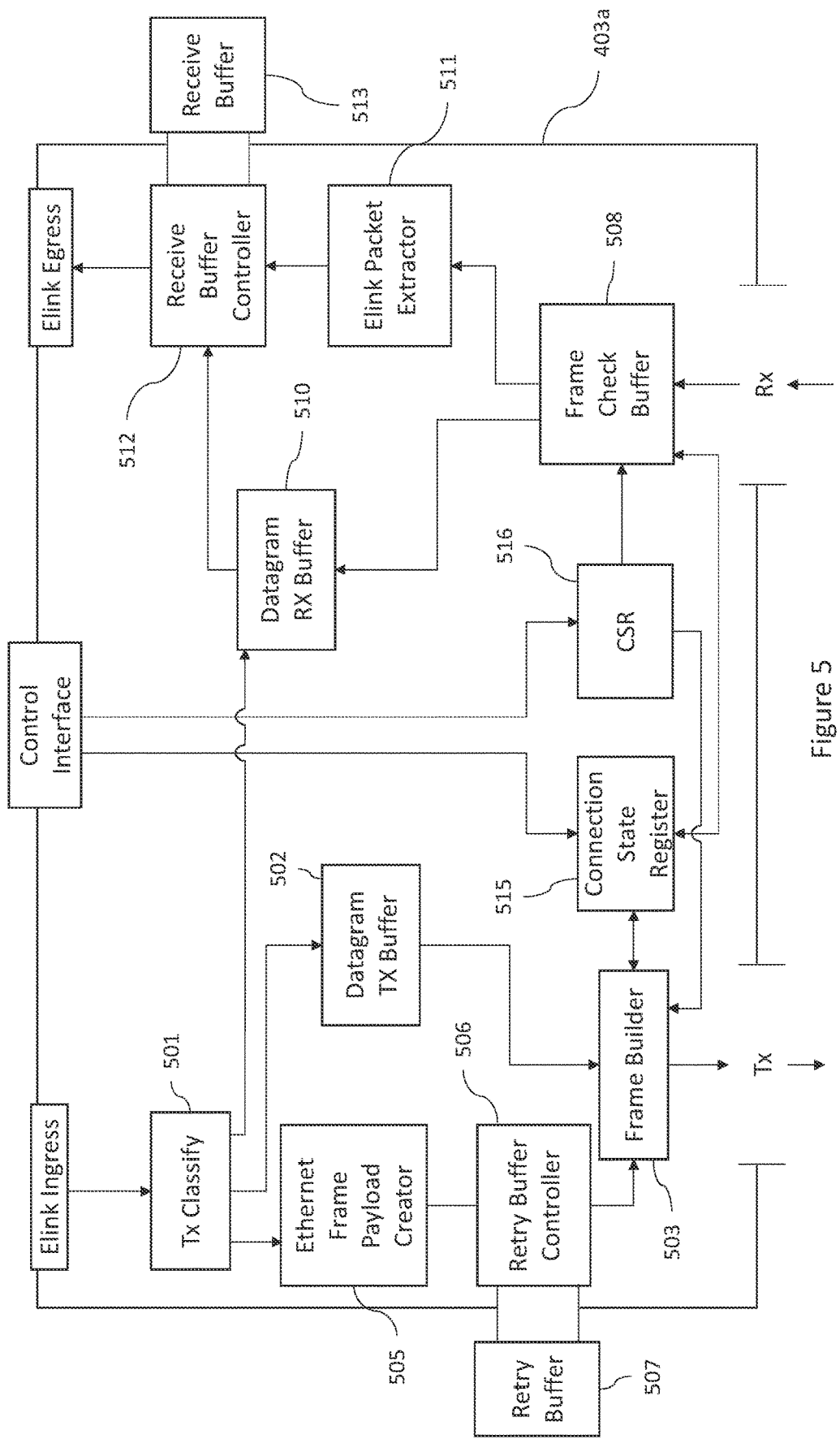
FIG. 5 illustrates the components of an example network interface device.

The operation of an example NIC 403 will now be described in more detail. Reference is made to FIG. 5, which illustrates an example of a NIC 403a. This NIC is labelled as NIC 403a to identify it specifically from amongst the plurality of NICs 403 in the system. However, it would be appreciated that the other NICs 403 (including both the NICs 403 shown in FIG. 4 and the NICs 403 belonging to other devices 400) include the same features and operate in the same way. Each of the blocks shown in FIG. 5, and described as being for performing processing operations, comprises appropriate circuitry for performing the operations described. Furthermore, the NIC 403a comprises additional circuitry, other than the blocks shown in FIG. 5, for performing any additional operations described below as being performed by the NIC 403a. References below to operations performed by the NIC 403a are to be understood as referring to operations performed by the circuitry of the NIC 403a. The circuitry of the NIC 403a may comprise one or more field programmable gate arrays (FPGA) and/or one or more application specific integrated circuits (ASIC). Additionally or alternatively, the circuitry of the NIC 403a may comprise one or more processors configured to execute computer readable instructions to perform the operations described herein as being performed by the NIC 403a or by circuitry of the NIC 403a. The circuitry of the NIC 403a may also be referred to as processing circuitry.

The NIC 403a comprises an interface (labelled as 'ELink Ingress') for receiving ELink packets from the data processing components (i.e. processing unit 2 and MCPU 404) of the device 400. These ELink packets may be writes from the MCPU 404 to the datagram transmit buffer 502 of the NIC 403a. Alternatively, the packets may be ELink packets received from the processing unit 2 and for being encapsulated and dispatched over the network 401 in a data frame.

The NIC 403a comprises circuitry (represented as Tx Classify 501 in FIG. 5) for classifying the traffic received from over the ELink ingress. Each ELink packet received at the ELink ingress port includes a destination ID field. This destination ID field indicates which component (i.e. a buffer or register) of the NIC 403a is targeted by the ELink packet. The Tx classify 501 component may, when it receives an ELink write packet, in dependence upon the indication in the ELink packet header, provide this write to either the Ethernet Frame Payload Creator 505 or to the datagram Tx buffer 502. The processing unit 2 provides the ELink write packets targeting the Ethernet Frame Payload Creator 505, whilst the MCPU 404 provides the ELink write packets targeting the Datagram Tx buffer 502.

When the Tx classify circuit 501 identifies a series of ELink packets as being writes targeting the datagram transmit buffer 502, circuitry of the NIC 403a causes the payload data in these writes to be written to the datagram TX buffer 502. The headers of these ELink packets are discarded. The payload data from the ELink packets that is written to the buffer 502 may comprise parts of any arbitary data frame. An example data frame 100a that may be partially written to the buffer 502 is shown in FIG. 3A. The parts of the data frame (i.e. the payload 101a and most of the header 102) written to the buffer 502 are provided in the payloads of a plurality of ELink packets provided by the MCPU 404.

Some of the data frames written to the buffer 502 by the MCPU 404 are test data frames for testing the connections in the network 401. Others are for dispatch to a corresponding MCPU 404 on another device, e.g. for connection management purposes. The type of partial data frame for transmission over the network 401 is indicated by the EtherType field in the header of the data frame. For example, the EtherType field may indicate that the data frame is a test data frame. Alternatively, the EtherType field may indicate that the data frame is a data frame for connection management or some other purpose (e.g. an IP packet or ARP request packet).

The NIC 403a comprises frame builder circuitry 503 that is configured to generate the FCSs for the partial data frames held in the buffer 502 and add these as the tails of the partial data frames. Additionally, the frame builder circuitry 503 completes the headers of the partial data frames by adding the preambles and the SFDs. After completing a data frame in this way, the NIC 403a causes the frame to be transmitted over the network 401.

If the Tx classify circuitry 501 identifies received ELink data packets as targeting the Ethernet frame payload creator 505, circuitry of the NIC 403a causes those received ELink data packets to be stored in a buffer associated with the Ethernet Frame Payload Creator circuitry 505. These ELink packets targeting the Ethernet Frame Payload Creator circuitry 505 are for sending over the network 401 as connection traffic. The Ethernet Frame Payload Creator circuit 505 concatenates these received ELink data packets to form a payload for a data frame. This concatenation may comprise padding one or more of the ELink packets, such that the payload of each ELink packet is a multiple of 16 bytes. The resulting Ethernet frame payload is provided to the frame builder 503, which encapsulates the payload into an Ethernet frame by adding the header and the footer. The frame builder 503 then causes the frame to be transmitted over the network 401.

The frame builder 503 obtains the destination MAC for the frame from the connection state register 515, and obtains the source MAC for the frame from the control and status register (CSR) 516. The connection state register 515 and the CSR 516 are written over the control interface by the MCPU 404. The MCPU 404 writes to these registers 515, 516, the MAC addresses for the NICs 403 which participate in an active connection supported by NIC 403*a*. One of these NICs 403 is the NIC 403*a* itself. The MCPU 404 provides the NIC 403*a* with its own MAC address by writing this MAC address to the CSR 516. The other NIC 403 participating in the connection for which the MCPU 404 provides the MAC is the NIC 403 at the other end of the connection. This MAC is stored as part of the connection state (stored in the connection state register 515) for the connection. The MCPU 404 also writes an identifier of the connection to the connection state register 515. The result is that the state associated with a connection in the connection state register 515 comprises the identifier of the connection and the MAC address for the other NIC 403 (which serves as the destination for frames sent by the NIC 403*a* over the relevant connection and the source for frames received by the NIC 403*a* over the relevant connection). The identifier of the connection is included with the ELink packets to be sent over the connection and serves to identify the correct connection state when those ELink packets are received at the NIC 403*aa*.

The frame builder 503, when it obtains the Ethernet frame payload from the Ethernet frame payload creator 505, looks up the destination MAC address required for the Ethernet header from the connection state register 515. The frame builder 503 performs this lookup by using the connection identifier provided with the ELink packets to identify the state for the connection. Once the state is identified, the MAC address stored as part of that state is loaded from the register 515 and inserted into the frame header as the destination MAC address. The frame builder 503 also obtains the MAC address of the sending NIC 403*a* from the CSR 516. This MAC address is loaded from the register 516 by the frame builder 503 and inserted into the frame header as the source MAC address.

The payload provided by the Ethernet frame payload creator 505 to the frame builder 503 is sent via a retry buffer controller 506, which comprises circuitry for storing that payload in a retry buffer 507. That payload is then available in the retry buffer 507 for retransmission, should such retransmission from the NIC 403*a* be required. The payloads sent via this mechanism are sent via a connection oriented protocol, which provides for reliable transmission by providing for retransmission using buffer 507 when frame transmission fails.

On the receive side, when a data frame is received from the network 401 at the NIC 403*a*, that data frame is provided to the frame check buffer 508. Circuitry of the NIC 403*a* checks that the destination MAC indicated in the header of the frame matches the MAC for the NIC 403*a*. The MAC for the NIC 403*a* is obtained from the CSR 516. If the destination MAC in the header of the frame does not match the MAC for the NIC 403*a*, circuitry of the NIC 403*a* discards the frame. In response to determining that the destination MAC in the header of the frame matches the MAC for the NIC 403*a*, circuity of the NIC 403*a* accepts the frame (the acceptance of the frame may also be subject to further conditions, e.g. the FCS check described below).

In addition the checking the destination MAC, circuitry of the NIC 403*a* causes the data frame to be checked using the FCS contained in the frame. If the frame does not pass the check, the circuitry discards the frame. If the frame does pass the check, the NIC 403*a* accepts the frame.

When the NIC 403*a* accepts the frame, the action taken depends upon the EtherType in the frame. If the EtherType indicates that the frame is a datagram frame, the circuitry of the NIC 403*a* causes the frame to be written to the datagram receive buffer 510. Circuitry of the NIC 403*a* then provides a signal over the control interface to the MCPU 404, indicating that a data frame is available in the buffer 510. In response, the MCPU 404 issues ELink read request packets, which are received at the ELink Ingress interface. The Tx classify circuitry 501 identifies these read request packets as targeting the datagram receive buffer 510 and consequently, circuitry of the NIC 403*a* causes the data frame held in the buffer 510 to be read out of the buffer 510 over the ELink Egress interface and provided to the MCPU 404.

If the EtherType indicates that the frame belongs to the connection traffic, circuitry of the NIC 403*a* causes an acknowledgment (ACK) that the frame was successfully received to be sent to the source device of the frame. This prevents the source device from retransmitting the frame. Additionally, that frame is provided from the Frame check buffer 508 to the ELink packet extractor circuitry 511, which extracts from the frame, the plurality of ELink packets contained in the payload of the frame. These are provided to the receive buffer controller circuit 512, which has an associated receive buffer 513 for buffering ELink packets prior to dispatch of these packets over the ELink egress interface of the NIC 403*a*. The receive buffer controller 512 causes the extracted ELink packets provided by the ELink packet extractor 511 to be sent over the interconnect of the device 400 to the processing unit 2 for delivery to one or more of the tiles 4 of that processing unit 2.

The MCPU 404 implements an address resolution function for determining the MAC addresses for including in headers of frames sent over the network 401. The MCPU 404 applies such an address resolution function for determining the MAC addresses for the connection traffic and for determining the MAC addresses used for sending frames comprising the datagrams constructed by the MCPU 404 itself.

With regard to the connection traffic, as has already been described, the MCPU 404 provides the MAC addresses for the NICs 403 that exchange data with one another over a connection, by writing these MAC addresses to registers (e.g. the connection state register 515 and the CSR 516) in the NIC 403*a*. The MCPU 404 makes use of the address resolution function in order to determine the MAC addresses for these NICs 403 before writing these determined MAC addresses to the registers in the NIC 403*a*.

With regard to the datagram traffic, the MCPU 404 implements a network protocol stack for performing the protocol processing to produce the partial frames that are written to the transmit buffer 502 in the NIC 403*a*. This protocol processing may comprise generating a UDP header and IP header for a frame, such as frame 100*a*, shown in FIG. 3A. The protocol processing includes at least link layer processing, in which the destination and source MAC addresses are obtained and provided as part of the frame header. In order to provide the network protocol stack in the MCPU 404 with the MAC addresses as required, the address resolution function provided by the MCPU 404 is made use of. The address resolution function provides the MAC addresses required by the network protocol stack, which includes them in the frame headers.

According to embodiments of the first application, the address resolution function implemented by the MCPU 404 may determine the destination MAC address without a requirement to broadcast ARP requests over the network 401. The address resolution function determines the destination MAC address in dependence upon a physical position identifier and/or logical identifier of the destination device comprising the NIC 403 to which the frame is to be dispatched.

The physical position identifier may, for example, specify the rack number of the destination device 400 comprising the destination NIC 403, and the machine number identifying that device 400 in the identified rack. As an example, the physical position identifier may take the form of: [rack 4; machine 3], which identifies the third machine in the fourth rack.

The logical identifier is an identifier used to identify the role of the device within a distributed application that may be independent of the physical position of that device. The logical identifier indicates the operations performed by the particular processing unit 2 in the context of the system. The logical identifiers are used in the application code executed on the processing unit 2 to identify devices to which data is to be dispatched.

Figure 6:
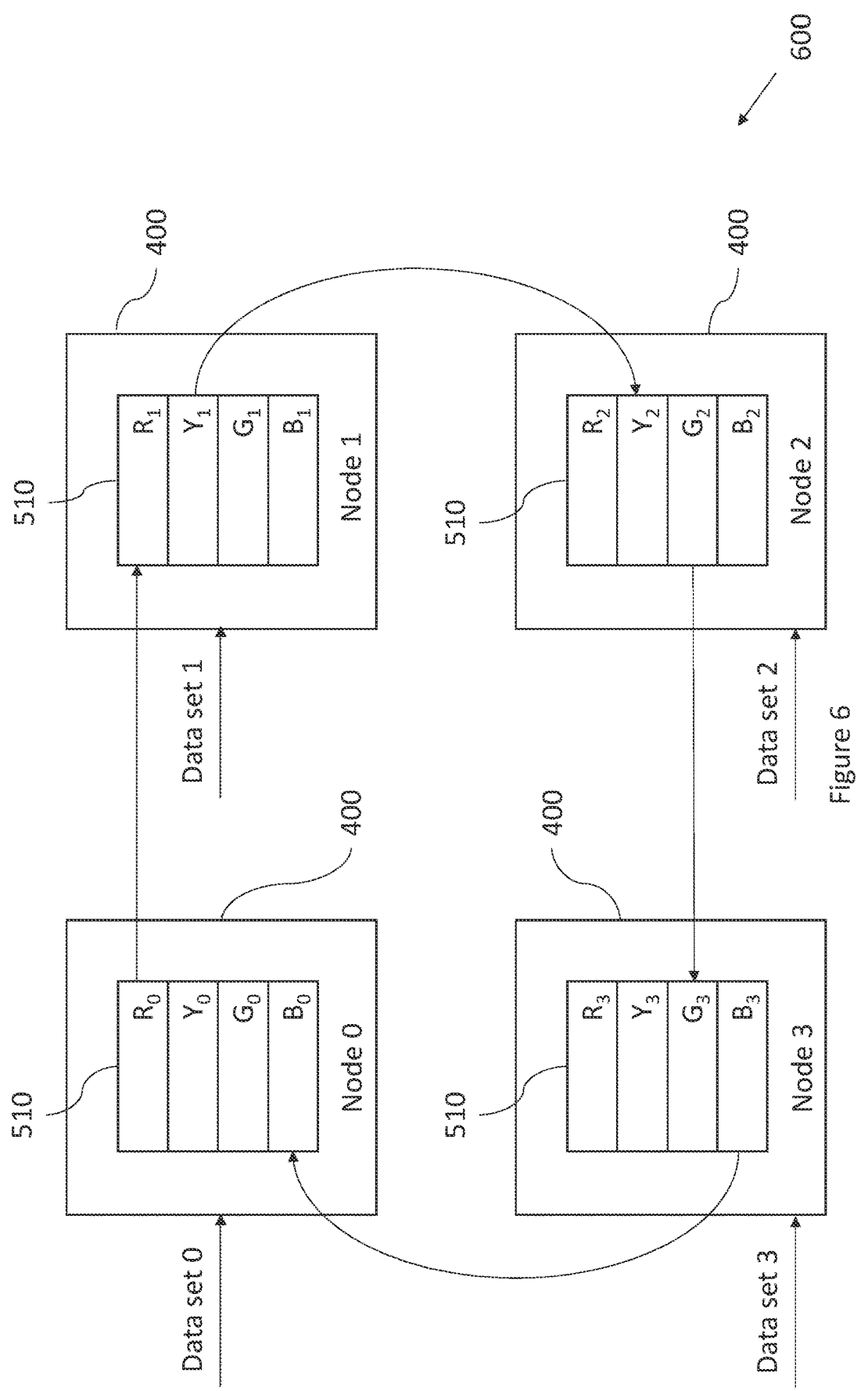
FIG. 6 illustrates an example of a data exchange pattern between different devices within a data processing system.

To give an example of a distributed application implemented on a system comprising a plurality of processing devices 400, reference is made to FIG. 6, which illustrates a system 600 comprising a plurality of devices 400. Each of the devices 400 may also be referred to as a node 400. Each of the nodes 400 is labelled with a number (e.g. node 0), which may be the logical identifier of the node 400, which indicates its role in the distributed application. The application running on the system 600 is used to perform data parallel training of a machine learning model. The processing unit 2 (not shown in FIG. 6) of each node 400 in the system 600 processes a different data set to produce a set of gradients for updating the model parameters. These gradients are labelled as R, Y, G, B in FIG. 6. In order to distribute the results of the data parallel training across the nodes, an all-reduce collective is performed. The all-reduce collective comprises a first stage (reduce-scatter) and a second stage (all-gather). As a first step of the reduce-scatter stage, each of the nodes 400 exchanges a subset of gradients corresponding to a different set of the model parameters with another one of the nodes 400. The exchange of the gradients between the devices 400 takes place over the network 401. For example, node 0 sends the gradients $R_0$ to node 1. Node 1 sends the gradients $Y_1$ to node 2. Node 2 sends the gradients $G_2$ to node 3. Node 3 sends its gradients $B_3$ to node 0. The remaining steps of the all-reduce collective are described in our earlier application, U.S. patent application Ser. No. 16/840,988, which is incorporated by reference.

It would be appreciated from the example of FIG. 6 that each of the devices 400 is required to send a different portion of its gradients to a different destination node 400 at a given stage. The particular subset of data sent by the device 400, and the destination to which that data is sent, depends upon the logical identifier of the device 400. Furthermore, when sending data to a destination device 400, the application code specifies the logical identifier of that device in the instructions executed to send data to that device 400. In some embodiments, the application code sets allocated to the devices 400 having different logical identifiers may be substantially different. In other embodiments, the code sets may comprise the same instructions, but be indexed such that different processing units 2, although operating using the same code, perform different operations at different times.

As described, in example embodiments, each of the devices 400 includes a plurality of NICs 403. Therefore, in this case, the mapping function implemented by the address resolution function also takes account of an identifier of the destination NIC 403 of the destination device 400 that distinguishes that destination NIC 403 from the other NICs 403 of the destination device 400.

In order for the address resolution function running on the MCPU 404 to derive the MAC addresses for communication over the network 401, the MCPU 404 supports application code that is configured to provide the physical position identifiers or logical identifiers to the address resolution function. The address resolution function includes a mapping function for deriving a plurality of bits of each of the MAC addresses from physical position identifiers or logical identifiers provided by the application. In the case that each of the devices 400 includes a plurality of NICs 403, the application also provides the identifiers of the NICs 403 on each of the devices 400 between which communication is to take place. The mapping function then derives the MAC addresses for those identified NICs 403 from both the physical position identifiers or logical identifiers of the devices 400 to which they belong and their NIC 403 identifiers.

Figure 7:
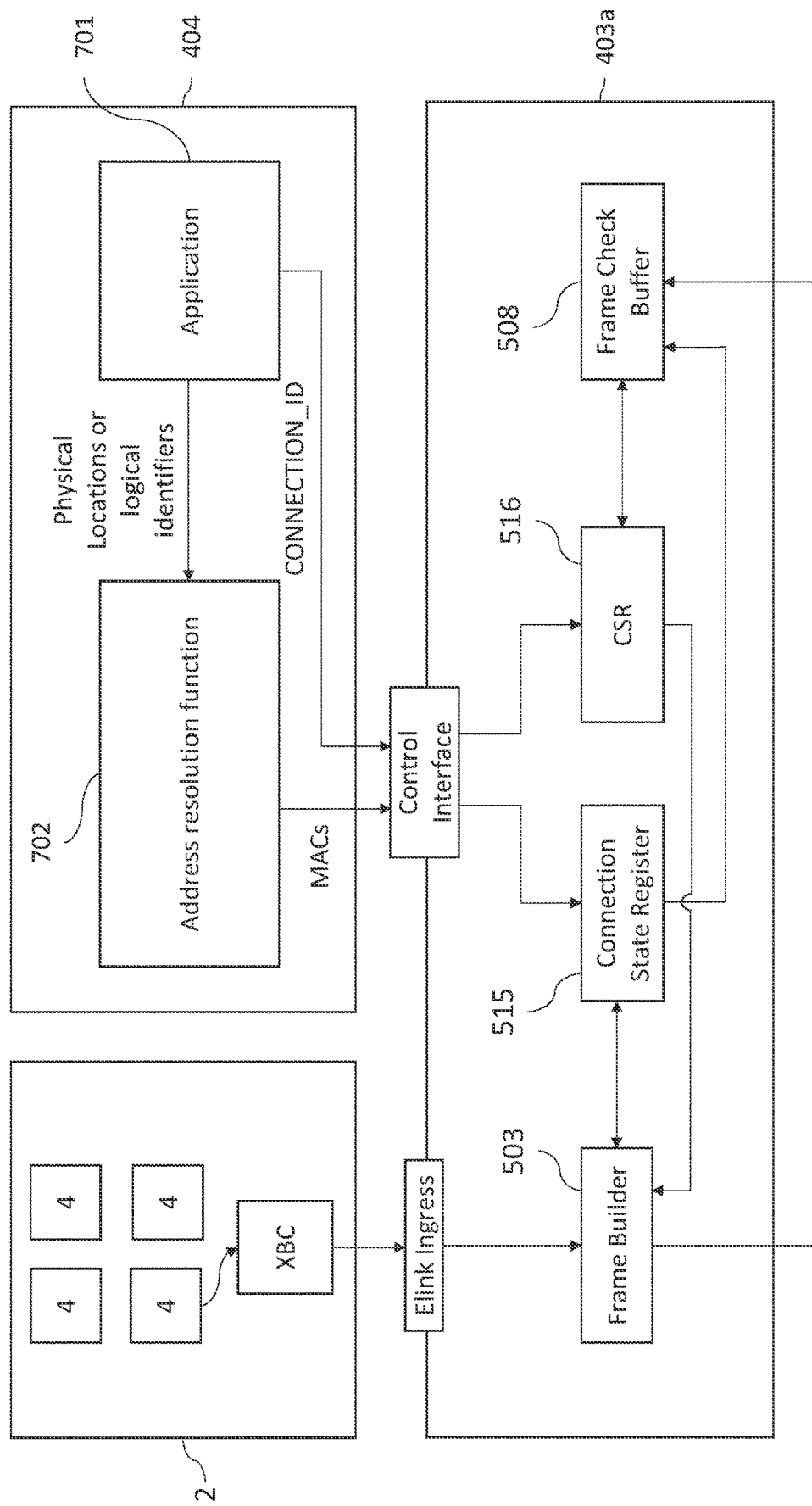
FIG. 7 illustrates the use of an address resolution function for providing the MAC addresses for a connection in dependence upon physical location identifiers or logical identifiers.

Reference is made to FIG. 7, which illustrates an example in which the MCPU 404 provides the NIC 403a with the MAC addresses to be used for a connection. These MAC addresses are the MAC addresses of the NICs 403 (including NIC 403a) at the two endpoints of the connection.

As shown in FIG. 7, at least one processor of the MCPU 404 supports an application 701 and an address resolution function 702. As part of setting up a connection over the network 401, the address resolution function 702 derives the MAC of the NIC 403a. To enable it to do so, the application 701 provides to the address resolution function 702, a physical position indication or logical identifier of the device 400 (which includes both the MPCU 404 and the NIC 403a). The address resolution function 702 applies the mapping function to the physical position indication or logical identifier to derive a plurality of bits of the MAC address. Since the device 400 comprises a plurality of NICs 403, the plurality of bits of the MAC address derived by the mapping function also depend upon an identifier of the NIC 403a that distinguishes it from the other NICs 403 of the device. This identifier of NIC 403a is also provided by the application 701 to the address resolution function 702.

The address resolution function 702 also derives the remaining bits of the MAC address. The remaining bits include a bit indicating that the MAC address is a local scope address. As will be described in more detail, the remaining bits may also include generation number, which is updated in response to reset events.

Having determined the MAC address of the NIC 403a, the MCPU 404 writes this MAC address over a control bus of the device 400 to the NIC 403a. The MAC address is received at the NIC 403a and stored in the CSR 516. As described, the frame builder 503 accesses this CSR 516 to obtain the MAC address and includes it in frame headers of frames dispatched from NIC 403a as the source MAC address. On the receive side, circuitry of the NIC 403a checks the destination MAC in received frames against the MAC address of the NIC 403a held in the CSR 516, and only accepts frames when the destination MAC of the frame matches the MAC in the CSR 516.

Additionally, as part of connection setup, the address resolution function 702 derives the MAC address of the other NIC 403 participating in the connection. This other NIC 403 participating in the connection is the NIC 403 that receives frames sent by NIC 403a over network 401 and sends frames to NIC 403a over the network 401. To derive the MAC address of this other NIC 403, the application 701 provides the physical position identifier or logical identifier of the device 400 comprising the other NIC 403 to the address mapping function 702. The address resolution function 702 applies the mapping function to the physical position indication or logical identifier to derive a plurality of bits of the MAC address. Since each device 400 comprises a plurality of NICs 403, the plurality of bits of the MAC address derived by the mapping function are also derived in dependence upon an identifier of the other NIC 403 participating in the connection that distinguishes it from the other NICs 403 of its device 400. This identifier of the other NIC 403 is also provided by the application 701. The address resolution function 702 also derives the remaining bits of the MAC address. The remaining bits may be the same as the corresponding bits (i.e. those independent of the position, logical identifier or NIC identity) of the source MAC.

Once the address resolution function 702 has determined the MAC of the other NIC 403 participating in the connection, the MCPU 404 writes this MAC over the control bus to the connection state register 515 of the NIC 403a. This MAC is stored as part of the connection state for the connection. In order for the connection state to be correctly identified when ELink packets are received at the NIC 403a, the application 701 of the MCPU 404 writes a connection identifier to the connection state register 515. The connection identifier is part of the connection state (which also includes the MAC of the other NIC 403) and enables look up of the MAC of the other NIC 403 on that device 400. Each of the ELink packets received at the NIC 403a, and for tunnelling over a connection, include the connection identifier, enabling circuitry of the NIC 403a to identify the connection state for the connection and, therefore, look up the MAC of the other NIC 403.

When the frame builder 503 receives the ELink packets for encapsulating into a frame, the frame builder 503 accesses the connection state—which is held in the connection state register 515—that is identified by the connection identifier in the ELink packets. The frame builder 503 retrieves the MAC address stored as part of this connection state and includes it as the destination MAC address in the header of the frame.

When setting up the connections, the topology implied by these connections matches that required by the application code running on the processing unit 2. To achieve this, the application 701 and the application code running on the tiles 4 of the processing unit 2 are generated as a related set at compile time. In this way, the application 701 is compiled to provide the appropriate position/logical identifiers such that the appropriate MACs are loaded into the NICs 403 of the device 400 to support communication between the appropriate devices 400 as required by the application code executing on the tiles 4.

In addition to providing the MAC addresses to the NIC 403a for connection setup, the address resolution function 702 provides the MAC addresses for the construction of frames comprising the datagrams that are produced by the MCPU 404 itself. For this purpose, the at least one processor of the MCPU 404 supports a network protocol stack that is configured to access the MAC addresses provided by the address resolution function 702. The application 701 provides the physical location identifier or the logical identifier to the network protocol stack 703, along with the data for transmission. The network protocol stack 703 obtains the MAC address of the destination that is determined by the address resolution function 702 in dependence upon the provided physical location identifier or logical identifier. In some embodiments, the mapping function is called dynamically when required by the network protocol stack 703. In other embodiments, the mapping function provides a static look up table for access by the network protocol stack 703 when required by the stack 703.

Figure 8A:
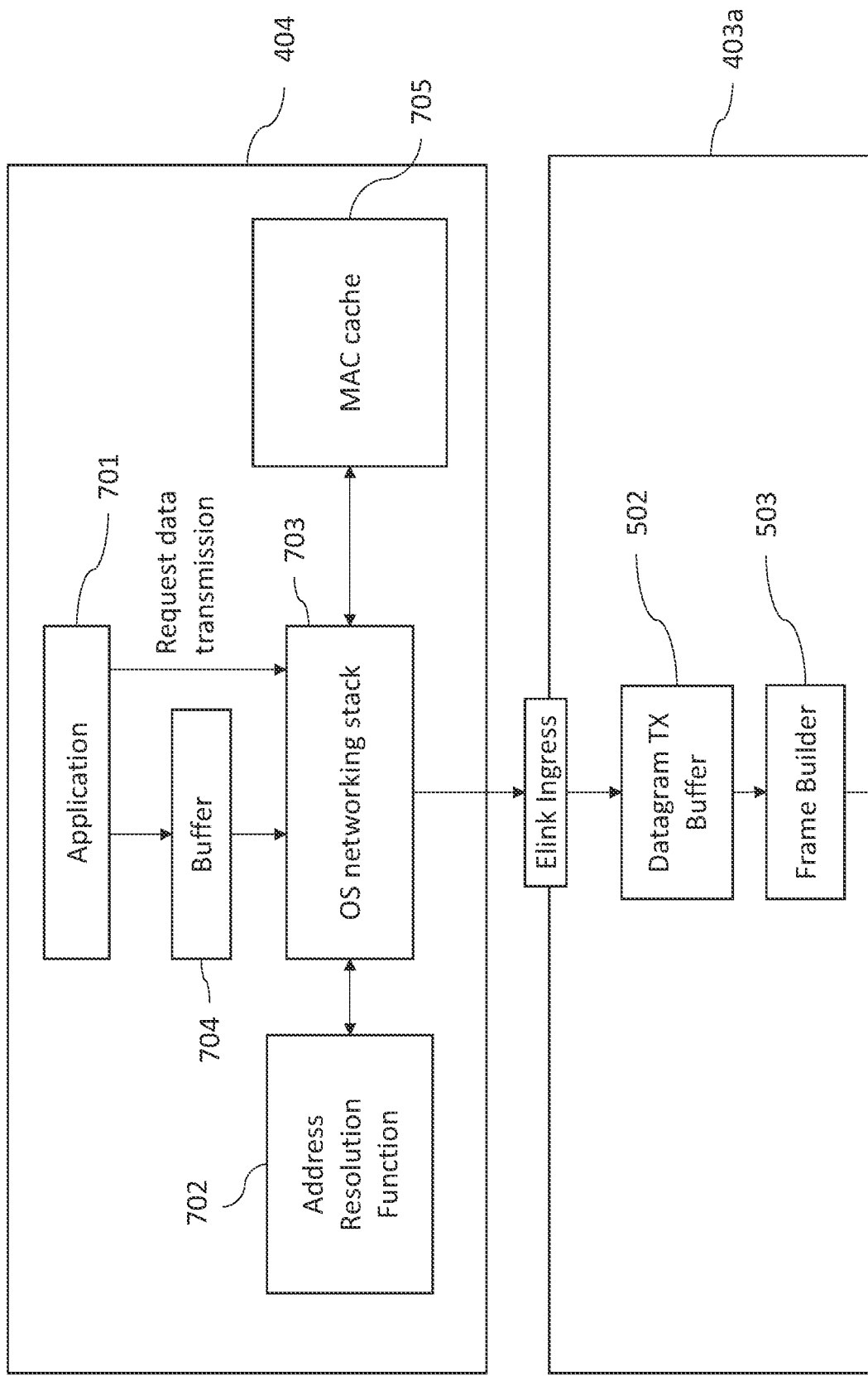
FIG. 8A illustrates the use of an address resolution function for dynamically providing MAC addresses to a networking stack for encapsulating datagram traffic for dispatch over a network.

Reference is made to FIG. 8A, which illustrates an embodiment in which the network protocol stack 703 obtains the destination MAC for a frame dynamically from the address resolution function 702.

The application 701 makes data for sending over the network 401 available to the network protocol stack 703 by storing this data in the buffer 704, which is accessible to the stack 703. The application 701 issues a request (which may take the form of a system call) to the networking stack 703 to request transmission of the data. The application 701 additionally provides the networking stack 703 with the indication of the physical location identifier or logical identifier of the device 400 to which the data is to be sent.

In response to the request from the application 701, the network stack 703 performs protocol processing in accordance with the protocol layers for which the data is be sent over the network 401. For example, the data may be encapsulated in a UDP header, with the resulting UDP datagram being encapsulated in an IP packet. As part of the protocol processing, the network stack 703 provides some of the fields of the Ethernet frame header, including the destination MAC address. In order to obtain the destination MAC address, the stack 703 first checks the cache 705 to determine whether the MAC address for the destination network interface device 403 is cached in the cache 705. If this MAC address is found in the cache 705, the stack 703 provides this as the destination MAC field of the frame header.

If the MAC address of the destination NIC 403 is not found in the cache 705, the stack 703 issues a request to the address resolution function 702 and provides with this request, the physical position identifier or logical identifier of the destination device 400 (which comprises the destination NIC 403). The address resolution function 702 implements a mapping function that maps the physical position identifier or logical identifier to a plurality of bits of the destination MAC address. The mapping function determines the plurality of bits of the MAC address in dependence upon the physical position identifier or logical identifier. The mapping function could be any suitable function such that those plurality of bits of the MAC address are predicable on the basis of the physical position or logical identifier. The plurality of bits of the MAC address represent an encoding of the physical position or logical identifier.

Once the networking stack 703 has obtained the MAC address of the destination NIC 403 from the address resolution function, this is inserted into the frame header by the networking stack 703 as the destination MAC. Processing logic of the MCPU 404 causes this MAC address to be cached in the cache 705 for subsequent access by the networking stack 703 when it is required to send further frames. The MAC address is cached in the cache 705 along with the corresponding physical position or logical identifier (and optionally the NIC 403 identifier), enabling look up of the destination MAC by the stack 703 for a further frame to be sent to the same destination NIC 403.

In addition to inserting the destination MAC address into the frame header, the network stack 703 also obtains and inserts the source MAC address into the frame header. The source MAC is the MAC address of the NIC 403a via which the frame will be sent onto the network 401. This address may be obtained in a similar manner to the destination MAC address. The stack 703 first checks the cache 705 to determine whether the MAC of NIC 403a is cached. This lookup may be performed using the identifier of the NIC 403*a* that distinguishes it from other NICs 403 of the same device 400. If the MAC is not located in cache 705, the stack requests the address resolution function 702 provide the MAC of NICs 403*a*. The stack 703 provides with this request, the physical position identifier or logical identifier of the device 400 including NIC 403*a* and includes the identifier of the NIC 403*a*. The mapping function (which is the same as the function applied to determine the destination MAC) is applied to determine the MAC of NIC 403*a*, which is inserted as the source MAC into the frame header by the stack 703. This MAC is cached in cache 705 for subsequent look up when sending further datagrams via the same NIC 403*a*.

Figure 8B:
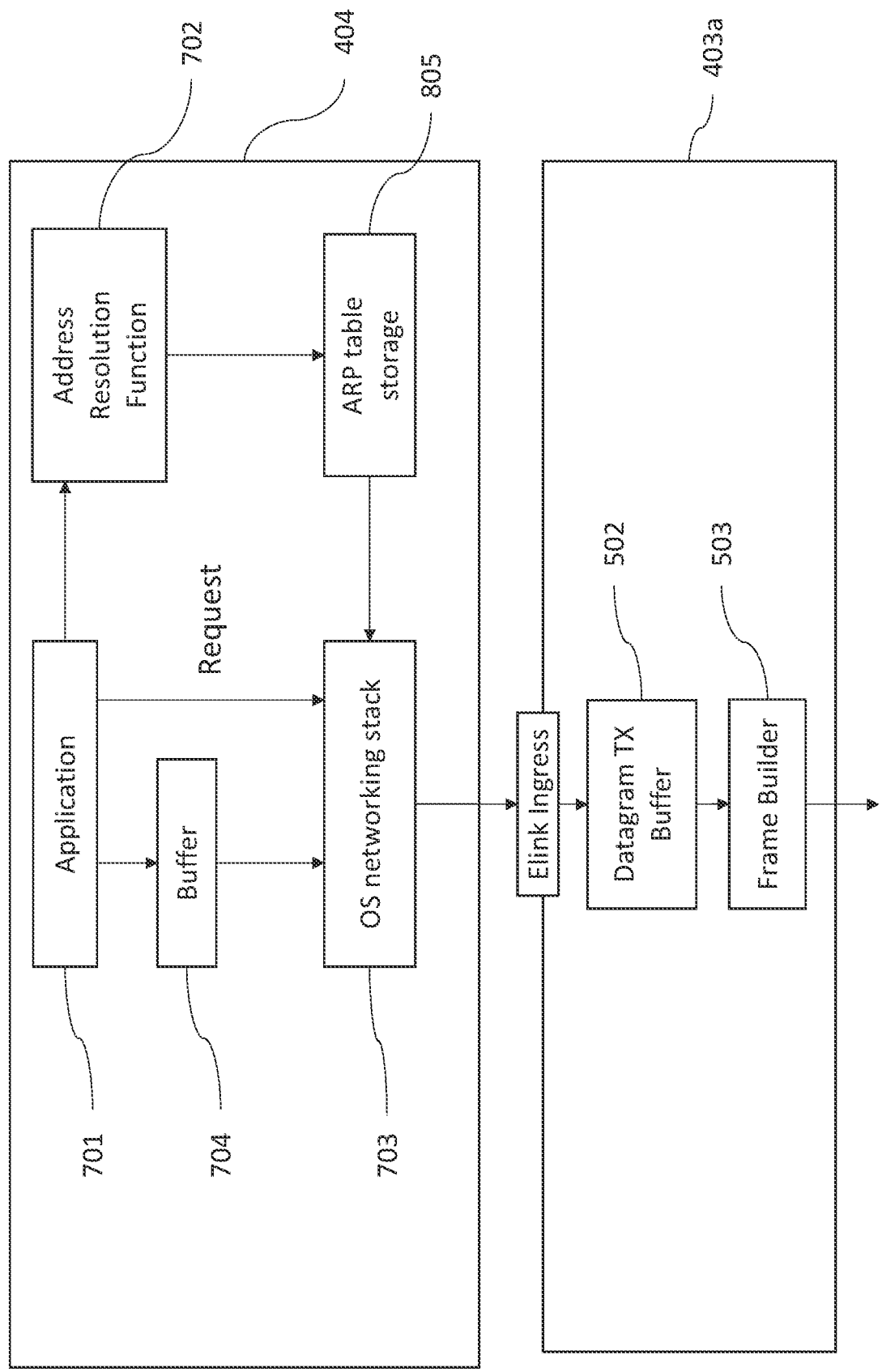
FIG. 8B illustrates the use of an address resolution function for providing MAC addresses in a static table accessible to a networking stack for encapsulating datagram traffic for dispatch over a network.

Reference is made to FIG. 8B, which illustrates an embodiment of the MCPU 404 stores a static table enabling look up of the MAC addresses by the stack 703.

The address resolution function 702 implements a mapping function (which may be the same as that described above with respect to FIG. 4) from physical position identifiers or logical identifiers to MAC addresses. In this embodiment, the address resolution function 702 implements the mapping function to populate a look up table in the storage 805. This is done prior to the issuance of requests by the application to send data over the network 401. The application provides a list of physical position identifier or logical identifiers of devices 400 to the address resolution function 702, which using the mapping function, populates the table in storage 805. The application may additionally provide with each physical position identifier or logical identifiers, a NIC 403 identifier identifying a NIC 403 of the relevant device 400 for which the MAC is to be resolved.

As in the example of FIG. 8A, when the application 701 has data to send, the application 701 stores this data in a buffer 704 accessible to the network stack 703 and issues a request to the networking stack 703. In response, the networking stack 703 performs protocol processing of the data including obtaining the destination and source MAC addresses for the frame in which the data is to be dispatched. The stack 703 obtains the destination MAC address from storage 805 by searching the look up table using the physical location identifier or logical identifier (and optionally the NIC 403 identifier) of the destination provided by the application 701. The stack 703 obtains the destination MAC address from the storage 805 and provides this as part of the frame. The stack 703 also obtains the source MAC address from storage 805 by obtaining the MAC stored for the NIC 403*a*, which may be retrieved by searching the table in storage 805 using the NIC 403*a* identifier.

Once the partial frame has been constructed by the stack 703, processing circuitry of the MCPU 404 divides the frame into several parts and provides these parts in the payloads of ELink write requests to be written to the transmit buffer 502 of NIC 403*a* for dispatch over the network 401.

FIGS. 8A and 8B illustrates various components (including an application 701, a network stack 703, and an address resolution function 702) that are provided by at least one processor. These components may be provided by software instructions executing on a processor, may be implemented in dedicated hardware (e.g. FPGA or an ASIC), or a combination of the two. Additionally, the MCPU 404 includes processing circuitry for implemented further functions, e.g. for encapsulating parts of the frame in ELink packets, other than those illustrated in FIGS. 8A and 8B.

In the examples of both FIGS. 8A and 8B, the bits of the MAC address obtained by the mapping function in dependence upon the physical position identifier or logical identifier do not include all of the bits of the MAC address. In other words, the MAC address includes further bits for which the value is independent of the physical position or logical identifier of the destination device. These further bits comprise a bit identifying whether the MAC address is a global scope address (i.e. the MAC address is globally unique) or is a local scope address (i.e. is only guaranteed to be unique on the local area network over which frames are sent using that address).

It has been described that the networking stack 703 derives the MAC addresses on the basis of a physical position identifier or logical identifier supplied by the application 701. In embodiments, the physical position identifier or logical identifier of a device 400 takes the form of the IP address of the device 400, with the IP address encoding the physical position or logical identifier of the device 400.

Figure 10:
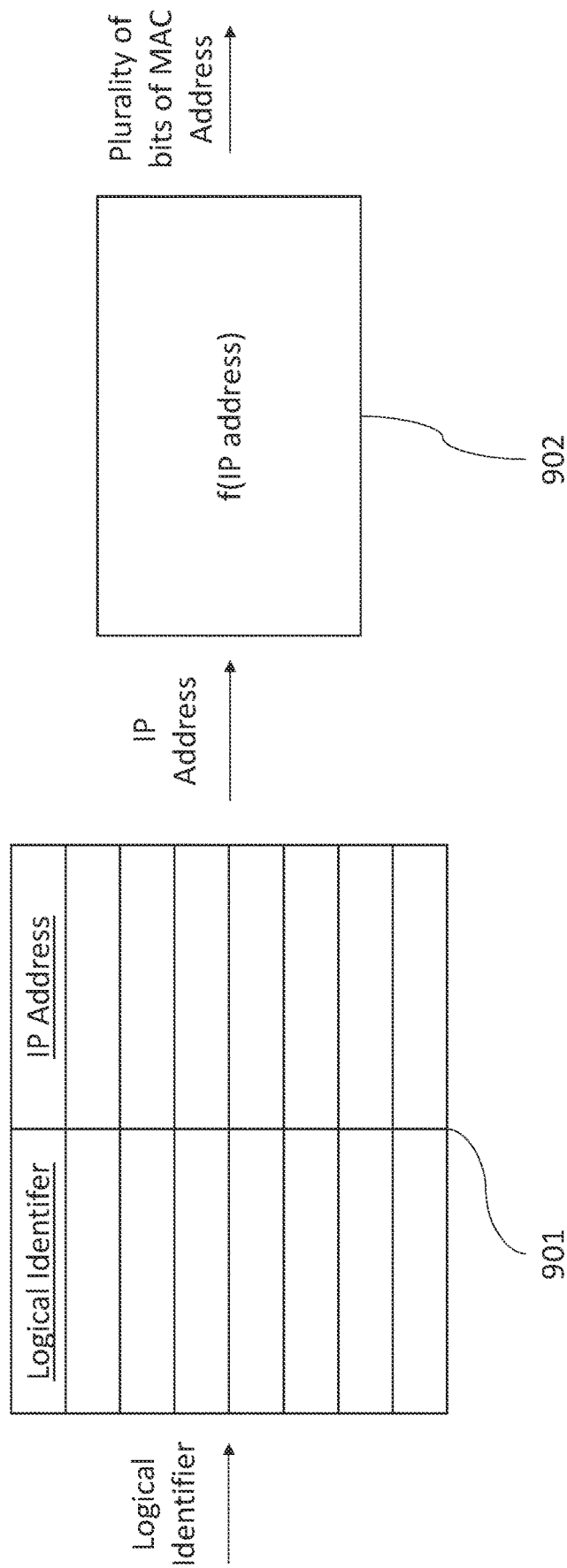
FIG. 10 illustrates an example of the look-up of a MAC address for a destination based on the IP address for that destination.

Reference is made to FIG. 10, which illustrates the translation from a logical identifier to a MAC address according to one embodiment. The application 701 provides the logical identifier of the destination to which data is to be dispatched. Processing circuitry in the MCPU 404 translates the logical identifier to the IP address. The processing performed to translate the logical identifier to the IP address may be part of the processing of the application 701 itself or may be processing performed by an additional software entity, which is also implemented by the at least one processor of the MCPU 404, that intercepts the logical identifier issued by the application 701 and passes this to the networking stack 703. This translation may be performed using the table 901 as shown in FIG. 10, in which the IP address is looked up on the basis of the logical identifier. Although in FIG. 10 the IP address is identified on the basis of the logical identifier, the IP address could comprise an encoding of the physical position of the device 400 having that IP address.

As shown in FIG. 10, the IP address is provided to the mapping function 902, which is part of the address resolution function 702. The mapping function 902 maps the physical position or logical identifier (which in this case takes the form of the IP address) to a plurality of bits of the MAC address as discussed above.

It has been described that the address resolution function 702 derives the MAC address on the basis of either a physical location identifier or a logical identifier. In the case that the physical location identifier is used, the application 701 may derive the physical location identifier of a device 400 to which data is to be sent (and therefore for which a MAC address needs to be determined) on the basis of a logical identifier of that device 400. The application may access a mapping table that maps the logical identifier to the physical location identifier. This mapping may be determined in accordance with any suitable protocol for determining the physical location identifier of the devices. Having obtained the physical location identifier for the destination device 400, the application 701 provides this to the address resolution function 702 for deriving the MAC address of the destination device 400.

According to embodiments of the second invention, one or more bits of the MACs (i.e. the source MAC and destination MAC) for a frame are reserved for distinguishing frames issued prior to a reset event from frames issued after a reset event. These one or more bits are referred to as a generation number. The generation number is updated each time a distributed application executing across the system is reset.

Figure 11:
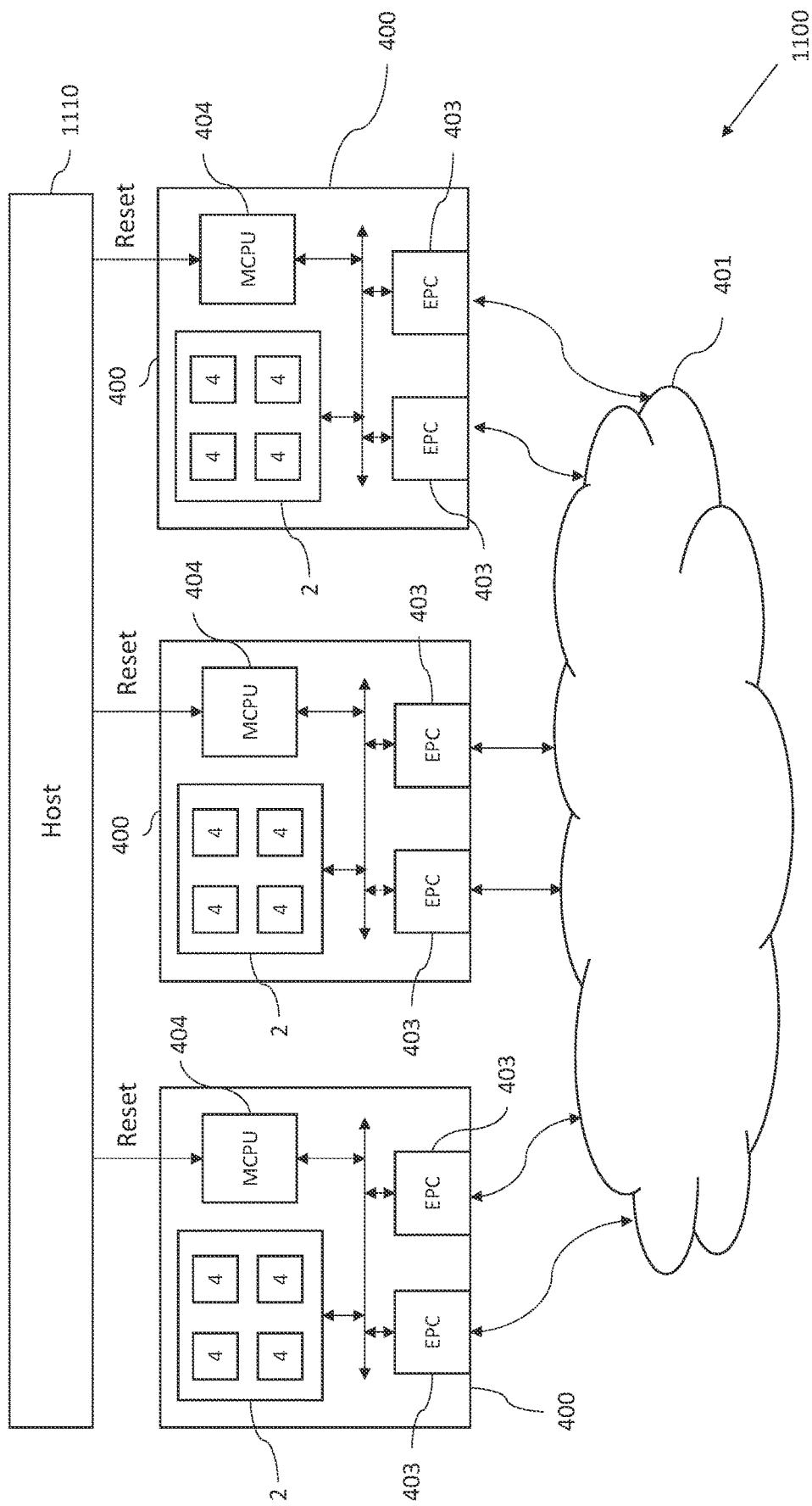
FIG. 11 illustrates a system comprising a plurality of devices being reset by a host device.

Reference is made to FIG. 11, which illustrates an example of a system 1100 comprising a plurality of devices 400. The processing units 2 of the devices are each responsible for executing part of a distributed application (not to be confused with application 702 discussed above) running across the system 1100. A first of the processing units 2 sends packets to a second of the processing units 2 by issuing ELink write requests to the NIC 403 associated with a connection established between the two devices 400 on which the processing units 2 are implemented. The NIC 403 that receives these write requests encapsulates the write requests into frames and dispatches them over the network 401 to the device 400 comprising the second processing unit 2. Hardware (e.g. switches and routers) in the network 401 routes the frames to the NIC 403 of the device 400 that comprises the second of the processing units 2. This recipient NIC 403 extracts the ELink write requests from the frames and provides these to the second of the processing units 2. The payloads of the ELink write requests are written to the memory locations identified in the ELink headers in the tile/s 4 identified in the ELink header.

A first MCPU 404 may communicate with a second MCPU 404 over the network 401 by writing a partial frame to the transmit buffer of a NIC 403 on its device 400. This sending NIC 403 causes this partial frame to be completed and then dispatched over the network 401 to a NIC 403 of the device 400 that comprises the second MCPU 404. The recipient NIC 403 of this device 400 signals the second MCPU 404, which then read the frame from a buffer of the recipient NIC 403.

At a certain point during processing of the distributed application, an uncorrectable error may be detected. Such an error may, for example, be an error occurring during processing performed by an execution unit in one of the tiles 4 or may be an error occurring when data is stored in memory of a tile 4 or elsewhere. Such an error may be a random error resulting, e.g. from ionising radiation. The error is detected by an apparatus 1110, shown as a host system 1110, which compares signatures periodically output by the devices 400. The apparatus 1110 provides an indication of a reset to the devices 400 of the system 1100. This reset indication is provided at least to the MCPUs 404. As part of the reset process, the distributed application is restarted to an earlier point. This earlier point may be the start of the application, such that the application is rerun from the beginning. Alternatively, the earlier point may be a checkpoint, in which case checkpoint data is loaded into the processing units 2 from the host 1110 to restart the application from the checkpoint.

When restarting the application, the MACs for the NICs 403 in the system 1100 are updated so as to protect the application from any stale packets in the network 401 that may have been dispatched onto the network 401 prior to the reset of the application. Such stale packets may be held in the buffers of switches and routers from which they are only output after an unusually long period of time. Additionally, there is the possibility of race conditions in which not all devices 400 in the system 1100 are reset at the same time, such that one or more devices 400 operating in a pre-reset state may output packets that could be accepted by devices 400 operating in a post-reset state. If accepted by a device 400 in the system 1100, such packets may interfere with the application processing on that device and cause errors.

To prevent such interference, the updating of the MACs for the NICs 403 in the system 1100 occurs by each of the MCPUs 404 updating one or more bits (referred to herein as the generation number) of the MAC addresses of the NICs 403 in response to reset events.

Figure 12:
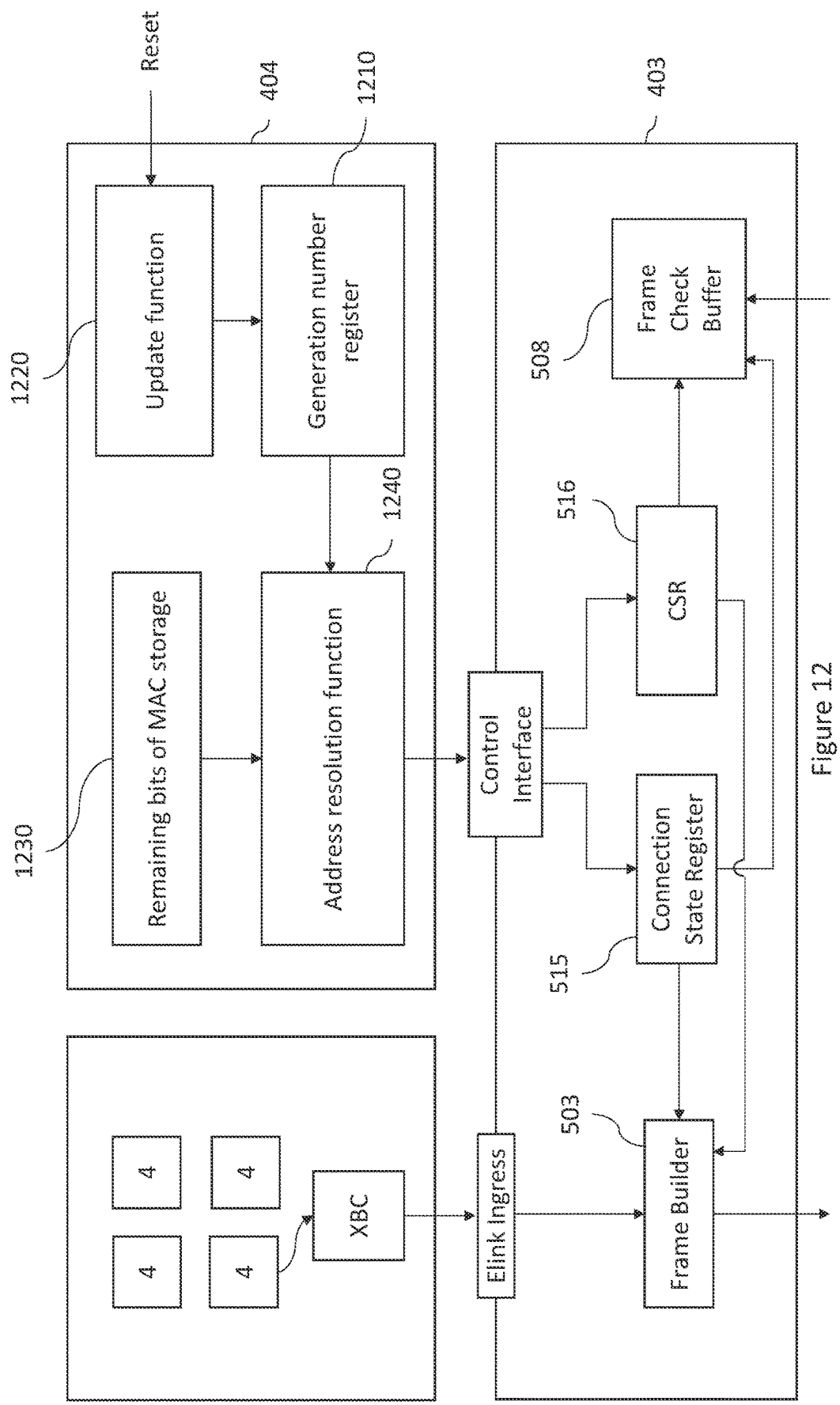
FIG. 12 illustrates the use of an address resolution function for providing updated MAC addresses in response to an update of a generation number, wherein the updated MAC addresses are for use in providing connection traffic.

Reference is made to FIG. 12, which illustrates how the MCPU 404 may update the MACs for a connection in a response to a reset event. The MCPU 404 comprises a generation number register 1210, which stores the current generation number that is provided as part of each MAC address output by the address resolution function 1240. The processing circuitry of the MCPU 404 supports an update function 1220 that updates the generation number held in the generation number register 1210.

When an indication of a reset event is received at the MCPU 404, the update function 1220 responds to this reset event by updating the value of the generation number held in the generation number register 1210. The update of the generation number held in the generation number register 1210 may comprise incrementing the current value of the generation number by one. For example, suppose that the generation number consists of five bits, with the current value of the generation number held in the register 1210 being given by the bit sequence: 00001. In response to a reset event, the update function 1220 updates the generation number by increasing the value by one to: 00010.

Since the generation number comprises a finite number of bits, in the case that the current value of the generation is equal to the maximum possible value, the updating of the generation number comprises resetting the generation number to the lowest possible value.

For example, suppose that the generation number consists of five bits, with the current value of the generation number held in the register 1210 being given by the bit sequence: 11111. In response to a reset event, the update function 1220 resets the generation number to the lowest possible value given by: 00000. Therefore, the generation number is updated by the update function 1220 in a wraparound manner.

In response to the indication of the reset event, the address resolution function 1240 determines updated MAC addresses for the connections participated in by the device 400. As noted, one or more bits are reserved in each MAC address for representing the generation number. The address resolution function 1240 sets these bits to the value of the new generation number stored in the register 1210 by the update function. The remaining bits in each MAC address are set to the same values as before the reset event.

For each MAC address, the remaining bits of that MAC address may be determined in different ways. In some embodiments, these bits may be held in a storage 1230 accessible to the address resolution function 1240 and concatenated with the bits of the new generation number to form a full MAC address. These bits held in the storage 1230 are not wiped in response to the reset event, but persist and do not change following the reset event. In this embodiment, the storage 1230 stores the remaining bits (i.e. those bits other than the bits of the generation number) for each of the MAC addresses for which the address resolution function 1240 is responsible for determining. The address resolution function 1240 provides each of these MACs by combining the same generation number with the remaining bits for the respective MAC.

In some embodiments, the address resolution function 1240 may determine the remaining bits for each MAC address by applying a mapping function to a physical position identifier or logical identifier of the device 400 comprising a NIC 403 having that MAC address. This represents an embodiment in which the first and the second invention are combined, and will be described in more detail with reference to FIGS. 14 and 15.

Figure 13:
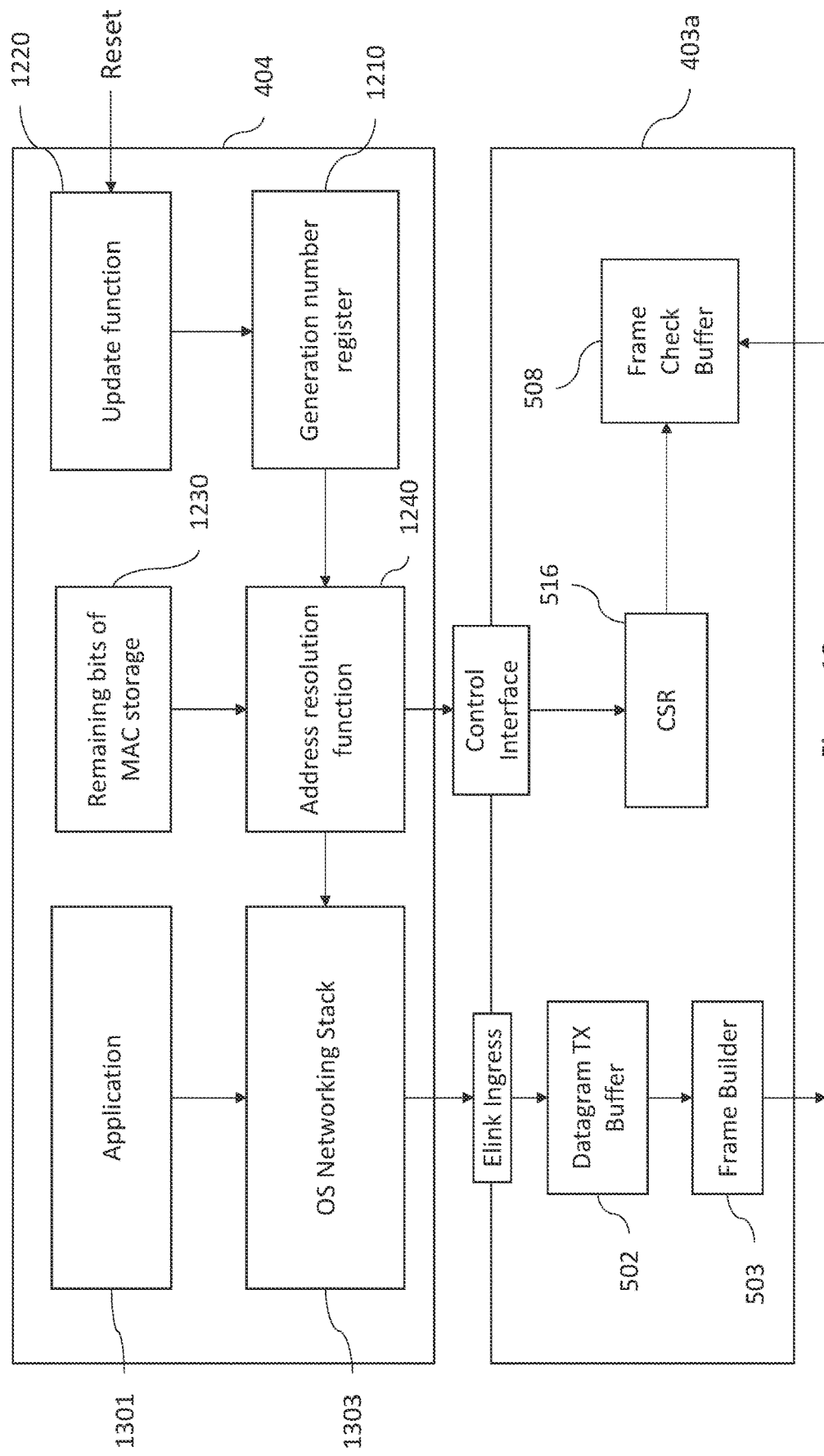
FIG. 13 illustrates the use of an address resolution function for providing updated MAC addresses in response to an update of a generation number, wherein the MAC addresses are for insertion into frames comprising datagrams.

Reference is made to FIG. 13, which illustrates how the MCPU 404 may provide MACs used for datagram traffic, wherein one or more values of those MACs depend upon the occurrence of reset events.

As shown, at least one processor of the MCPU 404 provides an application 1301, an operating system network stack 1303, and the address resolution function 1240. When the application 1301 has data to send over the network 401, it provides this data to the network stack 1303 for protocol processing. The OS network stack 1303 provides part of the Ethernet header, including the destination MAC address and the source MAC address. These MAC addresses are obtained by the stack 1303 from the address resolution function 1240. As part of each MAC address, the address resolution function 1240 provides the current generation number, which it obtains from the generation number register 1210.

For each MAC address, the remaining bits (i.e. those bits other than the generation number) may be held in a storage 1230 accessible to the address resolution function 1240 and concatenated with the bits of the new generation number to form a full MAC address. These bits held in the storage 1230 are not wiped in response to the reset event, but persist and do not change following the reset event. In this embodiment, the storage 1230 stores the remaining bits (i.e. those bits other than the bits of the generation number) for each of the MAC addresses for which the address resolution function 1240 is responsible for determining. The address resolution function 1240 provides each of these MACs by combining the same generation number with the remaining bits for the respective MAC.

To obtain the MAC addresses used as destination MAC address and source MAC addresses by the network stack 1303, the address resolution function 1240 obtains the fixed bits of each of the MAC addresses from the storage 1230. For each of the two MAC addresses, the bits obtained from the storage 1230 are each combined with the current generation number held in the generation number register 1210. The results of combining each of the two strings of fixed bits from storage 1230 with the generation number are the destination MAC and the source MAC. The destination MAC address is the MAC address of the destination NIC 403 to which the data frame is to be sent over the network 401. The source MAC address is the MAC address of the NIC 403a, shown in FIG. 13, via which the data frame is to be sent.

The address resolution function 1240 provides the source MAC and destination MAC for the data frame to the network stack 1303. In some embodiments, the address resolution function 1240 may provide these to the stack 1303 in a dynamic manner, i.e. the address resolution function 1240 may determine the MAC addresses by combined the bits from storage 1230 with the generation number 1210 when requested by the stack 1303. Alternatively, the address resolution function 1240 may provide a semi-static table in memory that is accessible to the networking stack 1303, where this table comprises the MAC addresses for the NICs 403 accessible on the network 401 for look up by the stack 1303. In this case, all of the MAC address in the table are updated by the address resolution function 1240 whenever the generation number held in register 1210 is updated by the update function 1220.

When it obtains the source MAC address and destination MAC address, the stack 1303 provides these as part of a header of the frame to be sent over the network 401. Circuitry of the MCPU 404 then causes the partial data frame to be written over an interconnect of the device 400 to the datagram transmit buffer 502 of a NIC 403a of the device 400. The frame builder 503 accesses the datagram transmit buffer 502 and completes the partial data frame, e.g. by adding the preamble and FCS, and cause the frame to be sent over the network 401.

The update function 1220 is configured to update the generation number held in the generation number register 1210 in response to a reset event. As described, the update function 1220 may update the generation number by incrementing the number or, if the number has reached its maximum value, resetting it to zero. The update of the generation number has the consequence that the address resolution function 1240 will provide the MAC addresses for subsequent data frames (i.e. those sent after the reset event) in accordance with the updated generation number. In the case that the MAC addresses are supplied to the stack 1303 by the address resolution function 1240 in a dynamic manner, the address resolution function 1240, when the stack 1303 requests the source MAC address and destination MAC address for a frame, obtains these using the updated generation number. In the case that the MAC addresses are supplied to the stack 1303 by the address resolution function 1240 using a semi-static table, in response to the update of the generation number in register 1210, the address resolution function 1240 updates all of the MAC addresses held in the table by updating the generation numbers in those MAC addresses. Subsequently, when the stack 1303 requires destination MAC addresses and source MAC addresses for data frames to be sent, these are obtained from the table and provided as part of the frame header. The fixed bits in the storage 1230 for each MAC address do not change in response to a reset event. Therefore, these same bits are used by the address resolution function 1240 when deriving the MAC addresses both before and after the reset events.

The address resolution function 1240, in addition to supplying the MAC addresses for insertion into the frame for datagram traffic, is also configured to write the source MAC address for the datagrams sent via NIC 403a to the CSR 516. This enables circuitry of the NIC 403a to check the destination MAC in received datagrams against its own MAC so as to check that they match. If the MAC of NIC 403a held in the CSR 516 does not match the destination MAC in a received frame, that received frame is not accepted by the NIC 403a. The address resolution function 1240 provides an updated MAC to be written to the CSR 516 by circuitry of the MCPU 404 whenever a reset event occurs, the updated MAC including the updated generation number. The MCPU 404 provides an updated MAC to the CSRs 516 of each of the NICs 403 of its device 400 in this manner.

Figure 14:
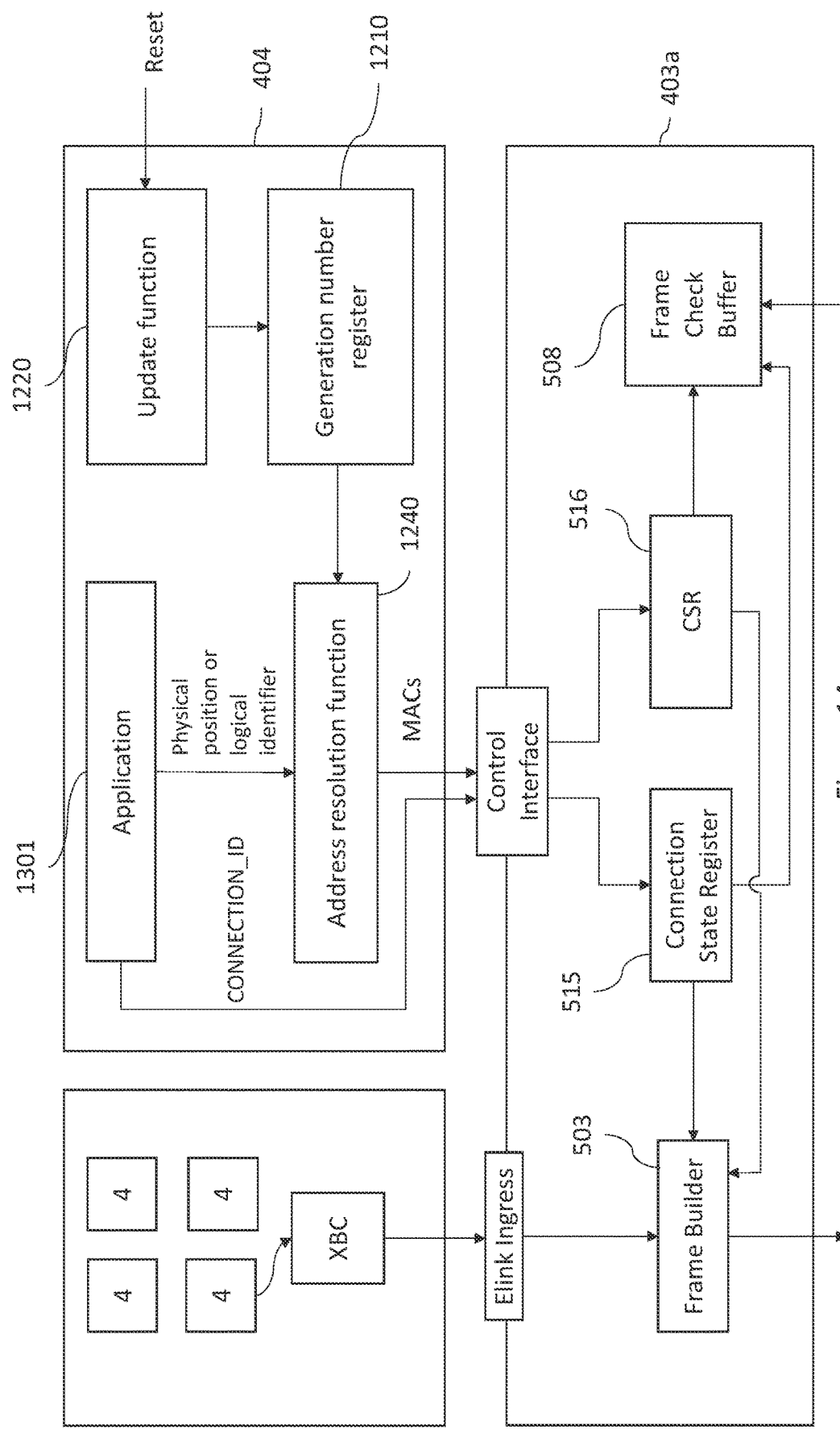
FIG. 14 illustrates the use of an address resolution function for providing MAC addresses in dependence upon physical position identifiers or logical identifiers, and in dependence upon a generation number, wherein the MAC addresses are for use in providing connection traffic.

Reference is made to FIG. 14, which illustrates an embodiment in which the first and the second invention are combined for providing the MAC addresses for connection traffic. In this case, the address resolution function 1240 determines the MAC addresses for a connection in dependence upon the physical position identifiers or logical identifiers of the devices 400 communicating over the connection, and in dependence upon the current generation number held in the register 1210.

The application 1301 provides the physical position identifier or logical identifiers of the devices 400 comprising the NICs 403 that will communicate over the connection to the address resolution function 1240. The address resolution function 1240 applies a mapping function to determine some of the bits of each of the two MAC addresses in dependence these physical positions or logical identifiers. This is performed in the manner described above with respect to FIG.

7. The address resolution function 1240 also provides as part of the two MAC addresses, a local scope indicator and bits dependent upon the NIC 403 identifiers. The remaining bits of each MAC address are the generation number, which is obtained from the generation number register 1210.

Once the MAC addresses for the connection are determined by the address resolution function 1240, circuitry of the MCPU 404 provides these over the control interface of the NIC 403*a*. The MAC address for the remote NIC 403, to which the NIC 403*a* shown in FIG. 14 sends data frames, is written to the connection state register 515. The MCPU 404 also writes the connection identifier (shown as CONNECTION_ID) to the connection state register 515. The MAC address for the NIC 403*a* is written to the CSR 516 of the NIC 403*a*. These MAC addresses are then available for use in sending and receiving data frames over the relevant connection as described above with respect to FIGS. 7 and 12.

Figure 15:
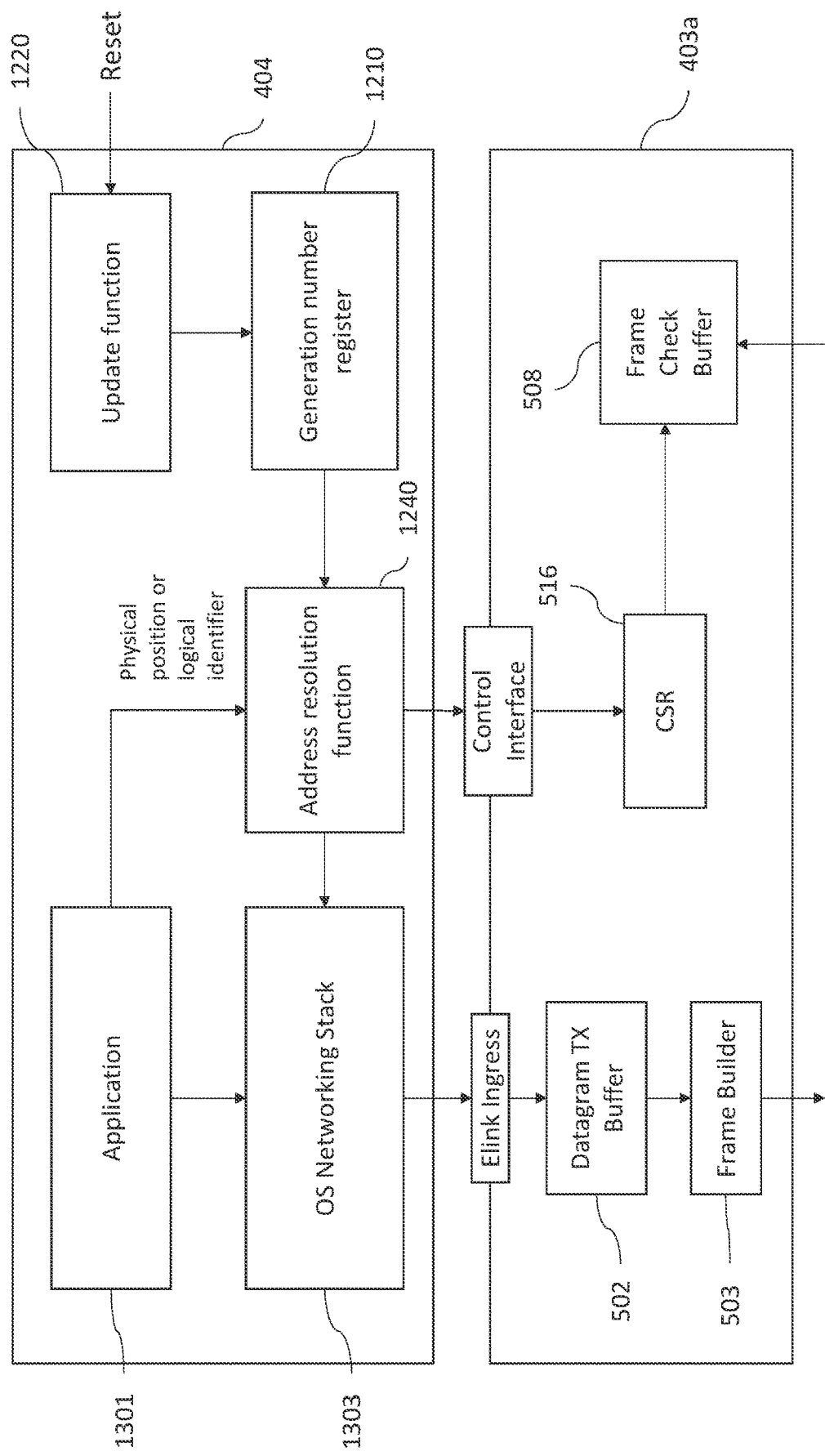
FIG. 15 illustrates the use of an address resolution function for providing MAC addresses in dependence upon physical position identifiers or logical identifiers, and in dependence upon a generation number, wherein the MAC addresses are for insertion into frames comprising datagrams.

Reference is made to FIG. 15, which illustrates an embodiment in which the first and the second invention are combined for providing datagram traffic.

In this embodiment, the address resolution function 1240 determines the MAC addresses for datagram traffic in dependence upon the physical position identifier or logical identifiers of the devices 400 comprising the NICs 403, and in dependence upon the current generation number held in the register 1210.

The application 1301 provides the physical position identifier or logical identifiers of the devices 400 comprising the NICs 403 between which a datagram is to be sent over the network 401. These may be provided to the address resolution function 1240, so that the address resolution function 1240 provides a table of MAC addresses accessible to the stack 1303 (as described above with respect to FIG. 8B). Alternatively, these may be provided to the stack 1303, which requests the corresponding MAC address from the address resolution function 1240 (as described above with respect to FIG. 8A). The address resolution function 1240 applies a mapping function to determine some of the bits of each of the two MAC addresses in dependence these physical position identifier or logical identifiers. This is performed in the manner described above with respect to FIGS. 8A and 8B. The address resolution function 1240 also provides as part of the two MAC addresses, a local scope indicator and bits dependent upon the NIC 403 identifiers. The remaining bits of each MAC address constitute the generation number, which is obtained from the generation number register 1210.

The network stack 1303 obtains the MAC addresses provided by the address resolution function 1240 and provides these as part of a partial data frame written to the buffer 502. The frame builder 503 completes the frame and causes it to be dispatched over the network 401.

In the same manner as described above with respect to FIG. 13, the address resolution function 1240 also provides the MAC of the NIC 403*a* to be written to the CSR 516 of the NIC 403*a*. In the embodiment of FIG. 15, this MAC is determined on the basis of the physical position or logical identifier of the NIC 403*a* and on the basis of the generation number from register 1210.

Figure 16:
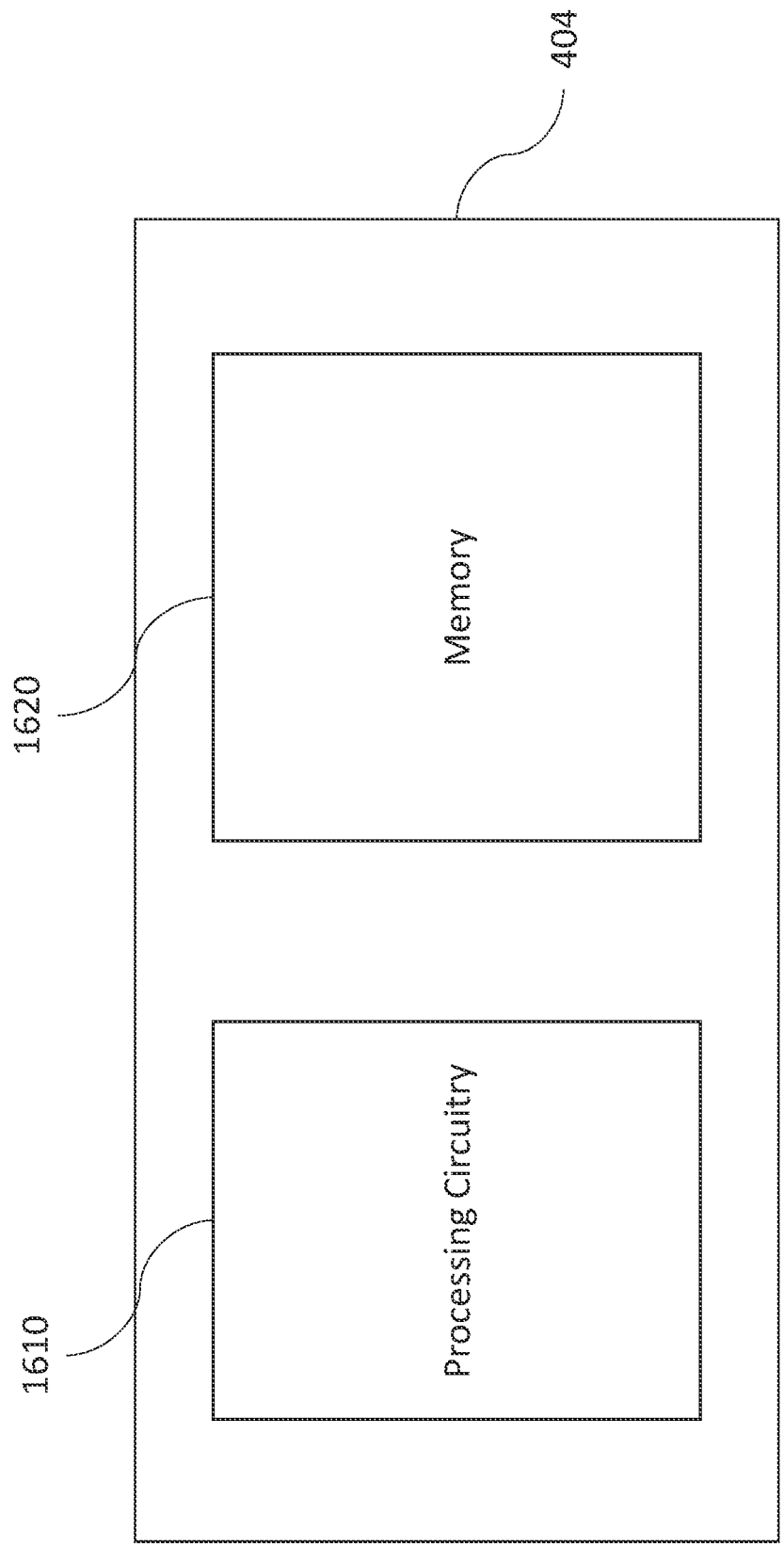
FIG. 16 is a schematic diagram of a management processor of a device.

Reference is made to FIG. 16, which illustrates an example embodiment of the MCPU 404. The MCPU 404 comprises processing circuitry 1610 and a memory 1620. The processing circuitry 1610 may comprise one or more processors configured to execute computer readable instructions stored in memory 1620. Additionally, the processing circuitry 1610 may comprise dedicated hardware, e.g. one or more field programmable gate arrays (FPGAs) or application specific integrated circuits (ASICs), for performing operations of the MCPU 404. The processing circuitry 1610 performs the operations described herein as being performed by the MCPU 404.

Embodiments have been described in which the address resolution function is implemented in the MCPU 404, which is part of the same device 400 as the NICs 403 and processing unit 2. However, in other embodiments, the address resolution function may be implemented in separate hardware.

Figure 17:
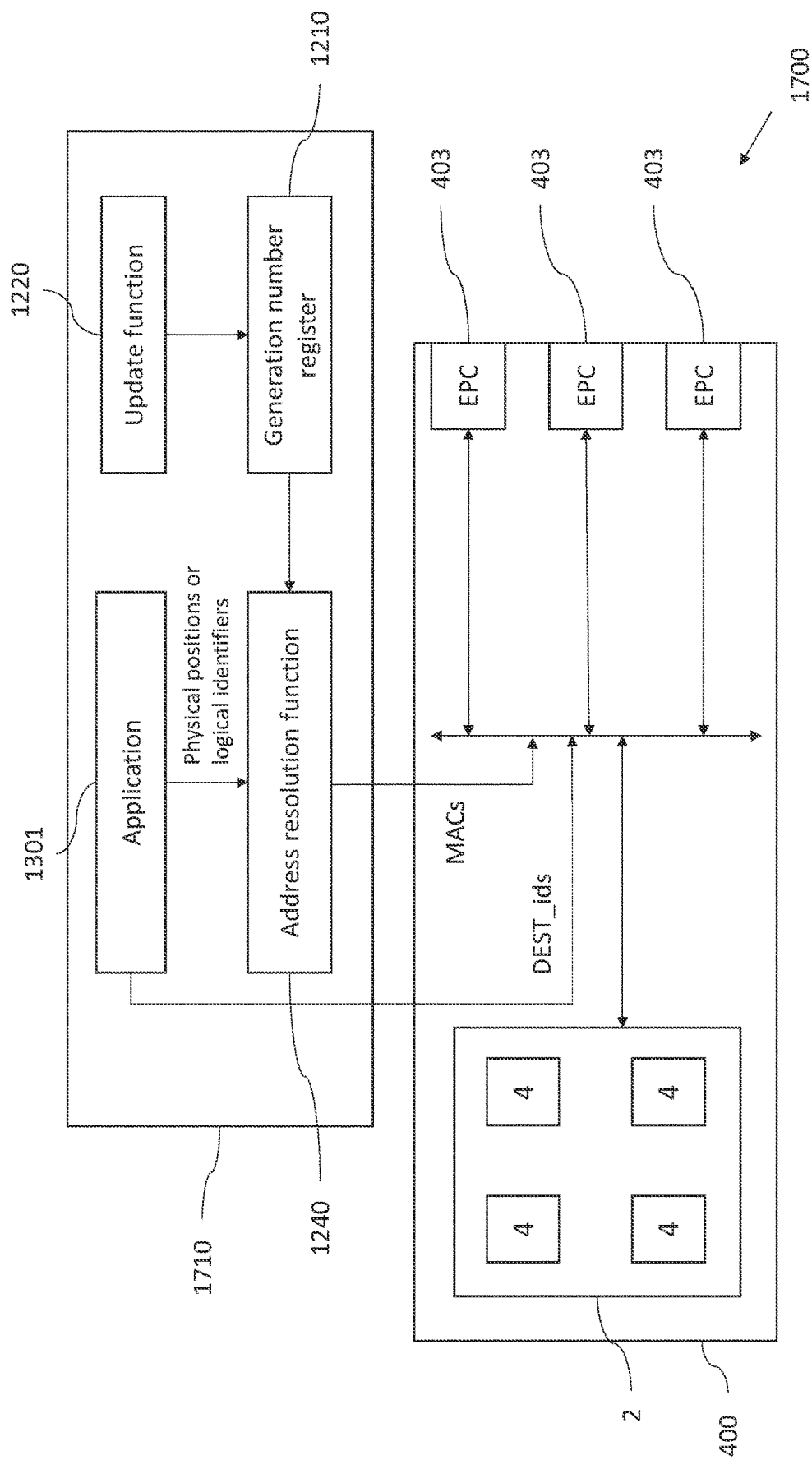
FIG. 17 illustrates a system in which the address resolution function is implemented in a device that is separate to the chip comprising the network interface devices that dispatch frames comprising the MAC addresses.

Reference is made to FIG. 17, which illustrates a system 1700 comprising the device 400 and a further device 1710. The further device 1710 comprises at least one processor supporting the application 1301, address resolution function 1240, and generation number update function 1220, which function as described above with respect to FIG. 14. The address resolution function 1240 is configured to provide to each of the NICs 403, the MACs for the connections supported by those NICs 403. Similarly, the application provides to the NICs 403, the connection identifiers for the devices on the other end of each of these connections. These operations to provide the MACs and the connection identifiers are performed for each NIC 403 in the manner described above with respect to FIG. 14 for the NIC 403*a* shown in FIG. 14. The processing unit 2 may send and receive data over the network 401 with multiple destinations using the multiple configured NICs 403.

Figure 18:
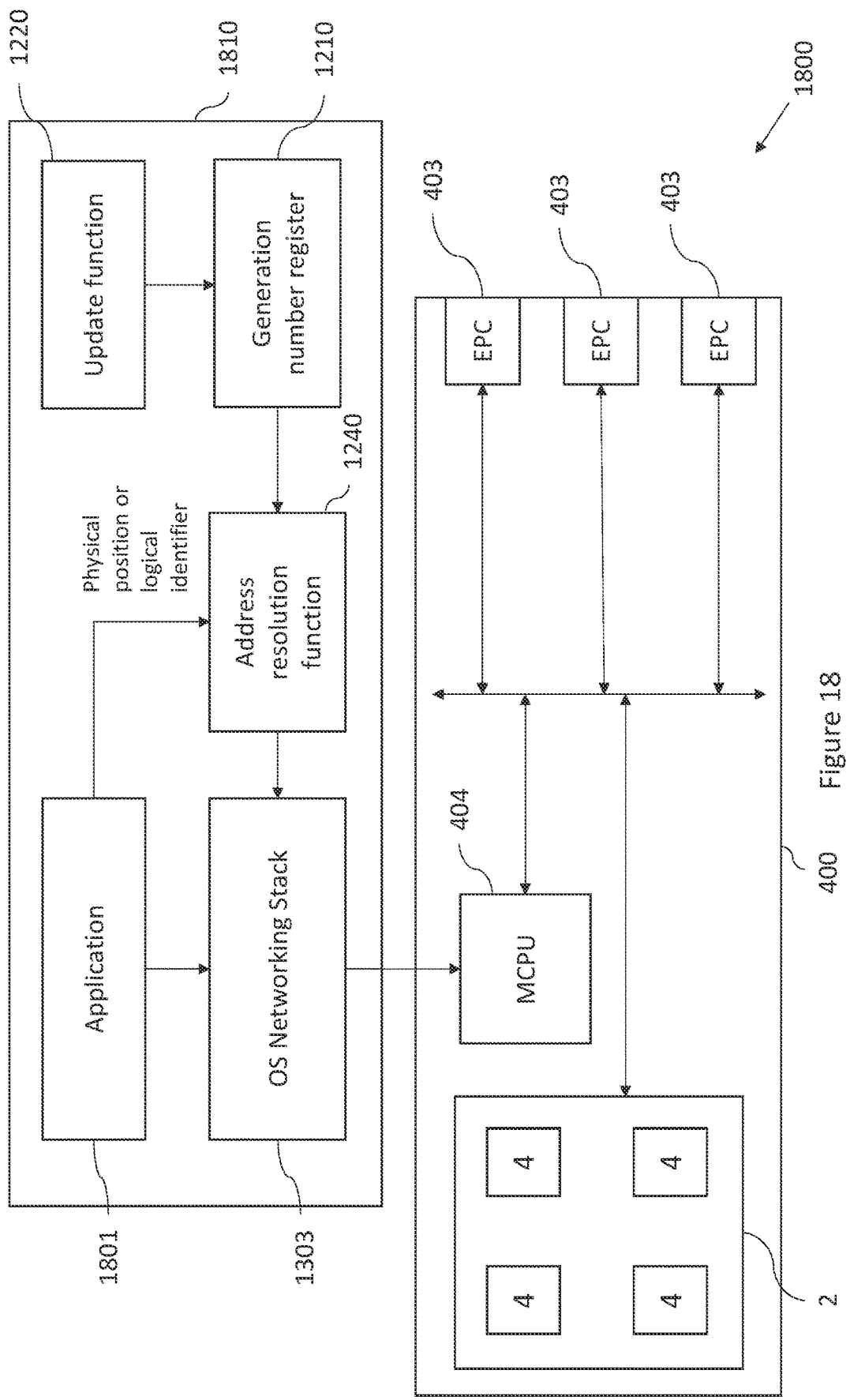
FIG. 18 illustrates a system in which the address resolution function and application are implemented in a device that is separate to the network interface devices that dispatch frames comprising the MAC addresses.

Reference is made to FIG. 18, which illustrates an example of a system 1800 comprising the device 400 and a further device 1810. The further device 1810 may be a host device, such as host 1110. The further device 1810 comprises at least one processor supporting a network stack 1303, address resolution function 1240, and generation number update function 1220. These supported components function as described above with respect to FIG. 15. The at least one processor of the further device 1810 also supports an application 1801, which may function in the same manner as application 1301 for transmitting data over the network 400. In the example of FIG. 18, the MPCU 404 acts as a hardware proxy for delivering data provided by the device 1810 to the relevant NIC 403 for transmission over network.

When the application 1801 has data to send over network 400, this data is provided to the stack 1303, which obtains the MAC addresses for the source and destination and provides a partial frame comprising the data and these MAC addresses. The partial frame is written to a buffer of the MCPU 404. The MCPU 404 then writes the partial frame to a buffer of one of the NICs 403, which causes that data to be sent over the network 400. The MCPU 404 may still support its own versions of the application 1301, network stack 1303, address resolution function 1240, and generation number update function 1220, enabling it to send datagram traffic as described above with respect to FIG. 15 in parallel with acting as a hardware proxy for the data received from further device 1810.

On the receive side, the MCPU 404 reads frames from the NICs 403 and examines those frames to determine whether the frames should be forwarded to the device 1810 or processed by the MPCU 404 itself. This determination may be made on the basis of information contained at a protocol layer that is higher than the link layer. If a frame is to be processed by the device 1810, the MPCU 404 forwards the frame to the device 1810, where it is receive protocol processed by the stack 1303 and the data contained therein delivered to the application 1801. If a frame is to be processed by the MCPU 404, the stack 1303 of the MCPU 404 performs the receive protocol processing and delivers the data contained therein to the application 1301.

Figure 9A:
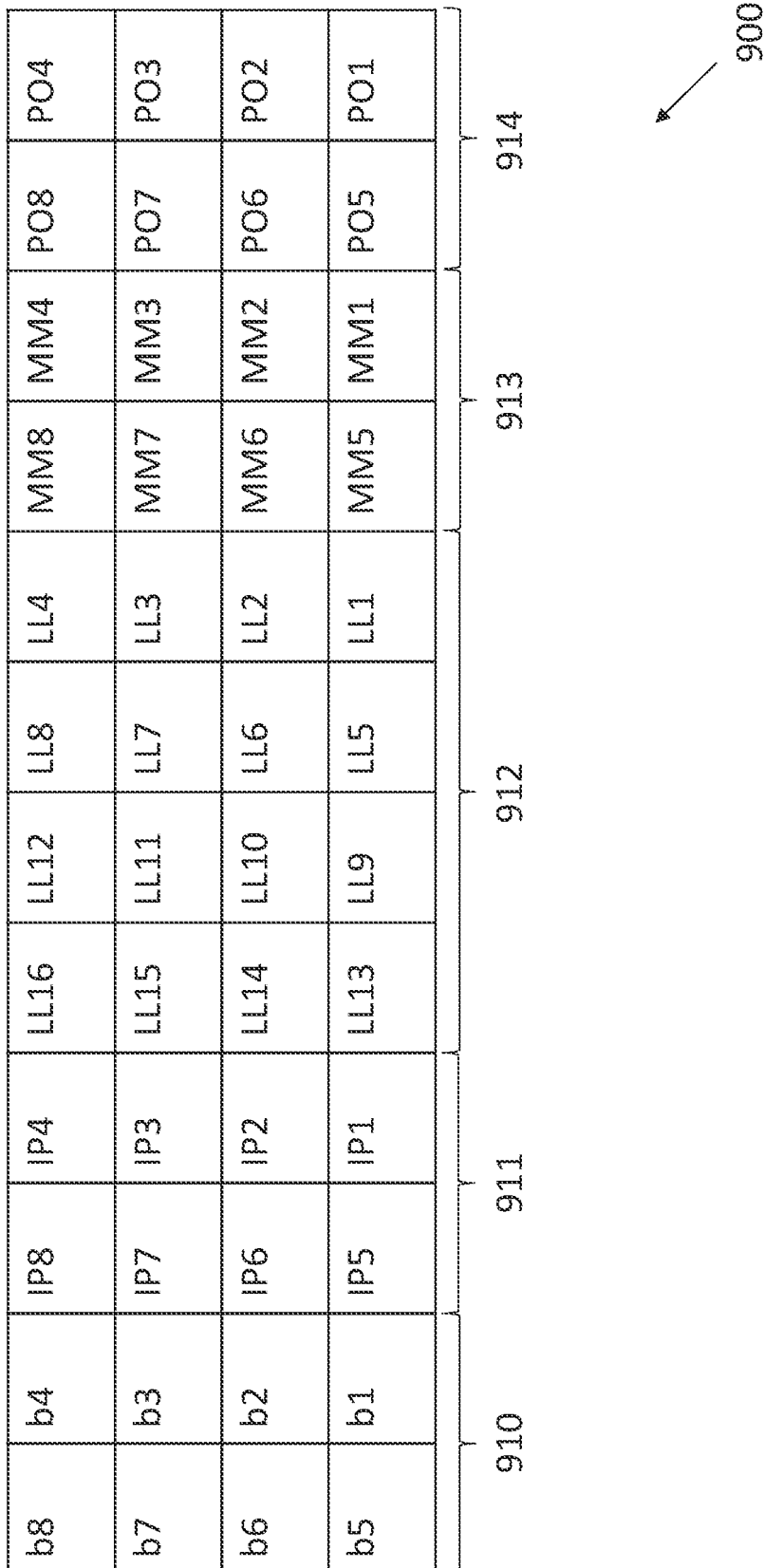
FIG. 9A illustrates an example structure of a MAC address derived partly on the basis of a physical position identifier.

Reference is made to FIG. 9A, which illustrates an example of a MAC address 900, which may be formed according to embodiments of the first invention. The MAC address 900 is MAC address for a NIC 403. The example MAC address 900 may be derived by the address resolution function applying the mapping function to a physical position identifier of a device 400 comprising the NIC 403 and an identifier of the NIC 403 on that device 400.

The MAC address 900 comprises a first octet 910 of bits. Each of these bits 910 is independent of the physical position or identifier of NIC 403 and may be used to provide additional information. For example, bits b2 indicates that the MAC address is a local scope MAC address. Bit b1 indicates whether the MAC address is a unicast MAC address.

The MAC address comprises a second octet 911 of bits. These bits 911 identify a pod (i.e. a collection of racks) to which the NIC 403 having the MAC 900 is defined. The bits 912 form a rack number, identifying a rack to which the NIC 403 having the MAC 900 belongs. The bits 913 identify a device 400 within the identified rack. The bits 914 form a NIC identifier and server to distinguish the NIC 403 having the MAC 900 from other ones of the plurality of NICs 403 on the device 400 that is identified by the bits 913.

Figure 9B:
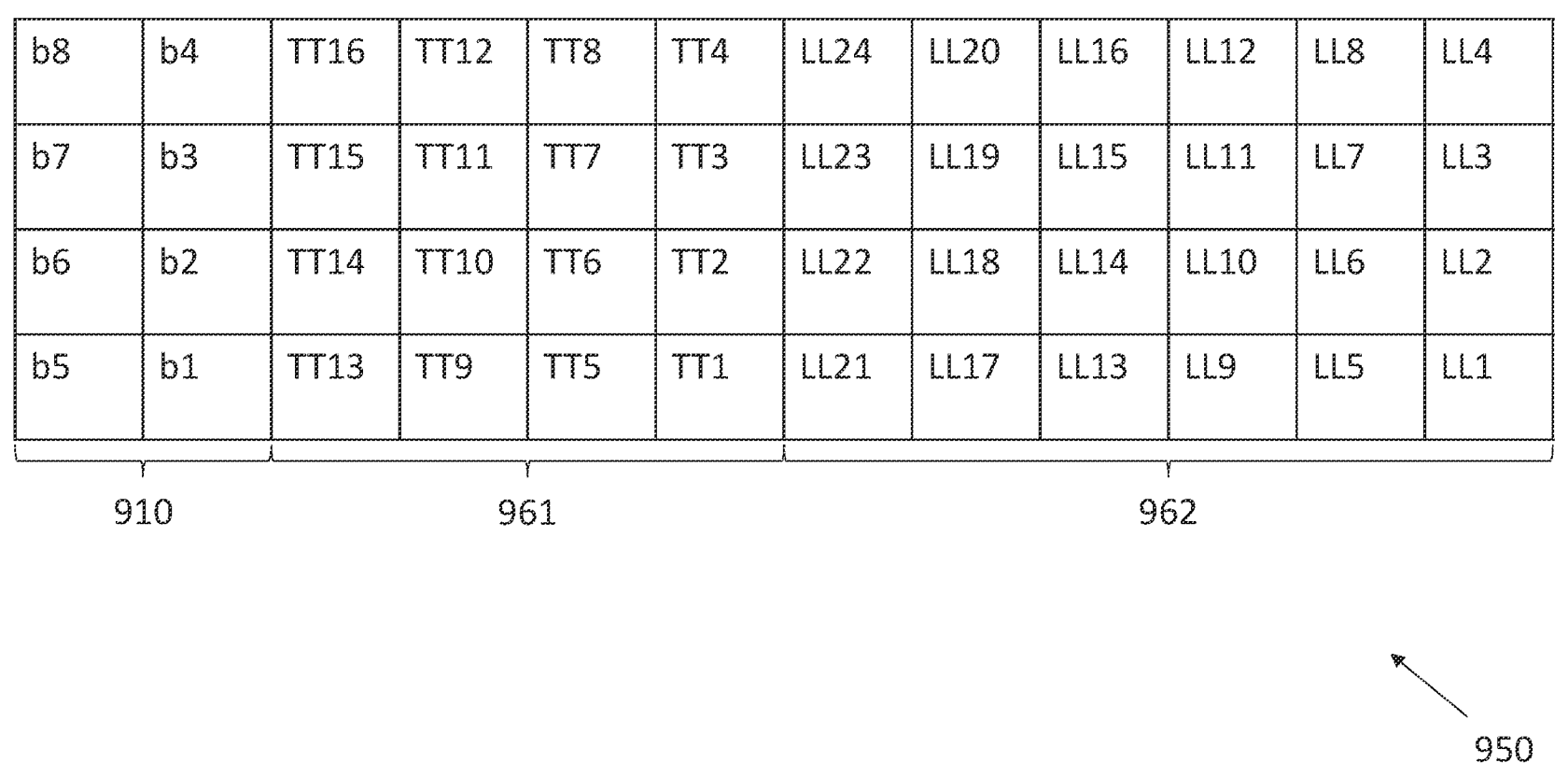

Reference is made to FIG. 9B, which illustrates an example of a MAC address 950, which may be formed according to embodiments of both the first and second invention. The MAC address 950 is a MAC address for a NIC 403.

The MAC address 950 comprises a first octet 910 of bits. This first octet 910 may be identical to the first octet 910 of the MAC address 900 described above. The bits 910 are independent of the generation number and the position or logical identical identity of the device 400 comprising the NIC 403 having the MAC address 950.

The MAC address 950 comprises a set of bits 961, referred to as the GSD tag number. In embodiments, five of the 16 bits of the GSD tag number constitute the generation number, which is updated in response to reset events. The remaining 11 bits of the GSD tag number form a job identifier, which is updated for each job run on the system of devices 400.

The MAC address 950 comprises a further set of bits 962, referred to as the logical port number. The logical port number identifies the NIC 403 having the MAC 950 from amongst all of the NICs 403 of the system on which the application runs. The logical port number is derived by the address resolution function on the basis of the logical identifier of the device 400 to which the NIC 403 having the MAC 950 belongs and on the basis of an identifier of the NIC 403 that distinguishes that NIC 403 from other NICs 403 belonging to the same device 400.

Figure 19:
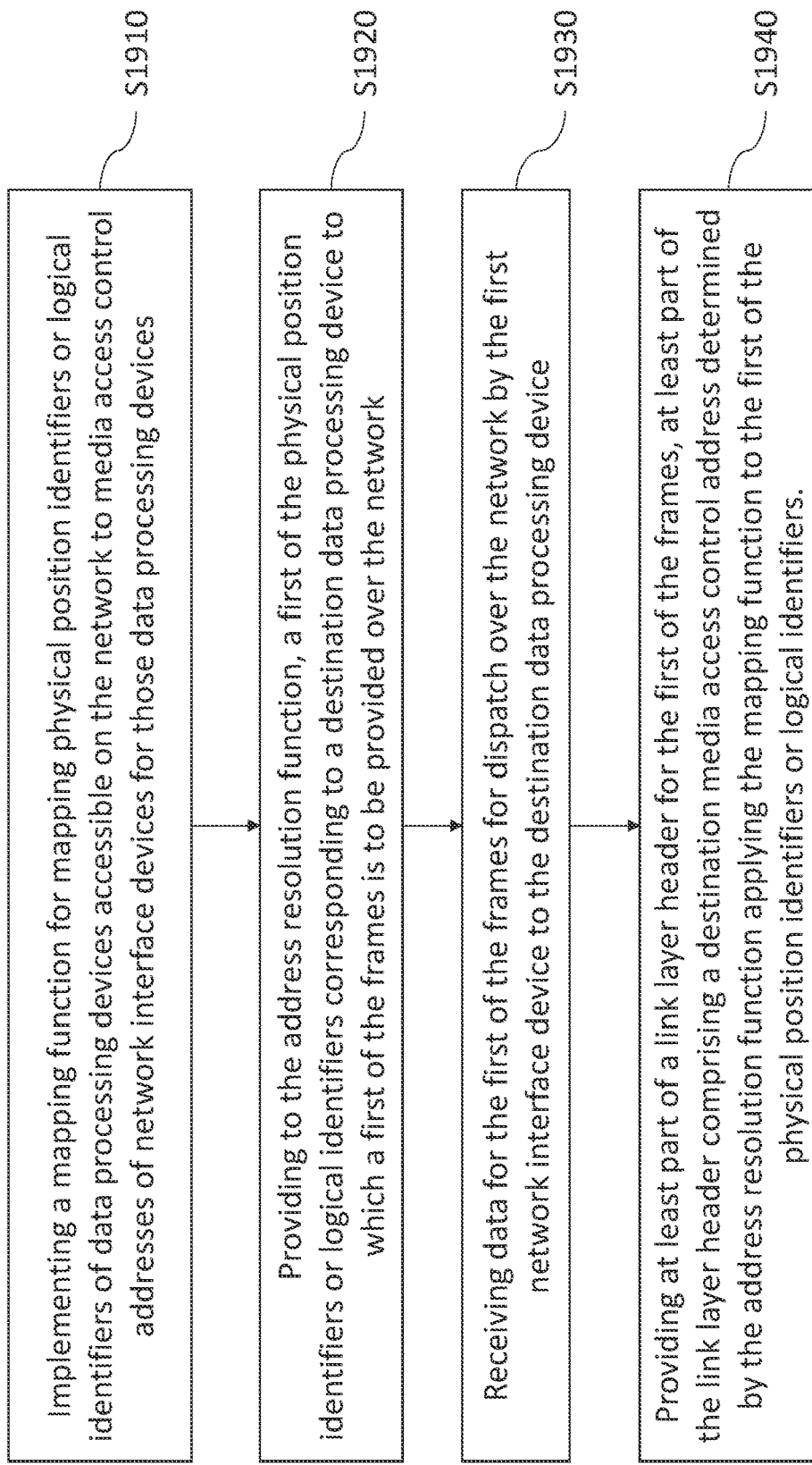
FIG. 19 illustrates a method according to embodiments of the first invention.

Reference is made to FIG. 19, which illustrates a method 1900 according to embodiments of the first invention.

At S1910, an address resolution function implements a mapping function for mapping physical position identifiers or logical identifiers of data processing devices accessible on the network to media access control addresses of network interface devices for those data processing devices.

At S1920, an application provides to the address resolution function, a first of the physical position identifiers or logical identifiers corresponding to a destination data processing device to which a first of the frames is to be provided over the network.

At S1930, a protocol processing entity receives data for a first of the frames, the data being for dispatch over the network to the destination data processing device. The protocol processing entity may be a stack 703, 1303 or may be provided by the NIC frame builder 503.

At S1930, in response to receipt of data for the first of the frames for dispatch over the network to the destination data processing device, the protocol processing entity provides at least part of a link layer header for the first of the frames, the at least part of the link layer header comprising a destination media access control address determined by the address resolution function applying the mapping function to the first of the physical position identifiers or logical identifiers.

Figure 20:
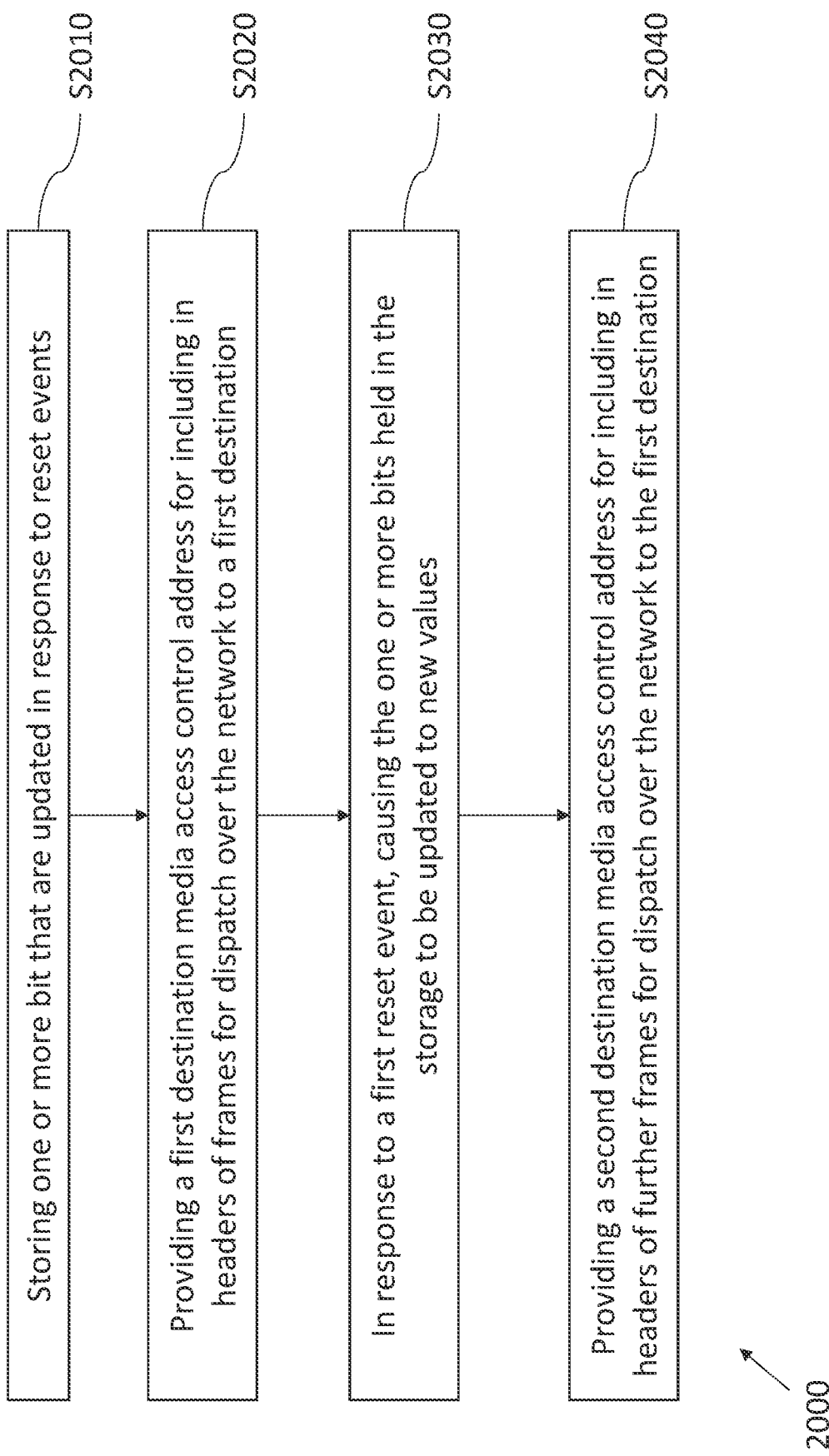
FIG. 20 illustrates a method according to embodiments of the second invention.

Reference is made to FIG. 20, which illustrates a method 2000 according to embodiments of the second invention.

At S2010, the storage 1210 stores one or more bits that are updated in response to reset events.

At S2020, the address resolution function 1240 provides the first destination media access control address for including in headers of frames for dispatch over the network to a first destination, the first destination media access control address comprising the one or more bits.

At S2030, in response to a first reset event, the update functions 1220 causes the one or more bits held in the storage 1210 to be updated to new values.

At S2040, the address resolution function 1240 provides a second destination media access control address for including in headers of further frames for dispatch over the network to the first destination, the second destination media access control address comprising the new values for the one or more bits.

Figure 21:
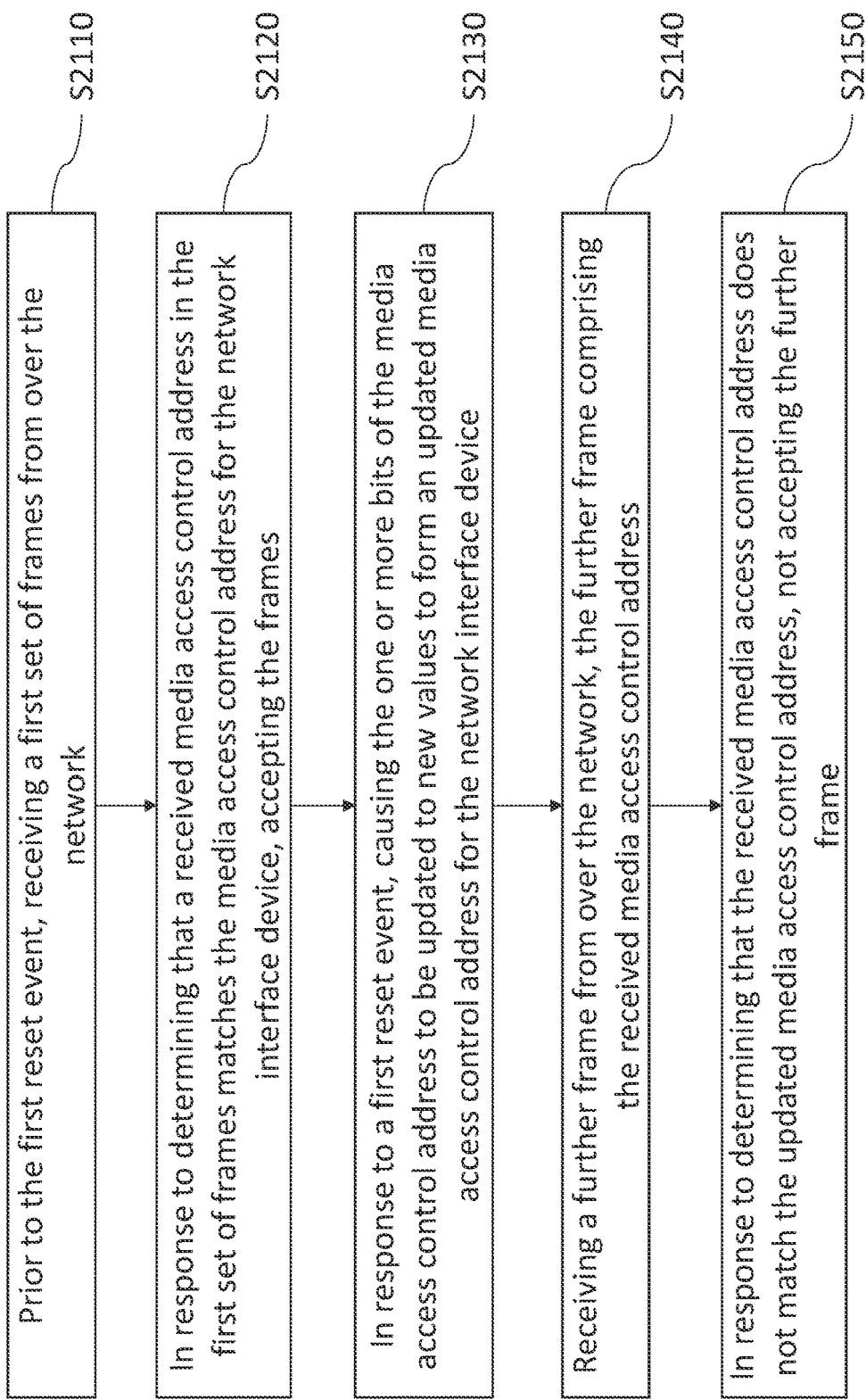
FIG. 21 illustrates a method according to further embodiments of the second invention.

Reference is made to FIG. 21, which illustrates a method 2100 according to embodiments of the second invention.

At S2110, the network interface device 403a receives a first set of frames.

At S2120, in response to determining that a received media access control address in the first set of frames matches the media access control address for the network interface device 403a, the network interface device 403a accepts the first set of frames.

At S2130, in response to a first reset event, the update function 1220 and address resolution function 1240 update the one or more bits of the media access control address to new values to form an updated media access control address for the network interface device 403a.

At S2140, a further frame is received at the network interface device 403a from over the network 401, the further frame comprising the received media access control address.

At S2150, in response to determining that the received media access control address does not match the updated media access control address, the network interface device 403a does not accept the further frame. In this case, the network interface device 403a discards the further frame.

According to embodiments of a third invention, the number of bits allocated in frame headers for use in identifying the VLAN over which frames are sent may be modified. Additionally, the number of bits allocated in the frames for use in representing the source MAC address and the destination MAC address may also be modified. This functionality is described herein as a sliding cursor, and is implemented between the VLAN ID and the MAC addresses. The total number of bits in the frame header for representing each of these pieces of information (VLAN, source MAC, destination MAC) is fixed, which enables compatibility with standard switches in the network 401 and greater simplicity in the NIC 403 design than may otherwise be required. The fixed number of bits in the headers for representing these pieces of information is, therefore, flexibly allocated between the MAC addresses and the VLAN ID. The division between the MAC address and the VLAN ID (i.e. how many bits is allocated to each) for a frame may be referred to as the 'cursor position'.

Figure 27:
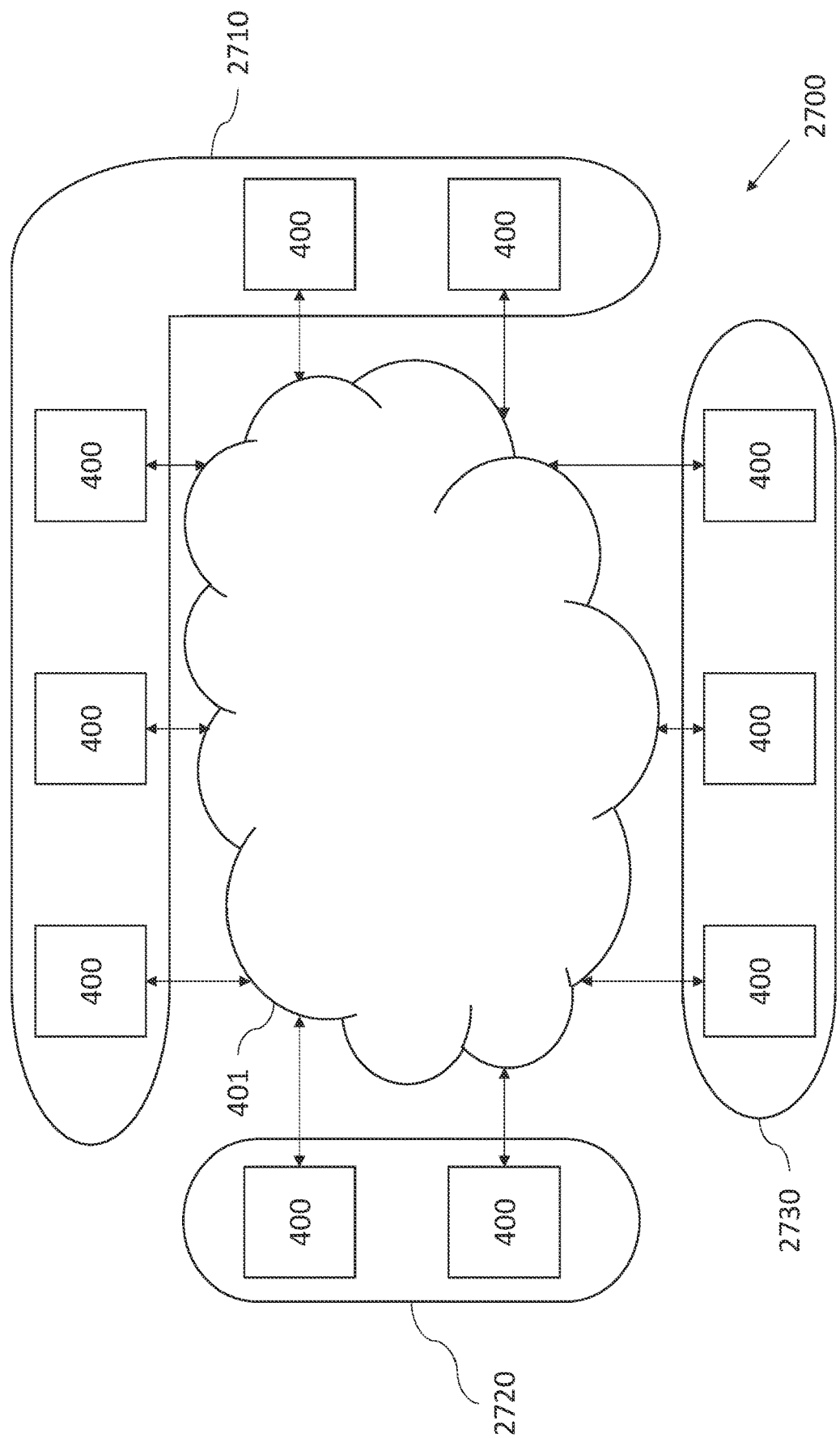
FIG. 27 illustrates a system in which different sets of processing devices communicate over different VLANs.

Reference is made to FIG. 27, which illustrates an example of a system 2700 in which embodiments of the third invention may be implemented. In the system 2700, a plurality of sets of processing devices 400 communicate over a single physical network 401, but over different VLANs. FIG. 27 shows a first set 2710 of devices 400, a second set 2720 of devices 400, and a third set 2730 of devices 400. Although only three sets 2710, 2720, 2730 are shown for illustration, in practice the number would be considerably larger. Each of the sets 2710, 2720, 2730 may constitute a separate system 1100 as described above with respect to FIG. 11. Each of the sets 2710, 2720, 2730 may run a separate application. For each such application, each of the processing units 2 belonging to the respective set of devices 400 runs a portion of the code for the application in order to process a portion of the application data for the application. To avoid confusion between each such application supported by a plurality of processing units 2 and the supporting applications running on the MCPUs 404, the applications running on the processing units 2 are referred to herein as 'workload applications'. The different workload applications running on the system 2700 may be associated with different tenants. Additionally or alternatively, a single tenant may run multiple different workload applications or different versions of the same workload application on different ones of the sets 2710, 2720, 2730 of devices 400 in the system 2700.

When running a workload application, the devices 400 belonging to the respective set of devices 400 supporting that workload application are configured to communicate data (e.g. results of processing) between one another over the network 401. The network 401 is divided into a plurality of VLANs, which provides for isolation between different workload applications running in the system 2700. Each of the devices 400 is associated with one of the VLANs and is configured to send and receive data frames only over that VLAN. As will be described in more detail, isolation between the VLANs is enforced by switches in the network 401 and by the NICs 403 belonging to the devices 400. Each switch in the network 401 will prevent traffic from being sent over a given one of its ports if a string of bits belonging to the VLAN ID in frames of the traffic do not match allowed values for that port. Similarly, a NIC 403 will reject received traffic containing VLAN IDs not matching its own assigned VLAN ID.

Each of the frames sent over the network 401 includes a source MAC address and a destination MAC address. The destination MAC addresses are used by the switches in the network 401 to route the frames to the NICs 403 identified by the destination MAC addresses. This routing is performed in accordance with routing tables stored in the switches, which may be populated dynamically as frames are received on the various switch ports in the network 401. Since the VLAN IDs provide for isolation between devices 400 and NICs 403 associated with different VLANs, it is permissible for different NICs 403 in the system 2700 that are associated with different VLANs to share the same MAC address.

In some circumstances, it may be required to run a very large number of workload applications in the same system 2700, hence requiring a large number of VLANs to be supported for communication over the network 401. In this case, the VLAN ID may be extended using bits from the fields conventionally used to represent the source and destination MACs. These bits used to extend the VLAN ID are referred to herein as extension bits of the VLAN ID. Extension of the VLAN ID in this manner enables the network 401 to be divided into more VLANs than is normally permitted.

In other circumstances, it may be required to allocate a very large number of devices 400 to run a single workload application. Those devices 400 running the workload application must each have a unique MAC address. Therefore, in this case, the source and destination MAC addresses may be extended using bits from the field conventionally used to represent the VLAN ID. These bits used to extend the MAC addresses are referred to herein as extension bits of the MAC addresses. In this way, the number of representable MAC addresses is increased and it may be ensured that each device 400 communicating over a particular VLAN has a unique MAC address. Extension of the MAC address may be particularly useful in the case that the allocation of MAC addresses is set up such that different subsets of the MAC addresses are used to represent certain information. In this case, it may be helpful to provide extension bits for the MAC address if there is a requirement to store a large amount of a particular type of information (e.g. physical location or logical identifier information) for which the allocated bits in the conventional MAC address fields may be insufficient. For example, if a certain set of bits in the MAC are used to represent a rack number (e.g. rack number 912 shown in FIG. 9A), a large number of racks may result in a requirement to extend the number of bits used for representing the rack number. In this case, the MAC address may be extended enabling the larger rack number to be represented with the total number of available MAC address bits. Therefore, embodiments of the third invention may be particularly advantageous when combined with embodiments of the first invention.

Additionally, embodiments of the third invention may be particularly advantageous when combined with embodiments of the second invention. The generation number described above as being part of the source and destination MAC addresses may be provided as part of the extension bits for the MAC address. This allows a format (which could, for example, be based on a physical or logical identifier of the relevant NIC 403) defined for the conventional part of the MAC address to be retained, whilst use of the generation number is enabled by extension of the MAC address.

As discussed above with reference to FIG. 2, a standard Ethernet header includes a destination MAC address, a source MAC address and, optionally, a VLAN identifier (included as part of a 802.1Q tag). These fields shown in FIG. 2 represent the standard fields allocated for representing the relevant information.

Figure 22:
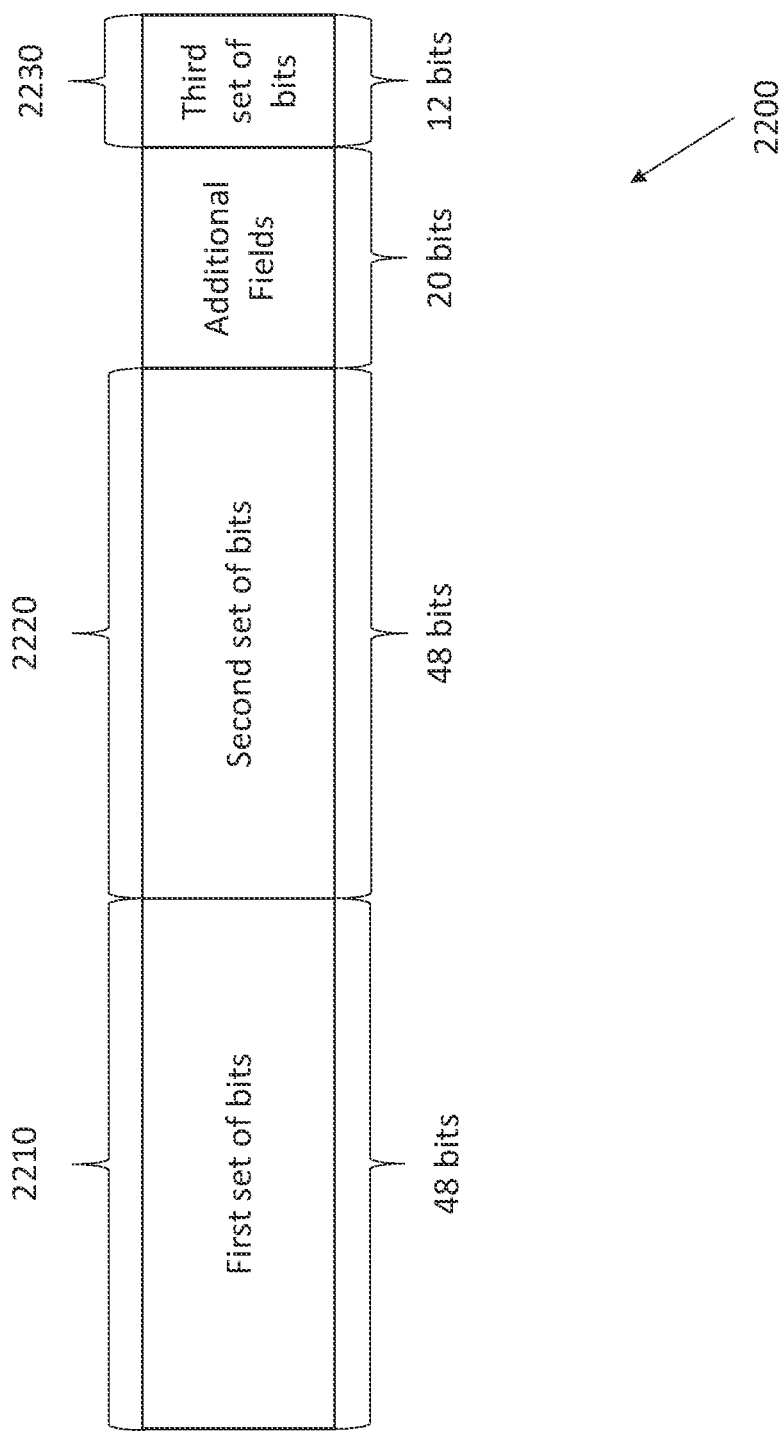
FIG. 22 illustrates an example of a portion of a packet header comprising various header fields in which the MACs and VLANs may be represented.

Reference is made to FIG. 22, which illustrates in more detail, a portion 2200 of a layer 2 header, including a set of relevant bit fields, which in a conventional Ethernet header, are used to represent the source MAC, the destination MAC, and the VLAN identifier (which may also be referred to as the VLAN ID or VLAN tag).

The portion 2200 includes a first set of bits 2210, which is 48 bits in length. In a standard header, the destination MAC address, which uniquely identifies the destination network interface device in a VLAN, consists of the first set of bits 2210. The portion 2200 includes a second set of bits 2220, which is also 48 bits in length. In a standard header, the source MAC address, which uniquely identifies the source network interface device in a VLAN, consists of the second set of bits 2220. The portion 2200 includes a third set of bits 2230, which is 12 bits in length. In a standard header, the VLAN identifier, which uniquely identifies the VLAN in the physical network infrastructure, consists of the third set of bits 2230. The portion 2200 may also include additional fields as shown. These additional fields may be additional fields (other than the VLAN identifier) of the standard 801.1Q tag, as discussed above with reference to FIG. 2.

Embodiments of the application make use of frame headers also including the first set of bits 2210, second set of bits 2220, and third set of bits 2230, as shown in FIG. 22. However, a moving cursor is implemented between the VLAN ID and MAC addresses, such that, in some frames, one or more bits of the third set 2230 may be extension bits of the MAC addresses and, in other frames, one or more bits of the first and second set 2210, 2220 may be extension bits of the VLAN ID. The total size of the first set of bits 2210, the second set of bits 2220, and the third set of bits 2230 is fixed throughout the physical network infrastructure and does not change between different frames. For example, given the bit lengths of 48 bits, 48 bits and 12 bits for the fields 2210, 2220, 2230, the fixed total length for representing the destination MAC, source MAC and VLAN ID in each frame is 108 bits. Fixing the total length of the three bit fields 2210, 2220, 2230, enables compatibility with standard switches, which are configured to analyse frame headers according to a certain standard arrangement and size of header fields.

Figure 23:
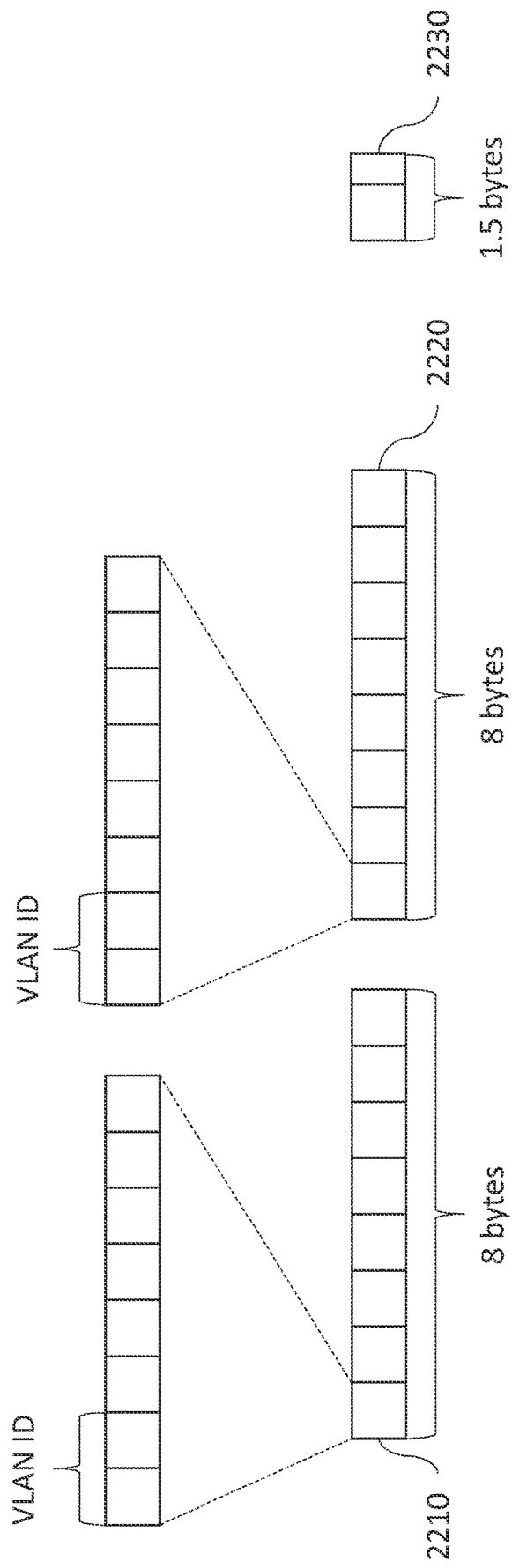
FIG. 23 illustrates an example of the extension of the VLAN ID.

Reference is made to FIG. 23, which illustrates an example in which the VLAN identifier is extended using bits conventionally forming part of the destination MAC address and using bits conventionally forming part of the source MAC address. In the example shown, two bits from the first set of bits 2210 and two bits from the second set of bits 2220 each form part of the VLAN identifier. These two pairs of bits from the first field 2210 and the second field 2220 are held to the same values, adding only two bits in total to the VLAN identifier. These two bits represent extension bits of the VLAN identifier. In addition to the two bits from each of the fields 2210, 2220, the VLAN identifier also comprises all of the bits of the third field 2230. In this example, the VLAN identifier, therefore, comprises 14 bits in total—12 of which are from the third set of bits 2230, which in standard Ethernet frames represents the entire VLAN identifier—and two of which belong to each of the fields 2210, 2220.

Since the VLAN identifier is fixed for a particular VLAN, the VLAN extension bits do not vary between different frames sent over the same VLAN. Therefore, any frames sent by the devices 400 within a same one of the sets 2710, 2720, 2730 will be sent with same values for the VLAN extension bits. Since the cursor position is defined for a particular VLAN, the VLAN extension bits occupy the same positions in the frame headers.

Figure 24:
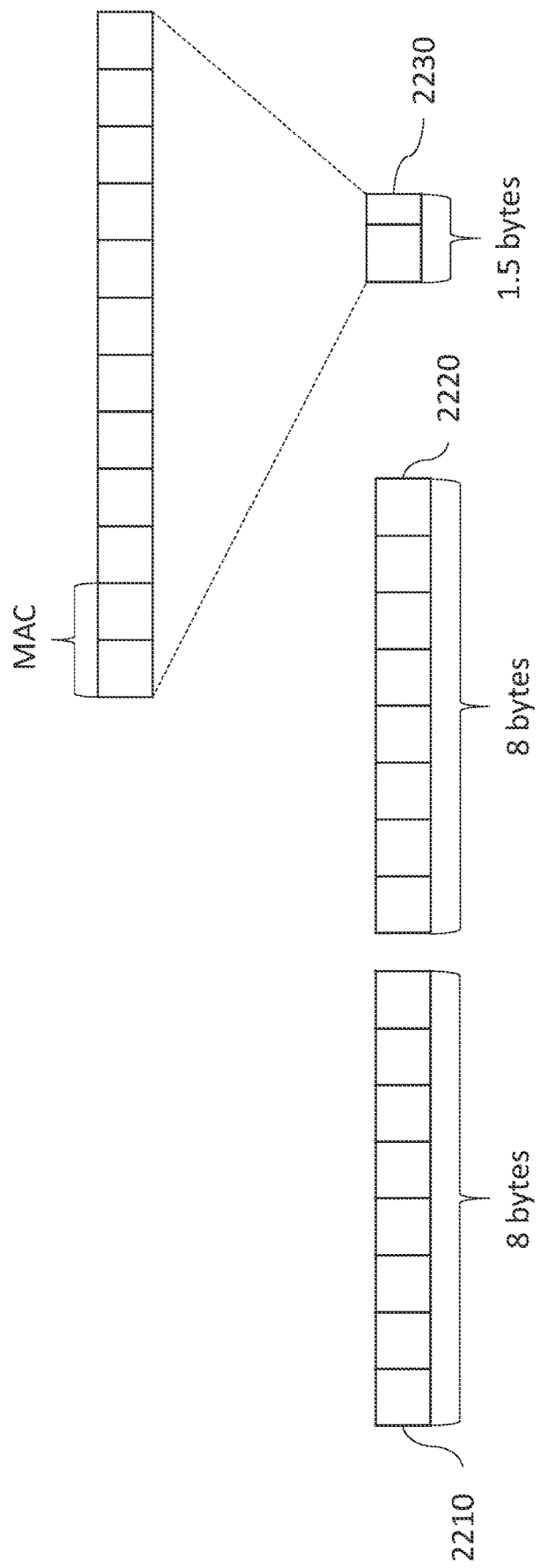
FIG. 24 illustrates an example of the extensions of the MAC addresses.

Reference is made to FIG. 24, which illustrates an example in which the destination MAC and the source MAC are extended using bits that conventionally form part of the VLAN identifier. In the example shown, two bits from the third set of bits 2230 form part of both the source MAC address and the destination MAC address. These two bits represent extension bits of the source MAC address and the destination MAC address. Since these bits are shared between the source MAC address and the destination MAC address, for these two bits, the source MAC address and the destination MAC address share the same values. In this example, therefore, the source MAC address and the destination MAC address each comprise 50 bits in total—48 of which are from the respective one of the first set of bits 2210 (which in a standard Ethernet frame represents the entire source MAC address) and the second set of bits 2220 (which in a standard Ethernet frame represents the entire destination MAC address).

The MAC addresses of the different NICs 403 communicating over a particular VLAN are defined to be unique. At least some of the frames sent sent by the devices 400 within a same one of the sets 2710, 2720, 2730 will be sent with different values for the MAC extension bits. Since the cursor position is defined for a particular VLAN, the MAC extension bits occupy the same positions in the frame headers.

It is additionally, the case that the bits of the MAC address, which for some VLANs may be used as MAC extension bits but for a particular VLAN are reserved for use as MAC address bits, may take different values for different frames sent over that particular VLAN.

In the case in which the MAC addresses in a system 2700 are allocated in dependence upon physical or logical identifiers of the devices 400 to which the NICs 403 belong, the one or more extension bits of the MAC addresses of the NICs 403 may comprise bits of the MAC address other than the bits derived from the physical or logical identifier of the device 400. For example, the extension bits may form part of or the whole of the generation number that is updated in response to reset events. Alternatively, the extension bits may form part or the whole of a NIC identifier that distinguishes the NIC 403 having that identifier from amongst other NICs 403 belonging to the same device 400.

If the MAC extension bits are used to provide a NIC identifier, since the requirement is imposed that the MAC extension bits are a same one or more values for the source MAC address and the destination MAC address, the communication pattern between devices 400 is such that any pair of communicating devices 400 are configured to communicate using corresponding NICs 403 (i.e. those having the same NIC identifiers). For example, for any communications between a first device 400 and a second device 400, the data frames sent between the two devices 400 may be sent from a sending NIC 403 of the first device 400 that has a same NIC identifier (which uniquely identifies it from amongst other NICs 403 of the first device 400) as a recipient NIC 403 of the second device 400 to which the data frames are delivered over the network 401. In this way, the same MAC extension bits may be used to represent the NIC identifier in both the source MAC address and destination MAC address of a data frame.

Figure 25:
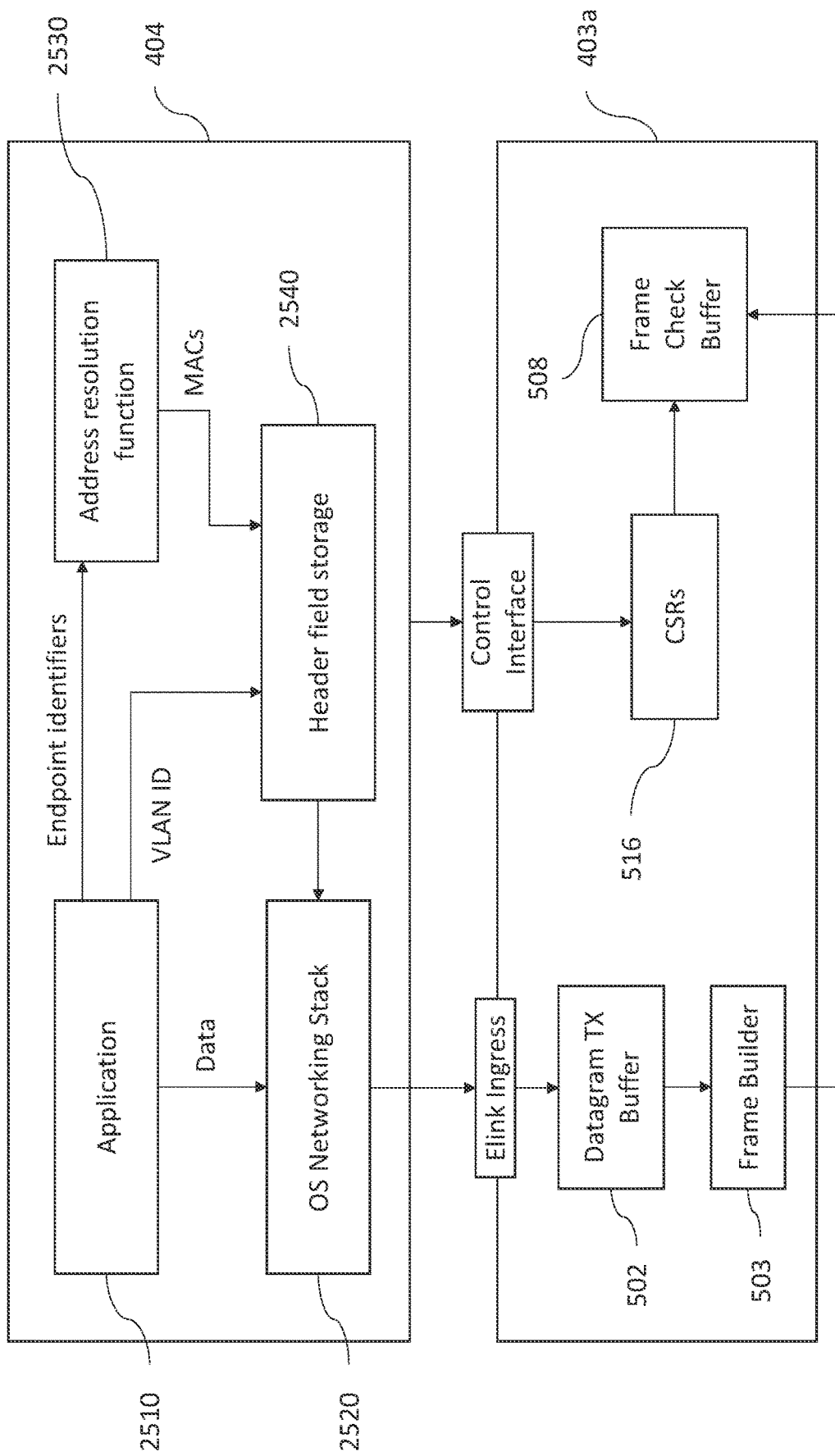
FIG. 25 illustrates the use of a datagram transmit mechanism in which the number of bits allocated to the VLAN ID or the MAC address is flexibly modified.

Reference is made to FIG. 25, which illustrates an example of how data frames may be prepared and sent over the network 401 from a device 400 in accordance with embodiments of the third invention. The data frames are sent from the NIC 403a to a remote NIC 403, which is accessible over the network 401. The data frames in this example are data frames sent in accordance with the datagram transmit mechanism. Although it is here described that the data frames are prepared by the MCPU 404, which belongs to the device 400, in some embodiments, the operations described as being performed by the MCPU 404 may be performed by an external device (such as device 1810), with the MCPU 404 acting as a hardware proxy for the transmission.

At least one processor of the MCPU 404 is configured to execute code to support application 2510, an OS networking stack 2520 and an address resolution function 2530. The application 2510 is responsible for providing the data that is to be packetized by the stack 2520 and provided that data in data frames to be sent over the network 401. The application 2510 additionally provides an identifier of the VLAN via which traffic is configured to be sent over the network 401 by NIC 403*a*. The application 2510 provides the VLAN identifier for storage in a register 2540 that is accessible to the OS networking stack 2520 for sending of data over the network 401.

The application 2510 additionally provides to an address resolution function 2530, identifiers of a plurality of endpoints between which data frames will be sent over the network 401. One or more of these endpoints are the source NICs 403 (including NIC 403*a*) from which the data frames will be dispatched over the network 401. For these endpoints, the endpoint identifiers are used to derive MAC addresses to be included in the data frames sent over the network 401 as source MACs. Others of the endpoints are destination NICs 403 to which data frames will be dispatched over the network 401 from the source NICs 403. For these endpoints, the endpoint identifiers are used to derive MAC addresses to be included in the data frames sent over the network 401 as destination MACs. These endpoint identifiers are provided to an address resolution function 2530, which is configured to provide the source and destination MAC addresses for inclusion in the frame headers. The address resolution function 2530 causes the MAC addresses to be stored in the header field register 2540. Each of the endpoint identifiers, on the basis of which the source and destination MAC addresses are derived, may be an IP address. Additionally or alternatively, each of the endpoint identifiers may be a physical position or logical identifier of a device 400 comprising the source/destination NIC 403, as described above with respect to embodiments of the first invention. Such an endpoint identifier also includes an identifier of the source/destination NIC 403, which distinguishes that NIC 403 from other NICs 403 of the same device 400.

The application 2510 provides to the network stack 2520, the data to be dispatched over the network 401. The application 2510 additionally provides to the networking stack 2520, the identifier of the destination endpoint that was provided to the address resolution function 2530. This endpoint identifier is used by the networking stack 2520 to look up from the storage 2540, the MAC address for the remote NIC 403, which is to be inserted into the frame as the destination MAC. The application 2510 additionally provides to the networking stack 2520, an identifier of the NIC 403*a* from which the frame is to be dispatched onto the network 401. This network stack 2520 looks up from the storage 2540, the MAC address for the NIC 403*a*, which is to be inserted into the frame as the source MAC. The network stack 2520 also obtains from the storage 2540, the VLAN ID of the VLAN over which the data frames partially constructed by the MCPU 404 are to be sent.

Having obtained the source MAC, the destination MAC, and the VLAN ID from the storage 2540, the networking stack 2520 provides each of these as part of the frame header of a partially constructed frame, the partially constructed frame also comprising the payload data provided by the application 2510. Each such partially constructed frame may comprise a packet comprising a TCP or UDP segment. The partially constructed frame is provided from the networking stack 2520 to the datagram transmit buffer 502 of the NIC 403*a*. The frame builder 503 of the NIC 403*a* completes the frame by adding the Preamble and SFD, and circuitry of the NIC 403*a* causes the frame to be transmitted over the network 401.

In order to enable the NIC 403*a* to handle frames received from the network 401, the MCPU 404 writes the MAC address of the NIC 403*a* (determined as described above) to one or more of the CSRs 516 of the NIC 403*a*. Additionally, the MCPU 404 provides to the NIC 403*a*, the VLAN identifier for the VLAN over which the NIC 403*a* is configured to communicate. When the NIC 403*a* receives a frame from the network 401, circuitry of the NIC 403*a* checks the destination MAC address in the frame header against the MAC address for the NIC 403*a* held in the CSRs 516. Additionally, the NIC 403*a* checks the VLAN identifier in the received frame against the VLAN identifier provided by the MCPU 404, which is also held in the CSRs 516. If a mismatch for either the VLAN identifier or the destination MAC is detected by circuitry of the NIC 403*a*, the frame is dropped. If no mismatch is detected, the circuitry of the NIC 403*a* accepts the frame.

When performing its checks, the cursor position for the frame, which is provided by the software running on the MCPU 404, may be transparent to the NIC 403*a*. The NIC 403*a* may perform the check of a first set of bits 2210 provided by the MCPU 404 against a first set of bits 2210 in a received frame and, additionally, perform a check of a third set of bits 2230 provided by the MCPU 404 against a third set of bits 2230 in the received frame. Only if both of these checks pass, will the frame be accepted. The effect of checking both sets of bits 2210, 2230 is that, irrespective of the cursor position, the frame will only be accepted if both the VLAN ID and the destination MAC in a received frame are correct.

The application 2510, stack 2520 and address resolution function 2530 are, between them, configured to provide the VLAN identifiers and MAC addresses for the data frames in accordance with the sliding cursor discussed above. The sliding cursor position, i.e. the number of bits allocated to the MAC addresses vs the VLAN ID, may vary between different workload applications running on a set of devices 400 (e.g. one of sets 2710, 2720, 2730). The sliding cursor position may be changed when a new workload application is loaded into the processing units 2 of the devices 400.

Figure 28:
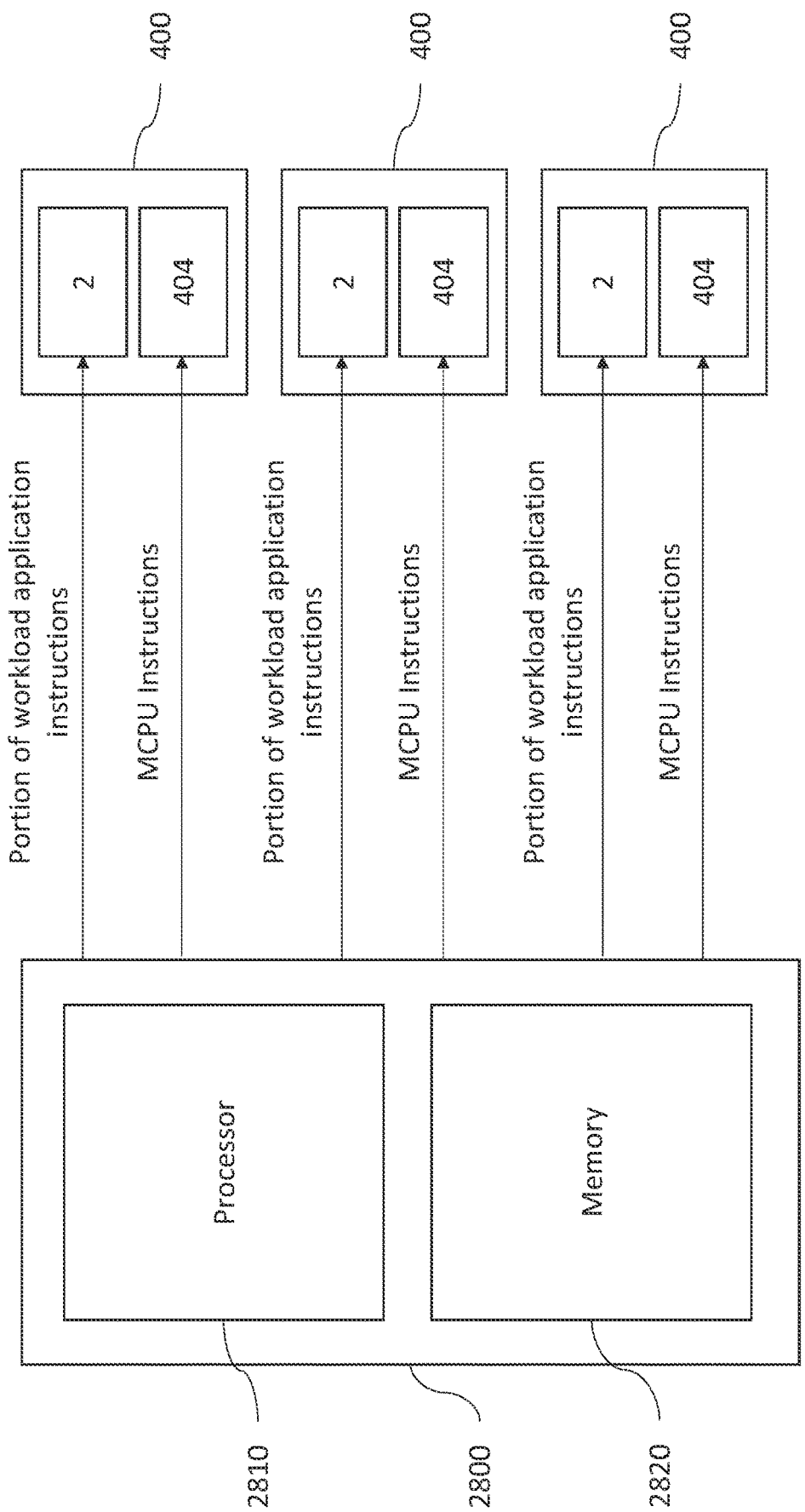
FIG. 28 illustrates the provision of workload application instructions.

When a new workload application is provisioned for running on a set of devices 400 (e.g. one of sets 2710, 2720, 2730), in addition to the workload application instructions provided for running on each of the processing units 2 of the set of devices 400, software instructions are provided to the MCPUs 404 of the set of devices 400 for execution by those MCPU 404 to provide each application 2510 and each address resolution function 2520. Reference is made to FIG. 28, which illustrates a system 2800 for provision of instructions to multiple different devices 400. The system 2800 comprises at least one processor 2810 and at least one memory 2820 for performing the operations described as being performed by the system 2800. The system 2800 provides to each processing unit 2 within a system, a portion of application instructions for the workload application. The system 2800 additionally provides to each MCPU 404, a set of instructions (instructions for providing the application 2510 and the address resolution function 2530) for running on the MCPU 404. The system 2800 configures each set of MCPU instructions to have a defined cursor position based on the relevant requirements (e.g. number of workload applications running in the entire system 2700 or number of devices 400 supporting a particular workload application). The cursor position may be set by a user in control of system 2800 or may be set automatically as part of a compilation process performed based on code provided to the system 2800 by a user.

Therefore, the cursor position may be set and provided as part of the software (i.e. the application 2510 and address resolution functions 2530) that is provisioned to each MCPU

404. If, given the size of a particular workload application instructions and the workload application data, a large number of processing units 2 are required to support the workload application, the software for running on the associated MCPUs 404 may be provisioned such that extension bits are allocated to the MAC addresses. On the other hand, if a system 2700 supports a large number of workload applications, the software for running on the MCPUs 404 may be provisioned such that extension bits are allocated to the VLAN ID.

Since requirements may change, the cursor position may be modified for different workload applications. Therefore, the MCPU 404 may be provided with different sets of instructions configured to provide VLAN IDs and MAC addresses with different number of bits. For example, suppose a first workload application is to be executed across a first set of devices 400 (e.g. one of sets 2710, 2720, 2730), where a large number of workload applications are executing in the overall system 2700, such that a large number of VLANs are required. In this case, each application 2510 in the first set of devices 400 is configured to store a VLAN ID in storage 2540 with more than the third set 2230 of bits that is conventionally used for the VLAN ID. This VLAN ID comprises one or more extension bits, which will be incorporated into the fields 2210, 2220 of frames. When the networking stack 2520 has received data to transmit in a frame, the stack 2520 provides 12 bits of VLAN ID as part of field 2230 in the header for that frame and provides the extension bits for the VLAN ID as part of the fields 2210, 2220 in the header (for instance, as exemplified in FIG. 23). Each address resolution function 2530 is configured to provide each MAC address for storage in storage 2540 with fewer than the first and second sets 2210, 2220 of bits that are conventionally used for MAC addresses. When the networking stack 2520 has data to transmit in a frame, the stack 2520 provides these MACs as part of fields 2210, 2220 (for instance as exemplified in FIG. 23). The MAC address for the NIC 403*a* is also provisioned by the MCPU 404 to one or more of the CSRs 516 of the NIC 403*a*, with circuitry of the NIC 403*a* configured to check this MAC address against destination MAC addresses in received frames and accept the frame if there is a match. The MAC address stored in the CSRs 516 also comprises the same number of bits as each of the MACs held in the header field storage 2540 for inclusion in the frames by the stack 2520.

Following completion of the workload processing associated with the first workload application, one or more devices 400 that were used for performing processing for the first workload application may be used for performing processing for a second workload application. When processing the second workload application, the requirements may change such that it is not required to support a large number of VLANs in the system 2700, but it is required to support a large number of MAC addresses for communication between a large number of different devices 400. In this case, each application 2510 in the set of devices 400 is configured to store a VLAN ID in its associated storage 2540, where each of those VLAN IDs has fewer bits than the third set 2230 of bits that is conventionally used for the VLAN ID. When the networking stack 2520 has data to transmit in a frame, the stack 2520 provides the VLAN ID in only a subset of bits of the field 2230 in the header. Each address resolution function 2530 is configured to provide each MAC address (for storage in storage 2540) with more than the number of bits that are conventionally used for MAC addresses. In other words, each MAC address additionally comprises one or more extension bits. When the networking stack 2520 has data to transmit in a frame, the stack 2520 provides some bits of the destination MAC in the field 2210 and the extension bits of the destination MAC in the part of field 2230 not occupied by the VLAN ID (for instance as exemplified in FIG. 24). The stack 2520 also provides some bits of the source MAC in field 2220 and the extension bits of the source MAC (which are the same as the extension bits for the destination MAC) in the part of field 2230 not occupied by the VLAN ID (for instance as exemplified in FIG. 24). The MAC address for the NIC 403*a* is also provisioned by the MCPU 404 to one or more of the CSRs 516 of the NIC 403*a*, with circuitry of the NIC 403*a* configured to check this MAC address against a destination MAC addresses in received frames and accept each frame if there is a match. The MAC address stored in the CSRs 516 also comprises the same number of bits as the MACs held in the header field storage 2540 for inclusion in the frames by the stack 2520.

For both the first workload application and the second workload application, the total number of bits used in each frame for representing the source MAC address, the destination MAC address, and the VLAN ID is a fixed amount (e.g. 108 bits).

The embodiment illustrated in FIG. 25 is one in which the address resolution function 2530 makes a set of MAC addresses available in storage 2540, so as to be accessible to the networking stack 2520 for constructing data frames for sending over the network 401 by the NIC 403*a*. However, in other embodiments, the address resolution function 2530 may provide the MAC addresses when requested by the network protocol stack 2520, in the manner described above with respect to FIG. 8B. Furthermore, the application 2510 may perform any of the same operations that are described above as being performed by applications 701, 1301, 1801. Similarly, networking stack 2520 may perform any of the same operations as either of stacks 703, 1303 described above. Similarly, the address resolution function 2530 may perform the same operations as either of address resolution functions 702, 1240 described above.

It has been described, with reference to FIG. 25, how the MCPU 404 causes the sending of frames via NIC 403*a*. Additionally, the MCPU 404 also causes the sending of frames via other NICs 403 belonging to the device 400 via use of the same mechanism. As noted, extension MAC bits may be reserved to represent the NIC identifier 403. In this case, when the MCPU 404 causes a first set of frames to be dispatched over a first VLAN, where the cursor position for the first VLAN is such that each frame includes MAC extension bits, different NICs 403 will send data frames having different MAC extension bits. Therefore, the MAC extension bits will be different for different ones of the first set of frames by virtue of being sent via different NICs 403. Alternatively, the MAC extension bits may be reserved to represent a generation number. In this case, when a reset event occurs, frames sent by the MCPU 404 prior to the reset event, will have different MAC extension bits to frames sent after the reset event (even if those frames are sent via the same NIC 403). These are examples of ways in which the MAC extension bits may vary between different frames sent over the same VLAN.

In the case of a second set of frames (which may correspond to a different workload application) having a VLAN ID comprising VLAN extension bits, these bits will be the same for all frames sent over the network, which therefore implies that all of the partial frame headers provided by the MCPU 404 in accordance with the mechanism discussed with respect to FIG. 25 will include the same VLAN extension bits. Additionally, all frames sent over the same VLAN are provided with the same full set of VLAN identifier bits.

Figure 26:
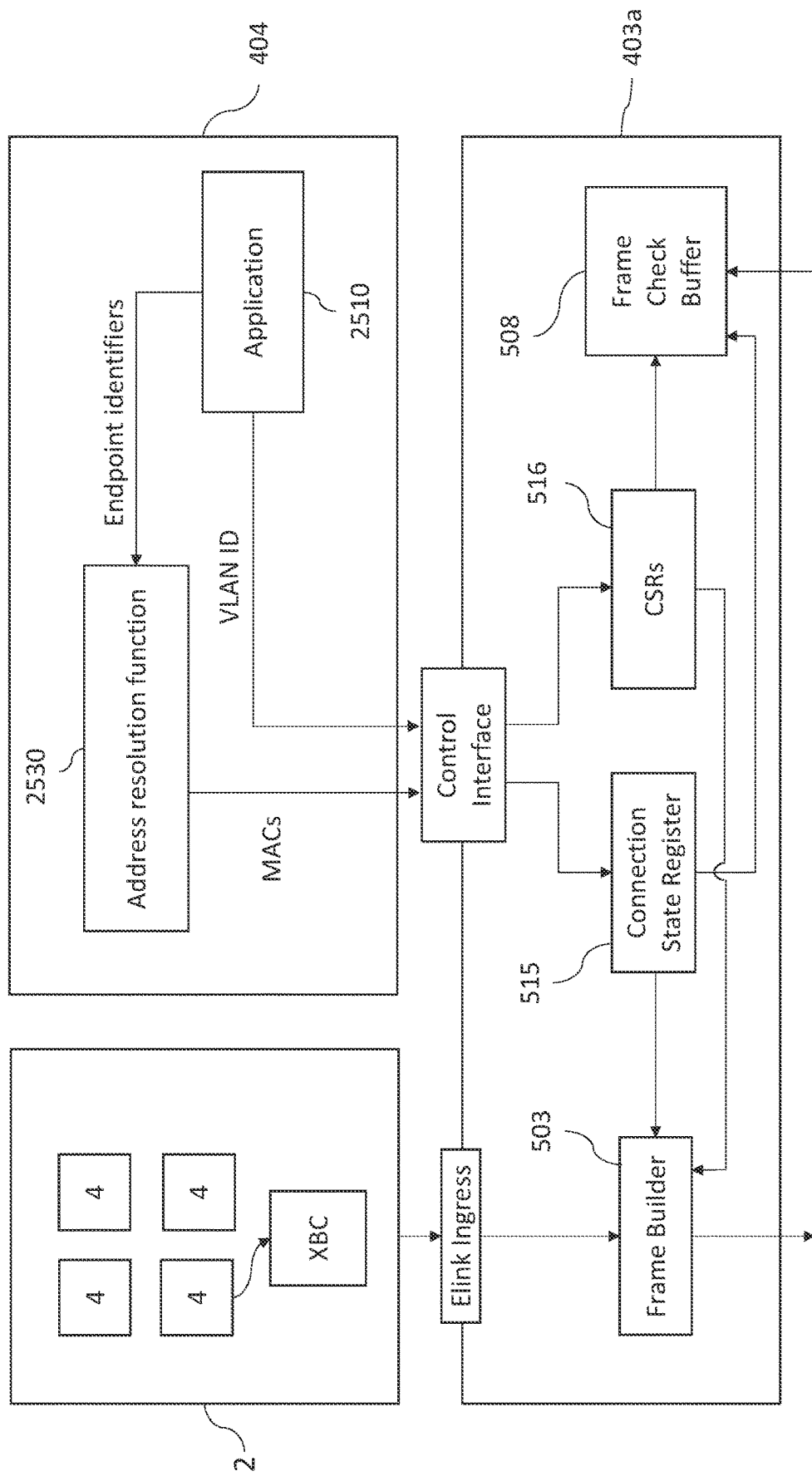
FIG. 26 illustrates the setup of a connection, where the number of bits allocated to the VLAN ID or the MAC address is flexibly modified.

Reference is made to FIG. 26, which illustrates how the MCPU 404 provides connection state for the exchange of traffic over the network 401 by the processing unit 2. The application 2510 provides two endpoint identifiers to the address resolution function 2530. A first of these endpoint identifiers is an identifier of the NIC 403a, and is used to derive a MAC for the NIC 403a. A second of these endpoint identifiers is an identifier of a remote NIC 403, which the NIC 403a is configured to communicate with over the connection. The address resolution function 2530 derives the MAC address of the remote NIC 403 from the remote NIC's 403 endpoint identifier and the MAC address of the local NIC 403a from the local NIC's 403a endpoint identifier. The application 2510 provides the VLAN ID for the connection.

The NIC 403a provides a first set of bits 2210, a second set of bits 2220 and a third set of bits 2230 in each frame sent over a connection. When setting up the connection, the MCPU 404 provides each of these sets to the NIC 403a based on the VLAN ID and MAC addresses for the connection that are provided by the software (i.e. application 2510 and address resolution function 2530), as discussed above. These first set of bits 2210, 2220, 2230 together form a partial frame header that is provided by the MCPU 404.

In some embodiments, the NIC 403a operates independently of the cursor position. In other words, the NIC 403a is unaware of the number of bits allocated to the MAC addresses vs the number allocated to the VLAN ID. In this case, the MCPU 404 provides the first set of bits 2210 for storage in the connection state register 515, where the first set of bits 2210 comprises at least part of the destination MAC and may comprise extension bits of the VLAN ID (if these are provided based on the cursor position for the relevant workload application). The MCPU 404 provides the second set of bits 2220 for storage in one of the CSRs 516, where the second set of bits 2220 comprises at least part of the source MAC and may comprise extension bits of the VLAN ID (if these are provided based on the cursor position for the relevant workload application). The MCPU 404 provides the third set of bits 2230 for storage in one of the CSRs 516, where the third set of bits 2230 comprises at least part of the VLAN ID and may comprise extension bits of the MAC addresses (if these are provided based on the cursor position for the relevant workload application).

The NIC 403a operates to send and receive frames using the first set of bits 2210 held in the connection state register 515 and the second set of bits 2220 held in one of the CSRs 516. The NIC 403a performs these operations in the manner described above with respect to FIG. 5, where the first set of bits 2210 is treated in the same manner by the NIC 403a as the remote MAC discussed above with respect to FIG. 5, the second set of bits 2220 is treated in the same manner by the NIC 403a as the local MAC of the NIC 403a discussed above with respect to FIG. 5. Additionally, the frame builder 503 provides the third set of bits 2230 held in one of the CSRs 516 in the header of each frame transmitted over the network 401. On the receive side, circuitry of the NIC 403a checks the third set of bits 2230 in a received frame against the third set of bits 2230 held in the one of the CSRs 516, and discards the frame if these two do not match.

In other embodiments, the NIC 403a operation is dependent upon the cursor position. In other words, the NIC 403a is aware of the number of bits allocated to the MAC addresses vs the number allocated to the VLAN ID. In this case, the MCPU 404 writes the MAC address for the remote NIC 403 (referred to hereafter as the "remote MAC") for storage in the connection state register 515, where the remote MAC comprises at least some of the first set of bits 2210 for each of the frames to be sent by the NIC 403a and may comprise some of the third set of bits 2230 for those frames. The MCPU 404 issues another write to write the MAC address of the NIC 403a (referred to hereafter as the "local MAC") for storage in one of the CSRs 516, where the local MAC address comprises at least some of the second set of bits 2220 for each of the frames to be sent by the NIC 403a, and may comprise some of the third set of bits 2230 for those frames. The MCPU 404 issues another write to write the VLAN ID for the connection for storage in another one of the CSRs 516, where the VLAN ID comprises at least some of the third set of bits 2230 to be included in each of the frames to be sent by the NIC 403a over the connection and may comprise some of the first and second sets of bits 2210, 2220 for each of those frames.

The NIC 403a operates to send and receive frames using the remote MAC held in the connection state register 515, and the local MAC and VLAN ID held in different ones of the CSRs 516. The frame builder 503 inserts into each frame sent over the connection, the first set of bits 2210, which is derived from the remote MAC value held in the register 515 and, optionally, part of the VLAN ID held in one of the CSRs 516. The frame builder 503 also inserts into each frame sent over the connection, the second set of bits 2220, which is derived from the local MAC value held in one of the CSRs 516 and, optionally, part of the VLAN ID held in another one of the CSRs 516. The frame builder 503 also inserts into each frame sent over the connection, the third set of bits 2230, which is derived from the VLAN ID value held in the relevant one of the CSRs 516 and, optionally, either of the remote MAC and local MAC values.

On the receive side, circuitry of the NIC 403a checks the VLAN ID in a received frame against the VLAN ID held in one of the CSRs 516 and checks the destination MAC in that frame against the local MAC value held in another one of the CSRs 516. Given that the VLAN ID may not comprise the same number of bits as the third field 2230 in the frame and the destination MAC may not comprise the same number of bits as the first field 2210 in the frame, the checking performed for either the VLAN ID and the local MAC may comprise performing a check of a value of either the locally stored VLAN ID or local MAC against multiple discontiguous fields in the header. For example, suppose that the local MAC address held in the one of the CSRs 516 comprises extension bits. In this case, the check performed against the destination MAC comprises checking all of the first set of bits 2210 in the header of a received frame against corresponding bits of the local MAC held in the one of the CSRs 516 and checking some of the third set of bits 2230 in the header against corresponding ones of the extension bits of the local MAC held in the one of the CSRs 516. As is understood from FIG. 22, the first set of bits 2210 and third set of bits 2230 form fields that are discontiguous in the frame header. Therefore, the check for the MAC address in this case involves performing a check against bits belonging to multiple discontiguous fields in the header. As another example, suppose that the VLAN ID held in the one of the CSRs 516 comprises extension bits. In this case, the check performed for the VLAN ID comprises checking all of the third set of bits 2230 in the header of a received frame against corresponding bits of the VLAN ID held in one of the CSRs 516 and checking some of the first set of bits 2210 against corresponding ones of the extension bits of the VLAN ID held in the one of the CSRs 516. As is understood from FIG. 22, the first set of bits 2210 and third set of bits 2230 form fields that are discontiguous in the frame header. Therefore, the check for the VLAN ID in this case involves performing a check against bits belonging to multiple discontiguous fields in the header.

The NIC 403*a* discards the frame if matches for either the VLAN ID and the destination MAC are not detected, and accepts the frame if matches for both are detected. This same check process based on the VLAN ID and local MAC may be performed for the datagram frames (for which transmission is described with respect to FIG. 25) and the connection traffic (for which transmission is described with respect to FIG. 26).

As discussed above with respect to FIG. 25, the cursor position may be modified between different workload applications executing partly on the processing unit 2. Therefore, the MCPU 404 may be provided with different sets of instructions (for the different workload applications) so as to provide connection state comprising VLAN IDs and MAC addresses with different number of bits. For example, suppose a first workload application is to be executed across a system 2710, where a large number of workload applications are executing in the overall system 2700, such that a large number of VLANs are required. In this case, each application 2510 in the system 2710 is configured to store a VLAN ID in each of the NICs 403 of the device 400 to which it belongs, where that VLAN ID comprises more than the third set 2230 of bits that is conventionally used for the VLAN ID. The VLAN ID also comprises one or more extension bits, which will be incorporated into the fields 2210, 2220 of the transmitted frames. When the frame builder 503 receives data to transmit in a frame, the frame builder 503 provides 12 VLAN bits as part of field 2230 in the header and provides the extension bits for the VLAN ID as part of the fields 2210, 2220 in the header (for instance as exemplified in FIG. 23). Each address resolution function 2530 is configured to, for each connection supported by its device 400, provide each of the MAC addresses for the endpoints of that connection, where each MAC address has fewer bits than either the first and second fields 2210, 2220 of bits. When the frame builder 503 has data to transmit in a frame, it provides these MACs as part of fields 2210, 2220 (for instance as exemplified in FIG. 23).

To set up the connection state for connections used for the second workload application, each of at least some of the applications 2510 in the system 2710 supporting that second workload application is configured to provide to one or more of its NICs 403, a VLAN ID having with fewer than the third set 2230 of bits. When the frame builder 503 in each such NIC 403 has data to transmit in a frame, the frame builder 503 provides this VLAN ID in only a subset of bits of the field 2230 in the header. Each address resolution function 2530 is also configured to provide the two MAC addresses for one or more the connections with more than the number of bits of the first and second fields 2210, 2220. Each MAC address additionally comprises one or more extension bits. When each frame builder 503 has data to transmit in a frame, it provides some bits of the destination MAC in the field 2210 and the extension bits of the destination MAC in the part of field 2230 not occupied by the VLAN ID (for instance as exemplified in FIG. 24). Each frame builder 503 also provides some bits of the source MAC in field 2220 and the extension bits of the source MAC in the part of field 2230 not occupied by VLAN ID (for instance as exemplified in FIG. 24). Each frame builder 503 also provides all of the VLAN ID bits in part of the field 2230.

It has been described, with reference to FIG. 26, how the MCPU 404 causes the sending of frames via NIC 403*a* by provision of the partial headers to the NIC 403*a*. Additionally, the MCPU 404 also causes the sending of frames via other NICs 403 belonging to the device 400 via use of the same mechanism. As noted, extension MAC bits may be reserved in each of these frames to represent the NIC identifier 403. In this case, when the MCPU 404 causes a first set of frames to be dispatched over a first VLAN, where the cursor position for the first VLAN is such that each frame includes MAC extension bits, different NICs 403 responsible for dispatching the first set of frames will the frames having different NIC identifiers in the MAC addresses. Therefore, the MAC extension bits will be different for different ones of the first set of frames. Alternatively, the MAC extension bits may be reserved to represent a generation number. In this case, when a reset event occurs, frames sent by one or more NICs 403 prior to the reset event, will have different MAC extension bits to frames sent after to the reset event (even if those frames are sent via the same NIC 403). These are examples of ways in which the MAC extension bits may vary between different frames sent over the same VLAN.

In the case of a VLAN having VLAN extension bits, these bits will be the same for all frames sent over the network, which therefore implies that all of the frames sent by the NICs 403 in accordance with the mechanism discussed with respect to FIG. 26 will include the same VLAN extension bits.

Figure 34:
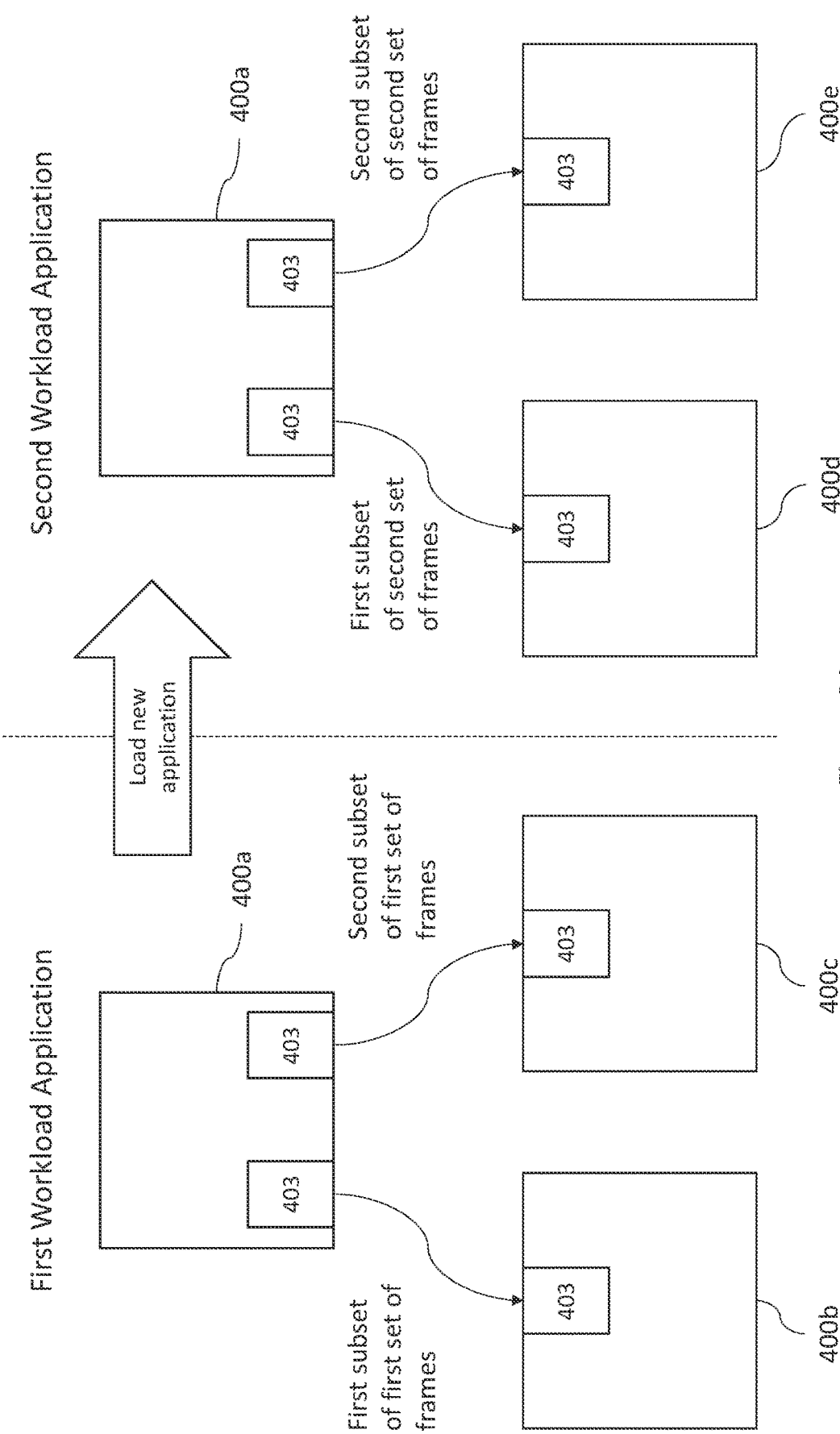
FIG. 34 illustrates an embodiment in which different subsets of a first set of frames are sent to different devices and different subsets of a second set of frames are sent to different devices.

Reference is made to FIG. 34, which illustrates how a device 400*a* may send frames having different destination MACs and VLANs. The device 400*a* is a device 400 as described above, and may send the frames in accordance with either of the mechanisms described with reference to FIGS. 25 and 26. On the left hand side of FIG. 34, the device 400*a* is shown sending a first set of frames over a first VLAN, which is used for communications relating to a first workload application. In this case, each of the devices 400*a*, 400*b*, and 400*c* runs a portion of the code for the first workload application. When operating in this way, the devices 400*a*, 400*b*, 400*c* each belong to a same set (e.g. one of sets 2710, 2720, 2730) of devices 400.

On the right hand side of FIG. 34, the device 400*a* is shown sending a second set of frames over a second VLAN, which is used for communications relating to a second workload application. In this case, each of the devices 400*a*, 400*d*, 400*e* runs a portion of the code for the second workload application. When operating in this way, the devices 400*a*, 400*d*, 400*e* each belong to a same set (e.g. one of sets 2710, 2720, 2730) of devices 400. The second workload application is run after completion of the processing associated with the first workload application. The second VLAN uses a different cursor position compared to the first VLAN. Specifically, the second VLAN has an identifier comprising a greater number of bits than an identifier of the first VLAN. As a consequence, the number of bits used for representing the MAC addresses in each of the first set of frames is greater than the number of bits used for representing the MAC addresses in each of the second set of frames.

The first device 400*a* sends a first set of frames over the first VLAN formed in the network 401. A first subset of these frames are sent to the device 400*b* via a first NIC 403 of device 400*a* and a second subset of these frames are sent to the device 400*c* via a second NIC 403 of device 400*a*. Since they are sent over the same VLAN, each of the first set of frames has the same VLAN identifier. However, since the two subsets of these frames are sent to different destination NICs 403, the first subset of frames each comprise a destination MAC that is different to the destination MAC in each of the second subset of frames. Furthermore, since the two subsets of the first set of frames are sent from different NICs 403 of device 400*a*, the first subset of frames each comprise a source MAC that is different to the source MAC in each of the second subset of frames.

Therefore, both the source MACs and destination MACs differ between the two subsets of the first set of frames. The MACs are different in at least one or more bits in one or more bit positions in the frame headers, where those one or more positions may, when the cursor position is set differently, be used to represent part of the VLAN ID, rather than the MAC addresses. These one or more bit positions either belong to a part of the field 2230 that is used for MAC extension bits in the first set of frames (e.g. when the cursor position for the first workload application is as shown in FIG. 24) or belong to a part of the fields 2210, 2220 that may be used for VLAN extension bits when the cursor position is different (e.g. when the cursor position for a different workload application is as shown in FIG. 23).

After the processing for the first workload application is complete, the processing units 2 running on the devices 400*a*, 400*b*, 400*c* are reset (including wiping of the application data and instructions from their memories) so as to be available for running new applications. At least the device 400*a* is used for running code of the second workload application. The devices 400*b*, 400*c* may also be used for running the second workload application and, in this case, the device 400*a* may, when running code for the second application, also send frames to these devices 400*b*, 400*c*.

The first device 400*a* sends a second set of frames over the second VLAN formed in the network 401. A first subset of these frames is sent to the device 400*d* (which could be the same or different to device 400*b*) via a first NIC 403 of device 400*a* and a second subset of these frames are sent to the device 400*e* (which could be the same or different to device 400*c*) via a second NIC 403 of device 400*a*. Since they are sent over the same VLAN, each of the second set of frames has the same VLAN identifier. However, since the two subsets of these frames are sent to different destination NICs 403, the first subset of frames each comprise a destination MAC that is different to the destination MAC in each of the second subset of frames. Furthermore, since the two subsets of the second set of frames are sent from different NICs 403 of device 400*a*, the first subset of frames each comprise a source MAC that is different to the source MAC in each of the second subset of frames.

Each of the second set of frames comprises a VLAN ID, at least part of which is included at the one or more bit positions, which in the first set of frames are used to provide bits of the MAC address. As discussed above, in the first set of frames, these bits of the MAC address differ between the first subset of the first set of frames and the second subset of the first set of frames. However, since in the second set of frames, the same one or more bits positions contain bits of the VLAN ID (which is fixed for all of the second set of frames sent over the second VLAN), the bits at these same one or more bit positions are fixed to the same values in each of the second set of frames.

As discussed, in some cases, in each of the first set of frames, the one or more bit positions may be part of field 2230 and be used for MAC extension bits (e.g. as shown in FIG. 23). However, in the second set of frames, the cursor position is such that VLAN ID is longer, so that these one or more bit positions are used for providing part of the VLAN ID. Alternatively, and as already discussed, in each of the first set of frames, the one or more bit positions may be part of fields 2210, 2220 (e.g. as in a conventional Ethernet frame). In this case, in the second set of frames, the cursor position is such that the VLAN ID longer and these one or more bit positions form part of the VLAN ID extension bits (e.g. as shown in FIG. 24).

Figure 35:
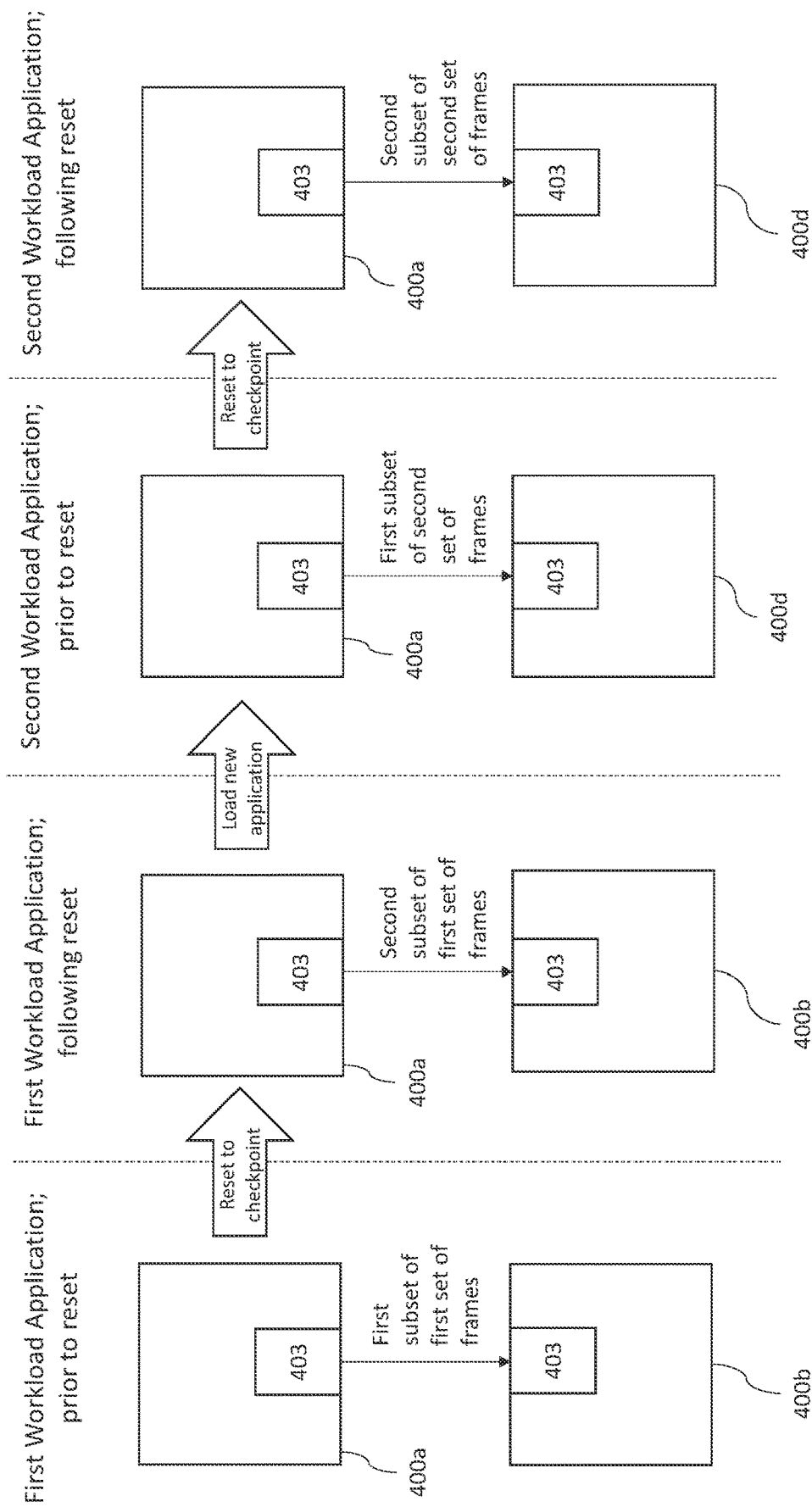
FIG. 35 illustrates an embodiment in which different subsets of a first set of frames are separated by a reset event and different subsets of a second set of frames are separated by a reset event.

Reference is made to FIG. 35, which illustrates an alternative embodiment to that shown in FIG. 34. In this case, the device 400*a* also sends a first set of frames over a first VLAN, where the first VLAN is identified by a first VLAN ID before sending a second set of frames over a second VLAN, where the second VLAN is identified by a second VLAN ID. The second VLAN ID is longer than the first VLAN ID. The frames sent by the first device 400*a* may be sent using either of the mechanism described above with respect to FIGS. 25 and 26. The devices 400*a*, 400*b* exchange frames when running code as part of running a first workload application, in which case the devices 400*a*, 400*b* each belong to a same set (e.g. one of sets 2710, 2720, 2730) of devices 400. At a later time, the devices 400*a*, 400*d* exchange frames when running code as part of running a second workload application, in which case the devices 400*a*, 400*d* each belong to a same set (e.g. one of sets 2710, 2720, 2730) of devices 400. The first set of frames is divided into a first subset and a second subset, and the second set of frames is divided into a first subset and a second subset. Each of these subsets has the same properties as the corresponding subsets in the embodiment of FIG. 34 described above.

The difference between the embodiment of FIG. 35 and the embodiment of FIG. 34 is that in FIG. 35, for each of the first and second sets of frames, the respective second subset is sent to the same device 400*b*/400*d* as the respective first subset, but is sent after a reset event that causes the relevant workload application to be reset to a checkpoint. In this embodiment, the one or more bits in the one or more bit positions in the first subset and the second subset are bits of the generation number, which is updated in response to a reset event. Such a reset event causes the MAC address bits at the one or more bits positions to change between a first subset and a second subset of frames sent over the same VLAN.

The VLAN ID is updated, when the second workload application is loaded in place of the first workload application. The device 400*d* to which the device 400*a* sends the second set of frames, which are associated with the second workload application, may be the same or different to the device 400*b* to which the device 400 sends the first set of frames, which are associated with the first workload application.

As noted, embodiments of the device 400 comprise a plurality of NICs 403. Different ones of these NICs 403 are provisioned with the same VLAN ID, since a single device 400 is configured to communicate over a single VLAN. However, the NICs 403 have different MAC addresses, since each MAC address in the same VLAN must be unique. Furthermore, since different ones of these NICs 403 support different connections with different endpoints, the MAC addresses of the NICs 403 with which they communicate will also be different.

Therefore, in embodiments, each NIC 403 of the device 400 is provisioned by the MCPU 404 with the same VLAN ID, but different MAC addresses. Despite the VLAN IDs being the same, given that the MAC addresses may extend into the third set of bits 2230, it is still possible that the NICs 403 of the device 400 will be provisioned with different values of the third set of bits 2230.

Figure 29:
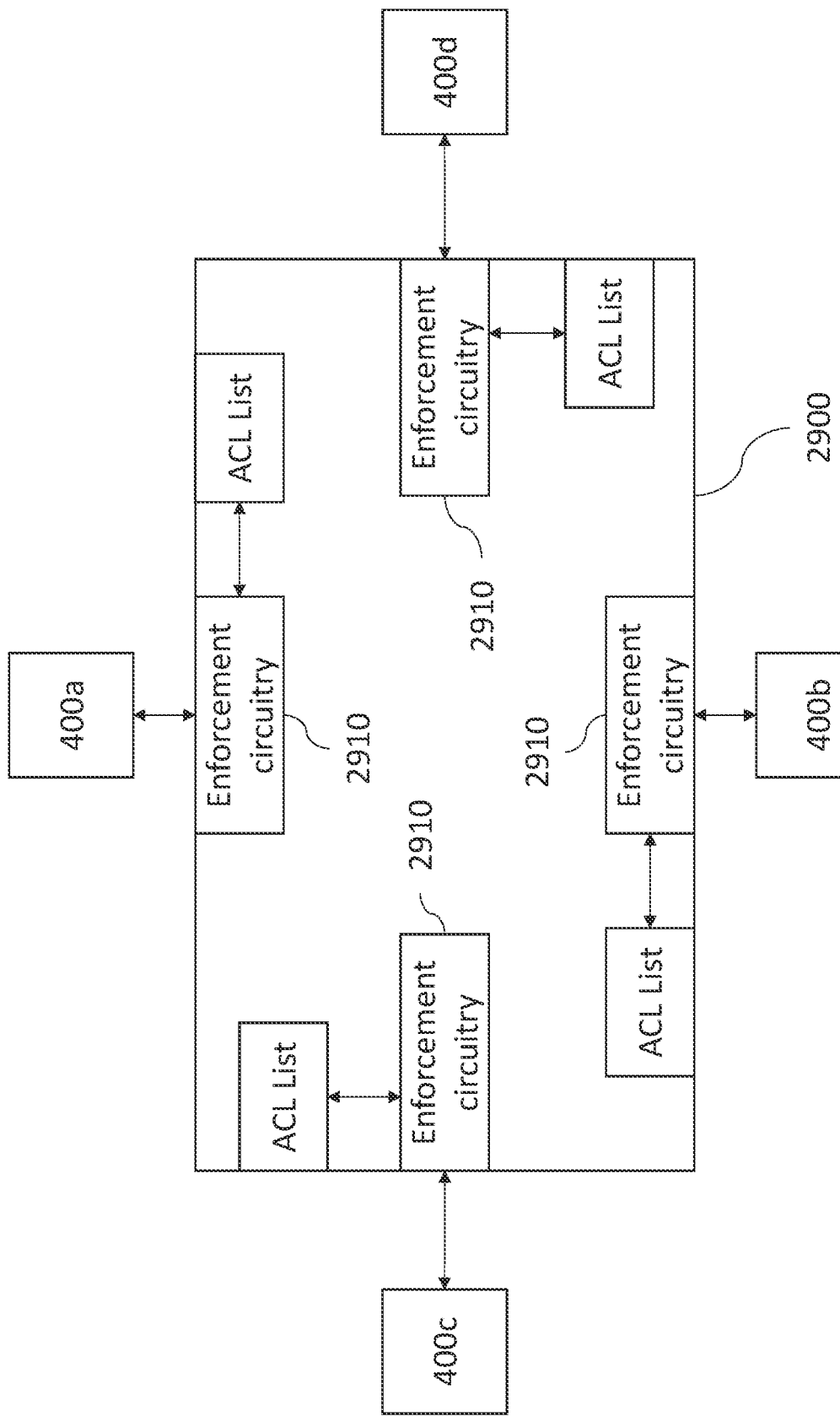
FIG. 29 illustrates use of a switch for communicating over a network.

Reference is made to FIG. 29, which illustrates a part of a system 2700 showing a network switch 2900 belonging to a network 401. The switch 2900 comprises a plurality of ports over which it is configured to communicate with each of the devices 400a-d. The switch 2900 may communicate directly with the devices 400a-d or may communicate via one or more intermediate switches, which are not shown in FIG. 29. The switch 2900 comprises circuitry (e.g. a processor executing instructions or dedicated circuitry) configured to perform any operations described herein as being performed by the switch 2900. This circuitry comprises enforcement circuitry 2910 that is configured to provide for enforcement of rules for each of the ports, where those rules prevent traffic not meeting those rules from being transmitted over the relevant ports. Each of the ports is associated with an access control list (ACL list) stored in memory of the switch 2900. Each ACL list defines characteristics of frames that may be transmitted over its associated port.

In some embodiments, the circuitry 2910 performs enforcement only on the basis of the third fields 2230 of the frames, i.e. those conventionally allocated for representing VLAN IDs, and does not perform enforcement on the basis of the first and second fields 2210, 2220, i.e. the fields conventionally allocated for representing the MAC addresses. In this case, the enforcement at the NICs 403 is relied upon in addition to enforcement at the switches in the network 401 in order to prevent traffic not intended for a particular NIC 403 from being received at that NIC 403.

It is understood that the switch 2900 may operate as a conventional switch, which performs enforcement on the basis of conventional VLANs, whilst still being compatible with frames in which the VLANs or MACs have been extended. For example, if the MACs are extended (e.g. as in FIG. 23) such that the VLAN ID comprises fewer bits than the third field 2230, the access control list for a port on which a particular VLAN ID is to be enabled is set up to enable the entire range of values for the third field 2230 that are compatible with that VLAN ID. For example, suppose that the VLAN ID is represented by 10 bits of the third field 2230. To enable that VLAN ID on a port, the ACL for that port is set to enable all values of the third field 2230 that include those 10 bits of the VLAN ID. Conversely, if the VLAN ID is extended such that the VLAN ID comprises more bits than are present in the third field 2230, then the consequence is that, when a particular port is configured to accept a particular value for the third field 2230, a range of VLAN IDs which share that same value of the third field 2230 are accepted for transmission over the particular port. In this case, in order to configure a port to accept a particular VLAN ID, the access control list for the port is configured to accept frames having the same value of the third field 2230 as that VLAN ID. The result is that the switch 2900 will permit frames comprising other VLAN IDs (also having the same values for the third field 2230) to also be transmitted over that port. However, provision of enforcement at the NICs 403 still enables isolation between the VLANs to be achieved in this case.

In some embodiments, the switches in the network 401 may, in addition to providing for enforcement on the basis of the VLAN ID, additionally provide for enforcement on the basis of the MAC addresses in the frame headers. In this case, the ACL for each port in the switch 2900 may identify one or more VLANs, which are enabled on that port. For each enabled VLAN, the switch 2900 stores a set of MAC addresses that are permitted for transmission over that port.

If the switch 2900 has received a frame, the switch 2900 determines whether a VLAN ID in the frame matches a VLAN ID that is indicated in the ACL as being permitted for a particular port. This determination comprises comparing all bits of the VLAN ID (including any belonging to the first field 2210 and second field 2220) in the frame to a set of permitted VLAN IDs (which may have varying lengths) for a port. If it is determined that the frame comprises a VLAN ID that is permitted for a relevant one of the ports, the switch 2900 looks up the MAC addresses permitted for that VLAN ID. The switch 2900 determines whether there is a match between any of those MAC addresses and the destination MAC in the frame and permits the frame to be transmitted over the port in response to determining that there is a match.

The length (i.e. number of bits) for each of the MAC addresses that are permitted for the VLAN ID identified in the frame will depend upon the length of that identified VLAN ID. For example, if the identified VLAN ID comprises 10 bits, the permitted MAC addresses for that VLAN ID will comprise 50 bits. Therefore, after determining that the 10 bit VLAN ID is present in a frame header, the circuitry 2910 compares the 50 bits of the MAC address in the frame against the permitted MAC addresses (which are also 50 bits in length) for that VLAN ID that are listed in the relevant ACL. The circuitry 2910 permits transmission of the frame over the port if there is a match. On the other hand, after determining that the 14 bit VLAN ID is present in a frame header, the circuitry 2910 compares the 46 bits of the MAC address in the frame against the permitted MAC addresses (which are also 46 bits in length) for that VLAN ID that are listed in the relevant ACL. In this way, the number of bits in the frame against which the comparison against MAC addresses is performed depends upon the length of the identifier VLAN ID.

The network 401 of which switch 2900 is a part, may support VLANs associated with different cursor positions. These VLANs having different cursor positions may be supported at different times. For example, the switch 2900 may be configured to receive and perform forwarding and enforcement with respect to frames associated with the first workload application discussed above with respect to FIGS. 25 and 26. When configured in this way, the switch 2900 stores in one or more of the ACLs associated with ports used for communication between devices 400 supporting the first workload application, an indication that the VLAN ID for the first workload application is permitted for communication over those ports. At a later time, the switch 2900 may be configured to receive and perform forwarding and enforcement with respect to frames associated with the second workload application discussed above with respect to FIGS. 25 and 26. To support such enforcement with respect to these frames, the one or more ACLs may be reconfigured to permit forwarding of frames comprising a new VLAN ID associated with the second workload application.

In some embodiments, the network 401 may support contemporaneous transport of frames associated with different cursor positions. In this case, the switch 2900 receives and performs forwarding and enforcement with respect to frames associated with a first cursor position (e.g. that exemplified in FIG. 23), whilst also receiving and performing forwarding and enforcement with respect to frames associated with a second cursor position (e.g. that exemplified in FIG. 24). For example, FIG. 29 illustrates two processing devices 400a, 400b that may be configured to communicate with one another over a first VLAN having a first cursor position (e.g. that exemplified in FIG. 23). FIG. 29 also illustrates two processing devices 400c, 400d that may be configured to communicate with one another over a second VLAN having a second cursor position (e.g. that exemplified in FIG. 24). Each of these VLANs are supported by the same physical network infrastructure 401 of which the switch 2900 is a part.

In the case that the switch 2900 performs cursor aware enforcement, it may perform checking against multiple discontiguous header fields. Given that the VLAN ID may not comprise the same number of bits as the third field 2230 in the frame and the destination MAC may not comprise the same number of bits as the first field 2210 in the frame, the checking performed for either of the VLAN ID and the destination MAC may comprise performing checks against multiple discontiguous fields in the header. For example, suppose that, for a particular port, a permitted VLAN ID in the ACL for that port comprises extension bits. In this case, the check performed against that permitted VLAN ID comprises checking all of the third set of bits 2230 in the header of a received frame against corresponding bits of the permitted VLAN ID stored in the ACL and checking some of the first set of bits 2210 against corresponding bits of the permitted VLAN ID stored in the ACL. As is understood from FIG. 22, the first set of bits 2210 and third set of bits 2230 form fields that are discontiguous in the frame header. Therefore, the check against the permitted VLAN ID involves performing a check against bits belonging to multiple discontiguous fields in the header. Suppose that, for the same or a different port, a permitted MAC in the ACL for that port comprises extension bits. In this case, the check performed against the permitted MAC comprises checking all of the first set of bits 2210 in the header of a received frame against corresponding bits of that permitted MAC stored in the ACL and checking some of the third set of bits 2230 against corresponding bits of that permitted MAC stored in the ACL. As is understood from FIG. 22, the first set of bits 2210 and the third set of bits 2230 form fields that are discontiguous in the frame header. Therefore, the check for the MAC address in this case involves performing a check against bits belonging to multiple discontiguous fields in the header of the frame.

Figure 30:
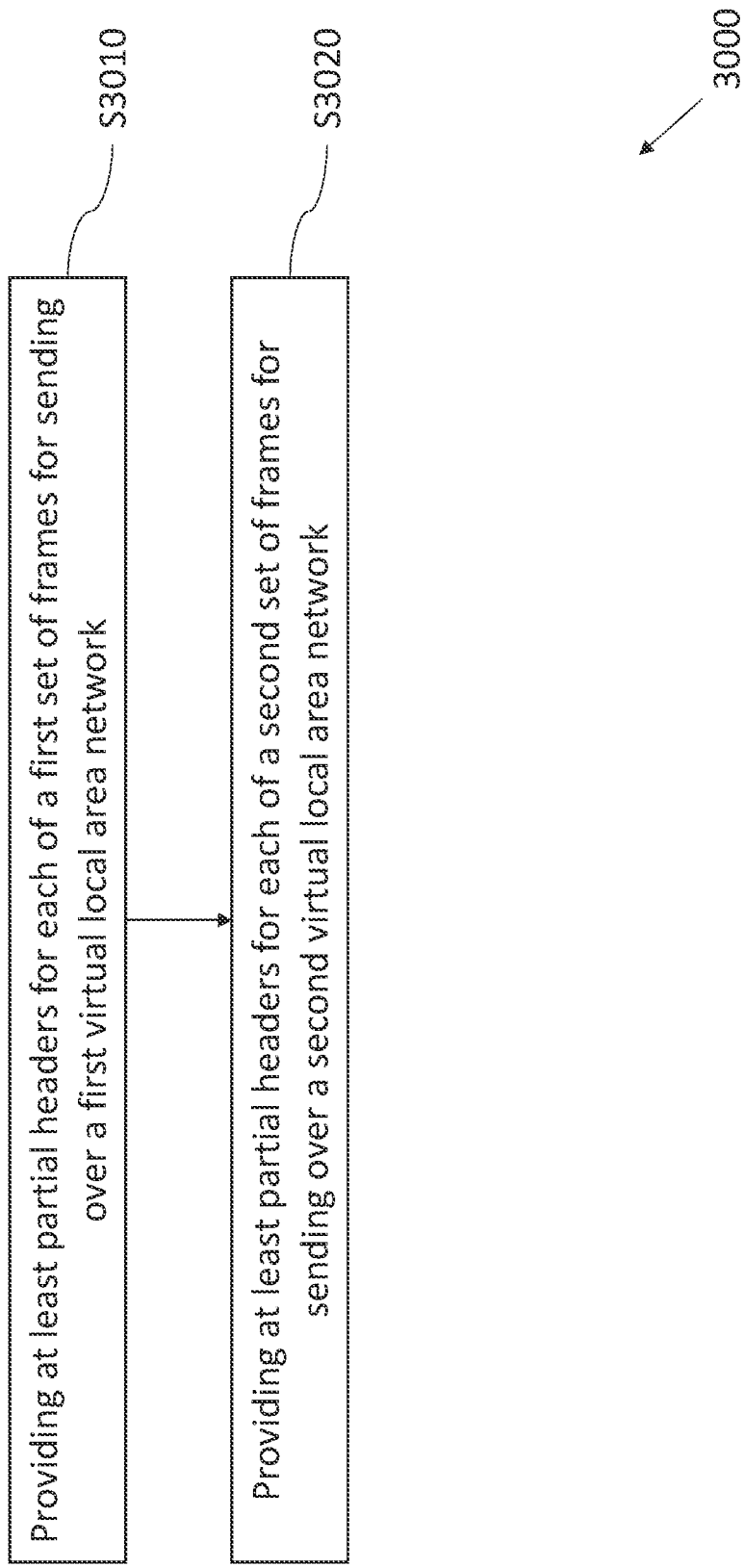
FIG. 30 illustrates an example of a method for making use of a moving cursor between the VLAN ID and MAC address.

Reference is made to FIG. 30, which illustrates an example method 3000 implemented in a data processing apparatus (e.g. the MCPU 404) for supporting transmission over network 401. The apparatus comprises processing circuitry for performing the steps of the method 3000.

At S3010, the apparatus provides at least partial headers for each of a first set of frames for sending over a first virtual local area network. Each of these at least partial headers comprises a destination media access control address and a first virtual local area network identifier identifying the first virtual local area network.

At S3020, the apparatus provides at least partial headers for each of a second set of frames for sending over a second virtual local area network. Each of these at least partial headers comprises a destination media access control address and a second virtual local area network identifier identifying the second virtual local area network.

Figure 31:
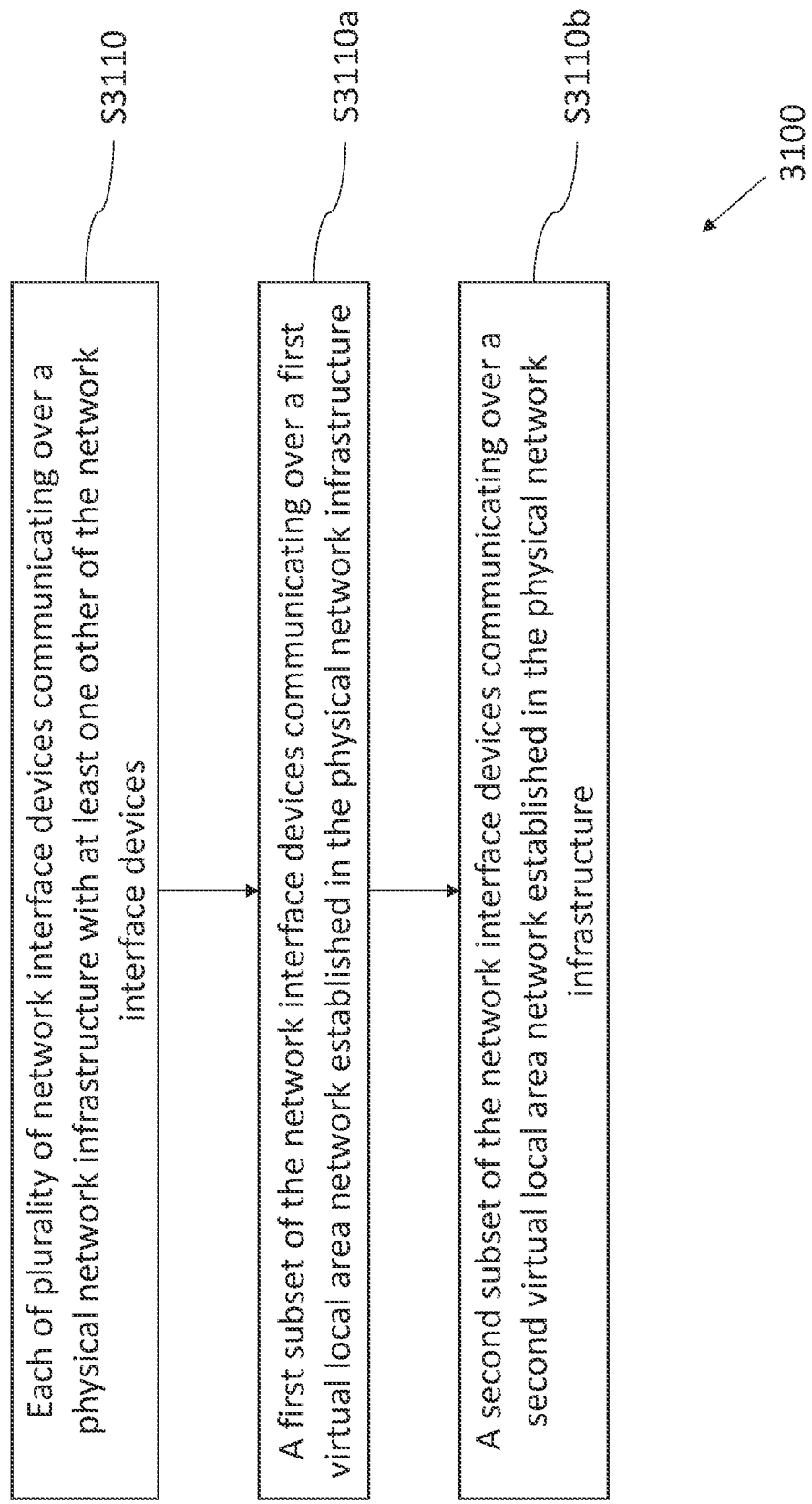
FIG. 31 illustrates an example of a further method for making use of a moving cursor between the VLAN ID and MAC address.

Reference is made to FIG. 31, which illustrates an example method 3100 implemented in a system (e.g. system 2700) having a plurality of communicating NICs 403. Each of the steps of method 3100 may overlap in time. S3110a and S3110b may be considered part of performing S3110.

At S3110, each of plurality of network interface devices 403 communicates over a physical network infrastructure 401 with at least one other of the network interface devices 403.

At S3110a, a first subset of the network interface devices 403 communicate with one another over a first virtual local area network established in the physical network infrastructure 401.

At S3110b, a second subset of the network interface devices communicate with one another over a second virtual local area network established in the physical network infrastructure 401.

Figure 32:
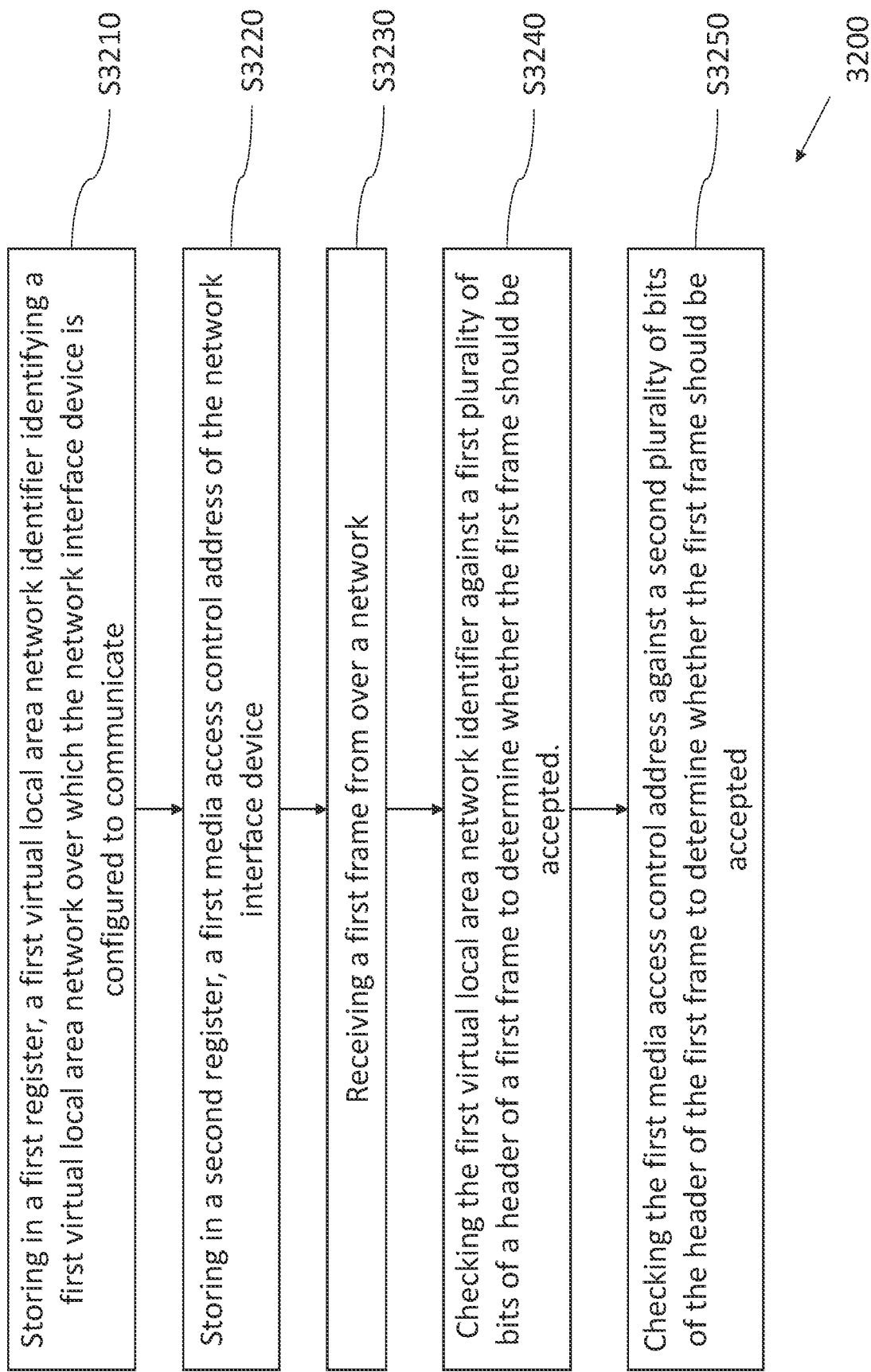
FIG. 32 illustrates an example of a method implemented in a NIC for handling reception of frames with varying cursor positions.

Reference is made to FIG. 32, which illustrates an example method 3200 implemented in a network interface device (e.g. NIC 403a).

At S3210, the network interface device stores in a first register, a first virtual local area network identifier identifying a first virtual local area network over which the network interface device is configured to communicate.

At S3220, the network interface device stores in a second register, a first media access control address of the network interface device.

At S3230, the network interface device receives a first frame from over a network.

At S3240, the network interface device checks the first virtual local area network identifier against a first plurality of bits of a header of a first frame to determine whether the first frame should be accepted.

At S3250, the network interface device checks the first media access control address against a second plurality of bits of the header of the first frame to determine whether the first frame should be accepted.

Figure 33:
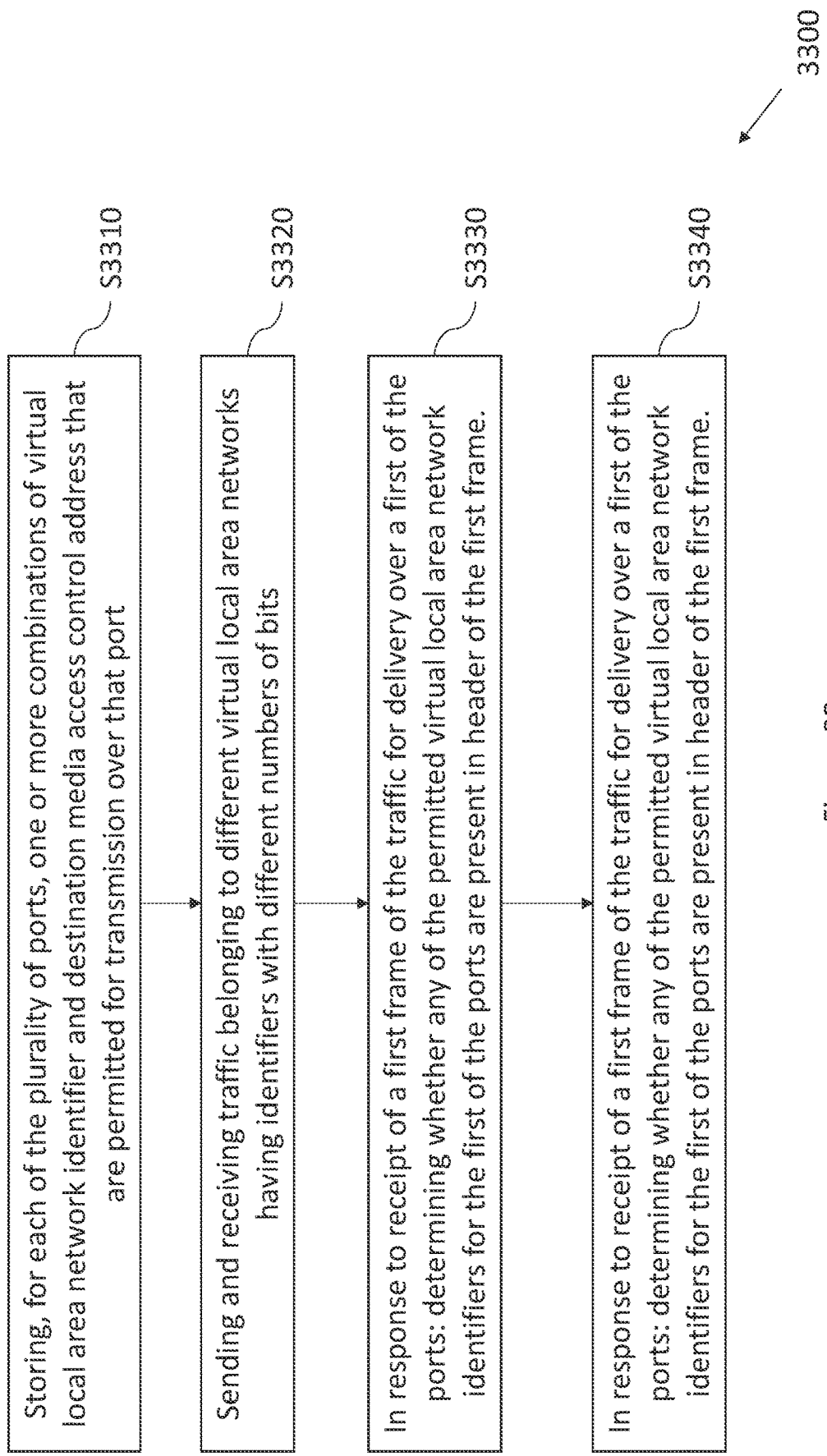
FIG. 33 illustrates an example of a method implemented in a network switch for handling traffic having varying cursor positions.

Reference is made to FIG. 33, which illustrates an example method 3300 implemented in a network switch (e.g. switch 2900).

At S3310, the switch stores, for each of the plurality of ports, one or more combinations of virtual local area network identifier and destination media access control address that are permitted for transmission over that port.

At S3320, the switch sends and receives traffic belonging to different virtual local area networks.

It will be appreciated that the above embodiments have been described by way of example only. While particular embodiments have been described, other applications and variants of the disclosed techniques may become apparent to a person skilled in the art once given the disclosure herein.

The invention claimed is:

1. A data processing apparatus configured to transmit frames over a network, wherein the data processing apparatus comprises processing circuitry configured to:
   perform protocol processing to construct a first set of frames for sending over a first virtual local area network, wherein each of the first set of frames comprises:
      a destination media access control address for a respective frame; and
      a first virtual local area network identifier identifying the first virtual local area network;
   transmit the first set of frames over the network;
   after constructing the first set of frames, perform protocol processing to construct a second set of frames for sending over a second virtual local area network, wherein each of the second set of frames comprises:
      a destination media access control address for the respective frame; and
      a second virtual local area network identifier identifying the second virtual local area network; and
   transmit the second set of frames over the network,
   wherein bits at one or more bits positions in each of the first set of frames form part of the destination media access control address for the respective frame and have different values for at least some of the first set of frames, wherein further bits at the one or more bits positions in each of the second set of frames form part of the second virtual local area network identifier and are fixed to have same values for all of the second set of frames sent over the second virtual local area network.

2. The data processing apparatus of claim 1, wherein in each of the first set of frames, the bits at the one or more bits positions are contiguous with additional bits of the destination media access control address for the respective frame,
wherein in each of the second set of frames, the further bits at the one or more bits positions are contiguous with bits of the destination media access control address for the respective frame.

3. The data processing apparatus of claim 1, wherein in each of the first set of frames, the bits at the one or more bits positions are contiguous with bits of the first virtual local area network identifier,
wherein in each of the second set of frames, the further bits at the one or more bits positions are contiguous with additional bits of the second virtual local area network identifier.

4. The data processing apparatus of claim 1, wherein the processing circuitry is configured to:
transmit one or more of the first set of frames and one or more of the second set of frames to a same destination.

5. The data processing apparatus of claim 1, wherein the processing circuitry is configured to:
support an application configured to provide data for each of the first set of frames and the second set of frames; and
support a network protocol stack configured to, perform the protocol processing to construct the first set of frames and the second set of frames using the data provided by the application.

6. The data processing apparatus of claim 1, wherein the data processing apparatus comprises:
a computing device comprising a first part of the processing circuitry configured to perform the protocol processing to construct the first set of frames and the second set of frames; and
a network interface controller comprising a second part of the processing circuitry configured to transmit the first set of frames and the second set of frames over the network.

7. The data processing apparatus of claim 1, wherein a first part of the processing circuitry is configured to write the first virtual local area network identifier to a register of a network interface device to provide first connection state for supporting a first connection via which one or more the first set of frames are sent over the network by the network interface device.

8. The data processing apparatus of claim 7, comprising the network interface device, wherein the network interface device is configured to store a first destination media access control address for the one or more of the first set of frames in a separate register of the network interface device to the first virtual local area network identifier, wherein the network interface device comprises a second part of the processing circuitry configured to provide a contiguous string of bits in each header of the one or more of the first set of frames, the contiguous string of bits comprising bits of the first destination media access control address and bits of the first virtual local area network identifier.

9. The data processing apparatus of claim 7, wherein the first part of the processing circuitry is configured to, after writing the first connection state, write the second virtual local area network identifier to the register in place of the first virtual local area network identifier, wherein the second virtual local area network identifier forms part of connection state for supporting a second connection via which each of the one or more of the second set of frames are sent over the network by the network interface device.

10. The data processing apparatus of claim 1, wherein the processing circuitry is configured to provide an address resolution function configured to:
for each of the first set of frames, determine a respective destination media access control address based on an identifier of a destination to which the respective frame is to be delivered; and
for each of the second set of frames, provide a respective destination media access control address based on an identifier of a destination to which the respective frame is to be delivered.

11. The data processing apparatus of claim 10, wherein for each of the first set of frames, a respective identifier of the destination comprises a physical or logical identifier of that destination,
wherein for each of the second set of frames, a respective identifier of the destination comprises a physical or logical identifier of that destination.

12. The data processing apparatus of claim 1, wherein each of the first set of frames comprises application data relating to a first application, wherein each of the second set of frames comprises application data relating to a second application.

13. The data processing apparatus of claim 12, comprising a processing unit configured to:
execute a first set of application instructions, which are part of the first application; and
subsequently, execute a second set of application instructions, which are part of the second application.

14. The data processing apparatus of claim 12, wherein the processing circuitry is configured to:
cause ones of the first set of frames that have different values for the bits at the one or more bits positions to be sent over the network from different network interface devices.

15. The data processing apparatus as claimed in claim 1, wherein the processing circuitry is configured to:
construct each of a first subset of the first set of frames with first values for the bits at the one or more bits positions;
in response to a reset event, update the bits at the one or more bits positions to second values; and
construct each of a second subset of the first set of frames with the second values for the bits at the one or more bits positions.

16. A method for transmitting frames over a network, the method comprising:
performing protocol processing to construct a first set of frames for sending over a first virtual local area network, wherein each of the first set of frames comprises:
a destination media access control address for the respective frame; and
a first virtual local area network identifier identifying the first virtual local area network; and
transmitting the first set of frames over the network;
after constructing the first set of frames, performing protocol processing to construct a second set of frames for sending over a second virtual local area network, wherein each header for the second set of frames comprises:

a destination media access control address for the respective frame; and a second virtual local area network identifier identifying the second virtual local area network; and transmitting the second set of frames over the network;

wherein bits at the one or more bits positions in each of the first set of frames form part of the destination media access control address for the respective frame and have different values for at least some of the first set of frames, wherein further bits at the one or more bits positions in each of the second set of frames form part of the second virtual local area network identifier and are fixed to have same values for all of the second set of frames sent over the second virtual local area network.

17. A computer program comprising computer readable instructions, which when executed by at least one processor causes a method for supporting transmission of frames over a network to be performed, the method comprising:

performing protocol processing to construct at least part of each of a first set of frames for sending over a first virtual local area network, wherein for each of the first set of frames, the at least part of a respective frame comprises:

a destination media access control address for the respective frame; and a first virtual local area network identifier identifying the first virtual local area network; and for each of the first set of frames, sending the at least part of the respective frame to a network interface device for transmission over the network; and performing protocol processing to construct at least part of each of a second set of frames for sending over a second virtual local area network, wherein for each of the second set of frames, the at least part of the respective frame comprises:

a destination media access control address for the respective frame; and a second virtual local area network identifier identifying the second virtual local area network; and for each of the second set of frames, sending the at least part of the respective frame to the network interface device for transmission over the network, wherein bits at one or more bits positions in each of the first frames form part of the destination media access control address for the respective frame and have different values for at least some of the first set of frames, wherein further bits at the one or more bits positions in each of the second set of frames form part of the second virtual local area network identifier and are fixed to have same values for all of the second set of frames sent over the second virtual local area network.

* * * * *